(12) United States Patent
Sridhar et al.

(10) Patent No.: US 8,347,108 B2
(45) Date of Patent: Jan. 1, 2013

(54) SYSTEM AND METHOD FOR AUTOMATED SAFE REPROGRAMMING OF SOFTWARE RADIOS

(75) Inventors: Varadarajan Sridhar, Bangalore (IN); Ravi G. Amur, Bangalore (IN); Korrapati Kalyane Rao, Bangalore (IN)

(73) Assignee: Satyam Computer Services Limited of Mayfair Centre, Secunderabad (IN)

(*) Notice: Subject to any disclaimer, the term of this patent is extended or adjusted under 35 U.S.C. 154(b) by 1264 days.

(21) Appl. No.: 12/081,659

(22) Filed: Apr. 18, 2008

(65) Prior Publication Data

US 2008/0235665 A1 Sep. 25, 2008

Related U.S. Application Data

(60) Division of application No. 11/508,282, filed on Aug. 23, 2006, now abandoned, which is a continuation-in-part of application No. 10/146,948, filed on May 17, 2002, now abandoned.

(51) Int. Cl.
*H04L 29/06* (2006.01)

(52) U.S. Cl. .............................. 713/187; 726/22; 726/26

(58) Field of Classification Search ........................ None
See application file for complete search history.

(56) References Cited

U.S. PATENT DOCUMENTS

| | | | |
|---|---|---|---|
| 5,412,717 A | 5/1995 | Fischer | |
| 5,978,484 A | 11/1999 | Apperson et al. | |
| 6,047,374 A | 4/2000 | Barton | |
| 6,065,118 A | 5/2000 | Bull et al. | |
| 6,070,239 A | 5/2000 | McManis | |
| 6,073,239 A | 6/2000 | Dotan | |
| 6,105,072 A | 8/2000 | Fischer | |
| 6,105,137 A | 8/2000 | Graunke et al. | |

(Continued)

OTHER PUBLICATIONS

Ko, C.; Fink, G.; Levitt, K.; , "Automated detection of vulnerabilities in privileged programs by execution monitoring," Computer Security Applications Conference, 1994. Proceedings., 10th Annual, vol., No., pp. 134-144, Dec. 5-9, 1994 doi: 10.1109/CSAC.1994.367313 URL: http://ieeexplore.ieee.org/stamp/stamp.jsp?tp=&arnumber=367313&isnumber=8410.*

(Continued)

*Primary Examiner* — Eleni Shiferaw
*Assistant Examiner* — Jeffery Williams
(74) *Attorney, Agent, or Firm* — Merek, Blackmon & Voorhees, LLC

(57) ABSTRACT

The proposed system defines an automated safe reprogramming of software radios. The essence of software radios is to enhance or alter the functionality of a mobile terminal by using software. This means that the required software is downloaded onto a mobile terminal on the fly to meet the critical and necessary needs of the user. Lot of caution needs to be exercised while downloading the necessary software components on the fly. The proposed invention automates the validation and verification of the downloaded component by suggesting (a) a variety of signatures; (b) a means for defining multiple zones and verification of zone-specific signatures; (c) a means for computing the signatures of the downloaded component in the multiple zones; and (d) a means for verification of the downloaded component based on the signatures. The objective is to define the safeness of the downloaded component based on multiple signatures to be validated in different zones. In this way, the multiple validity requirements are tested in a systematic way and failure to meet any one of the requirements leads to the rejection of the downloaded component.

3 Claims, 52 Drawing Sheets

GENERATED DATA FOR DYNAMIC SIGNATURE VERIFICATION

| Function ID | F10 | F12 | F10 | F12 | F12 | E5 |
|---|---|---|---|---|---|---|
| Memory | 30 | 40 | 20 | 0 | 0 | NA |
| Execution Time (μs) | 50 | 20 | 40 | 18 | 24 | NA |
| Use-Case ID | 12 | 12 | 12 | 12 | 12 | 12 |

845

U.S. PATENT DOCUMENTS

| | | | |
|---|---|---|---|
| 6,128,774 | A | 10/2000 | Necula et al. |
| 6,154,844 | A | 11/2000 | Touboul et al. |
| 6,167,521 | A | 12/2000 | Smith et al. |
| 6,223,291 | B1 | 4/2001 | Puhl et al. |
| 6,330,588 | B1 | 12/2001 | Freeman |
| 6,480,962 | B1 | 11/2002 | Touboul |
| 6,658,465 | B1 | 12/2003 | Touboul |
| 6,804,780 | B1 | 10/2004 | Touboul |
| 7,293,142 | B1 * | 11/2007 | Xu et al. .................. 711/124 |
| 7,487,321 | B2 * | 2/2009 | Muthiah et al. ............ 711/170 |
| 7,584,461 | B2 * | 9/2009 | Plum .......................... 717/143 |
| 2002/0013910 | A1 | 1/2002 | Edery et al. |
| 2011/0138368 | A1 * | 6/2011 | Krauss ........................ 717/133 |

OTHER PUBLICATIONS

D. L. Oppenheimer and M. R. Martonosi, "Performance Signatures: A Mechanism for Intrusion Detection," Proceedings of the 1997 IEEE Information Survivability Workshop, San Diego, California, 1997.*

D. Spinellis, "Reflection as a Mechanism for Software Integrity Verification", ACM Transactions on Information and System Security, vol. 3, No. 1, Feb. 2000, pp. 51-62.

Olaziregi et al., "Architectures supporting SDR Terminals", Centre for Telecommunications Research (CTR), King's College London Strand, London, United Kingdom, Aug. 22, 2001.

Faroughi-Esfahani et al., "Detection & Control of the Rogue SDR-terminals in the Future Network", Motorola Semiconductor Products Sector, Aug. 24, 2001.

"Software Communications Architecture Specification", MSRC-5000SCA, V2.2, Modular Software-programmable Radio Consortium, Nov. 17, 2001.

Oppenheimer et al., "Performance Signatures: A Mechanism for Intrusion Detection", Princeton University, pp. 1-5 (no. date available).

Davis, "JTRS—An Open, Distributed-Object Computing Software Radio Architechture", 1999, IEEE.

Jennings, et al., "Base Station Software Download and Management", 2001, SDR Forum Document No. sdrf-010-0018-v0.00.

[SDR 1999] SDRF Technical Report 2.2. Chapter 6 Rev. 03 "Software Download Implementation Recommendation", Nov. 1999.

* cited by examiner

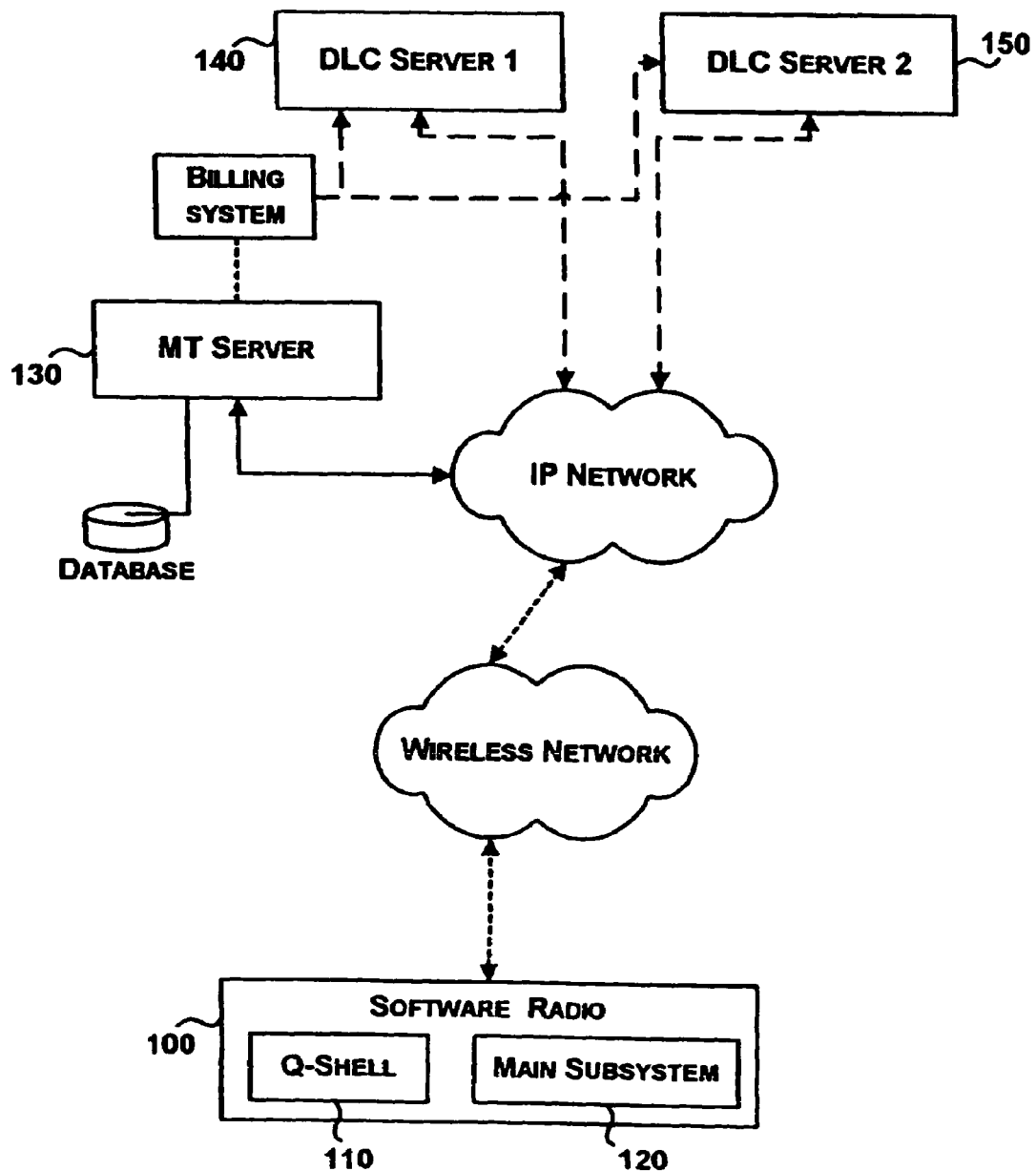
FIG. 1: NETWORK ARCHITECTURE FOR SOFTWARE RADIOS

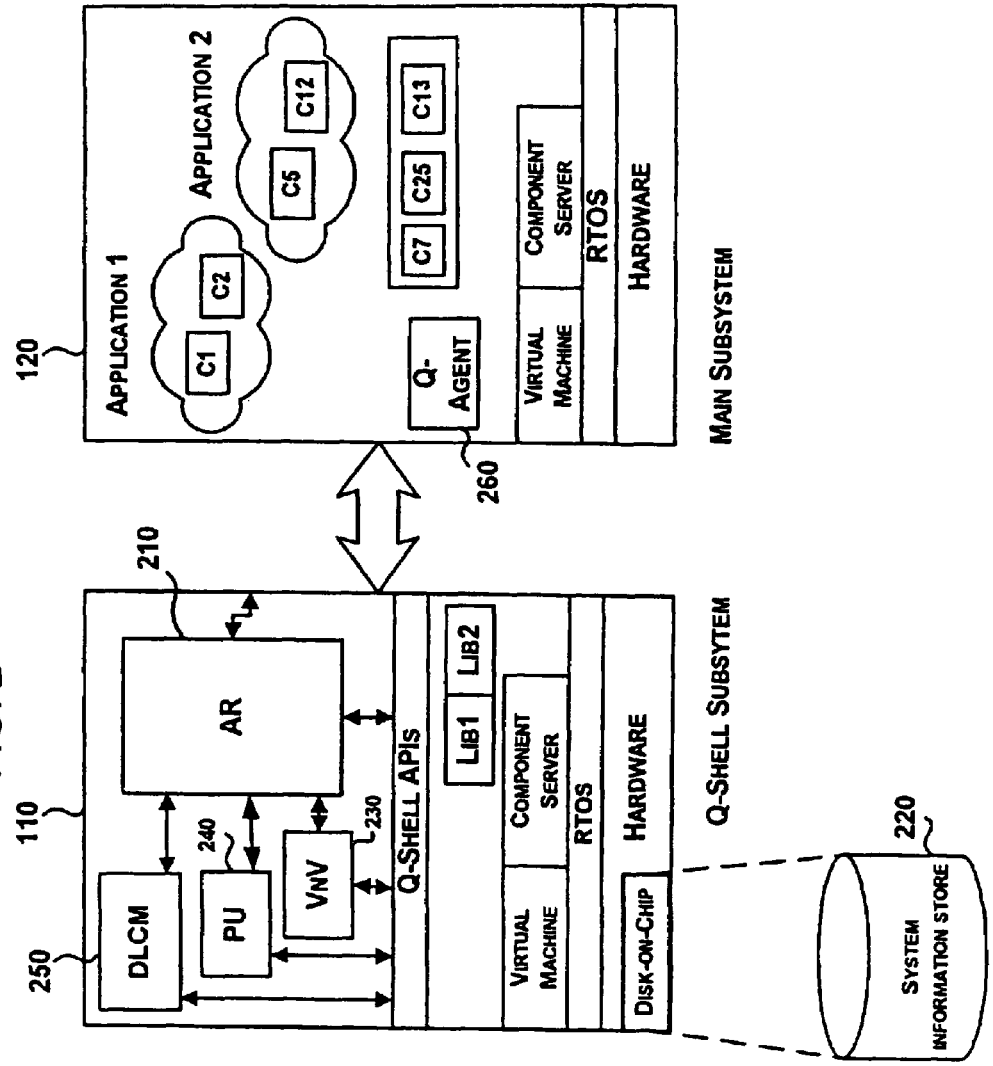

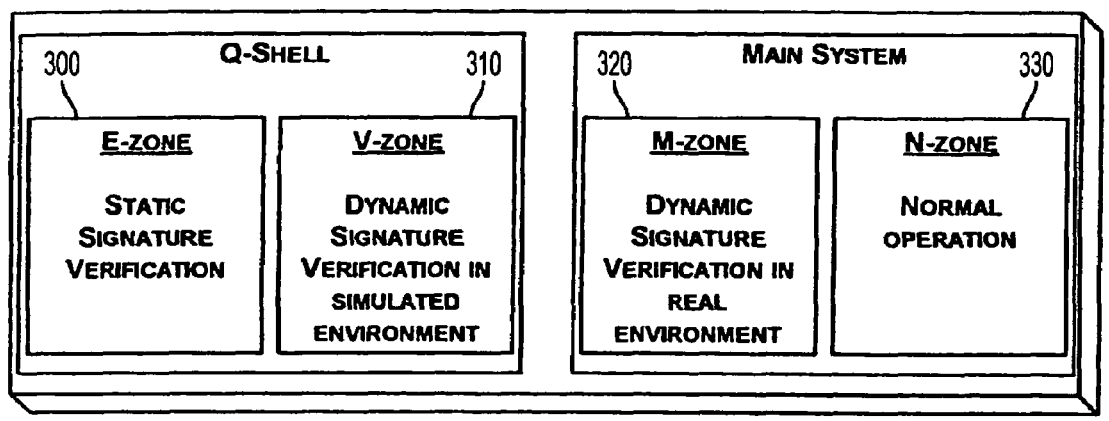
FIG. 3: DIFFERENT ZONES IN VALIDATION AND VERIFICATION PROCESS

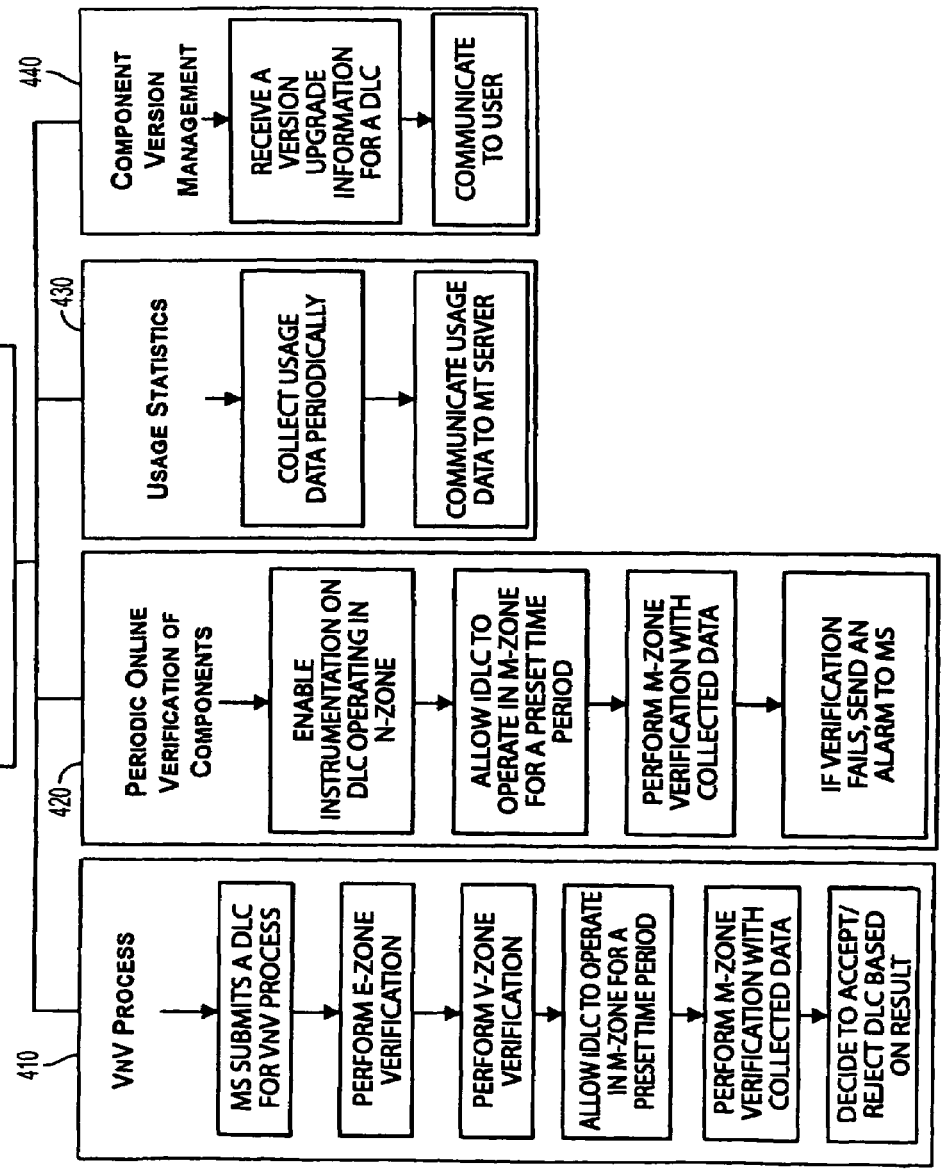
FIG. 4: QS FUNCTIONALITY

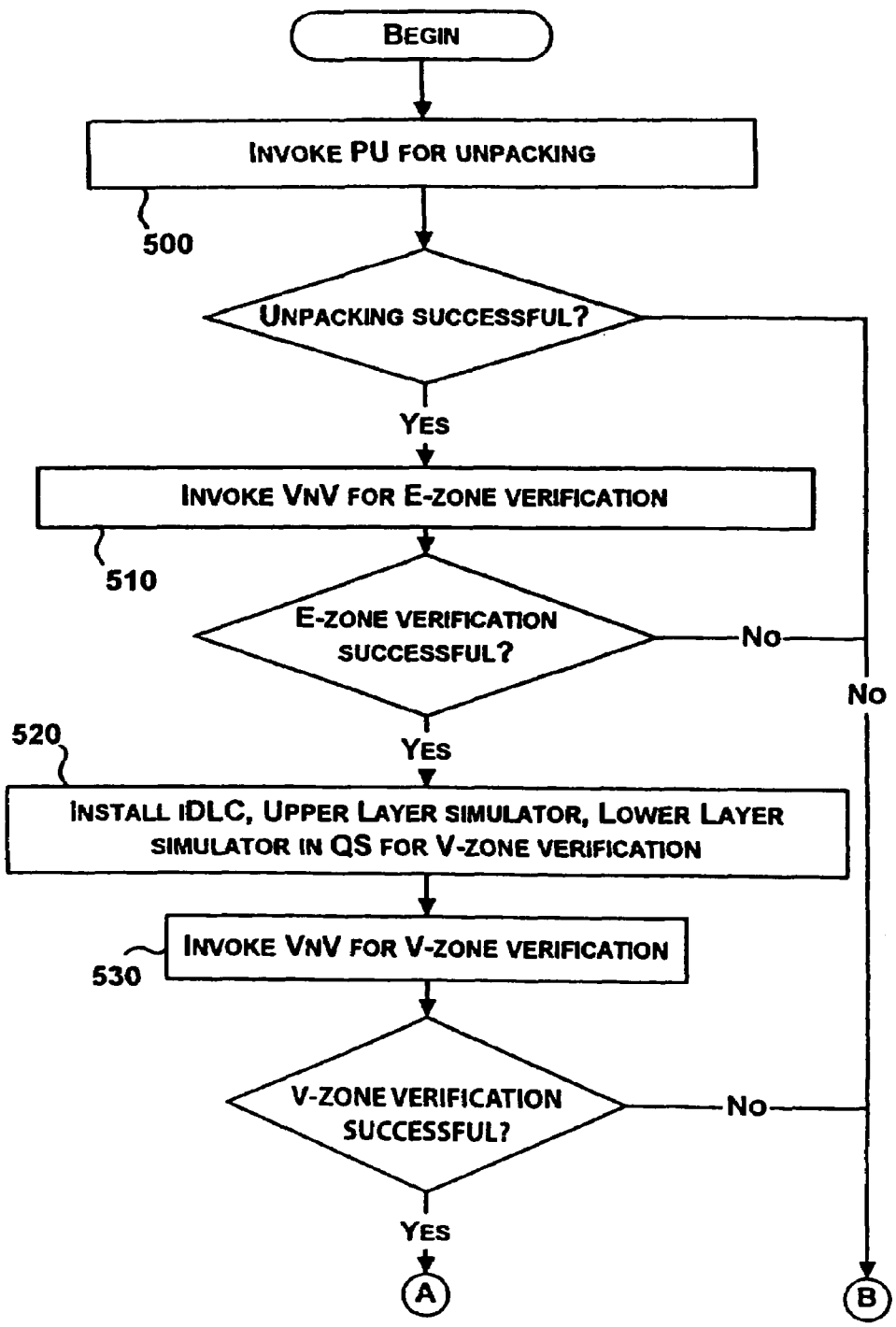

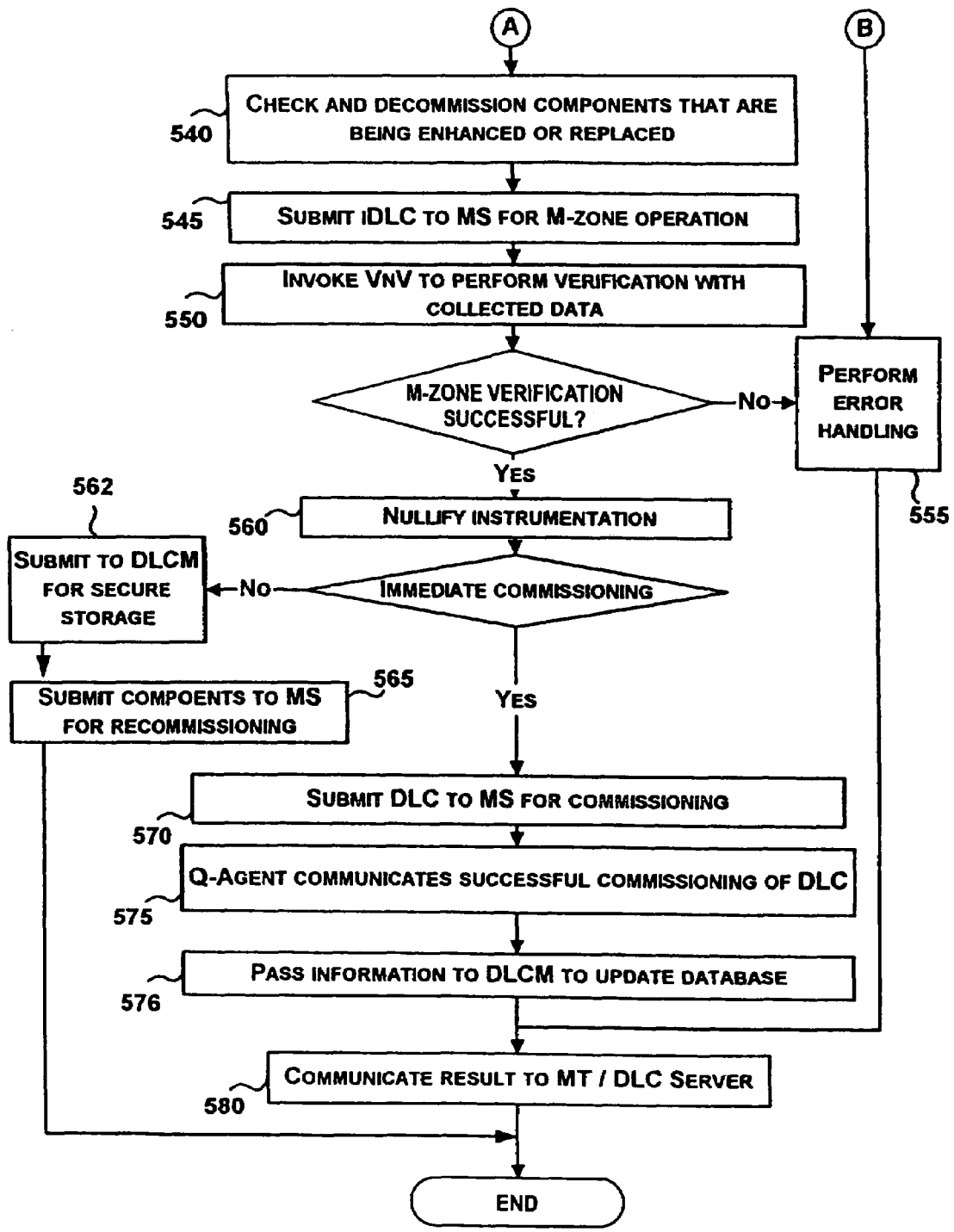
FIG. 5A: Flowchart of AR (Contd.)

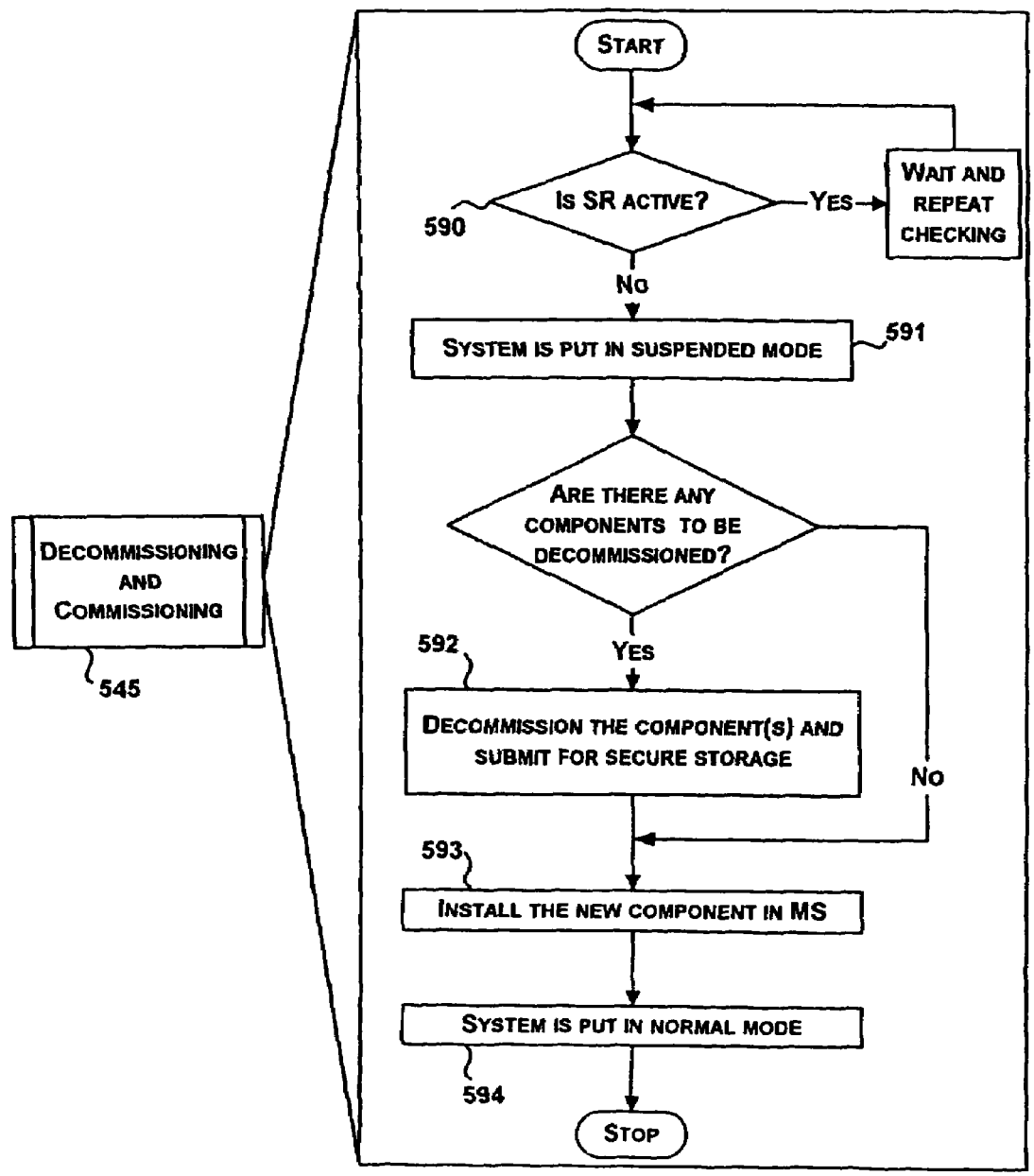
FIG. 5B - Preparation for M-zone Verification

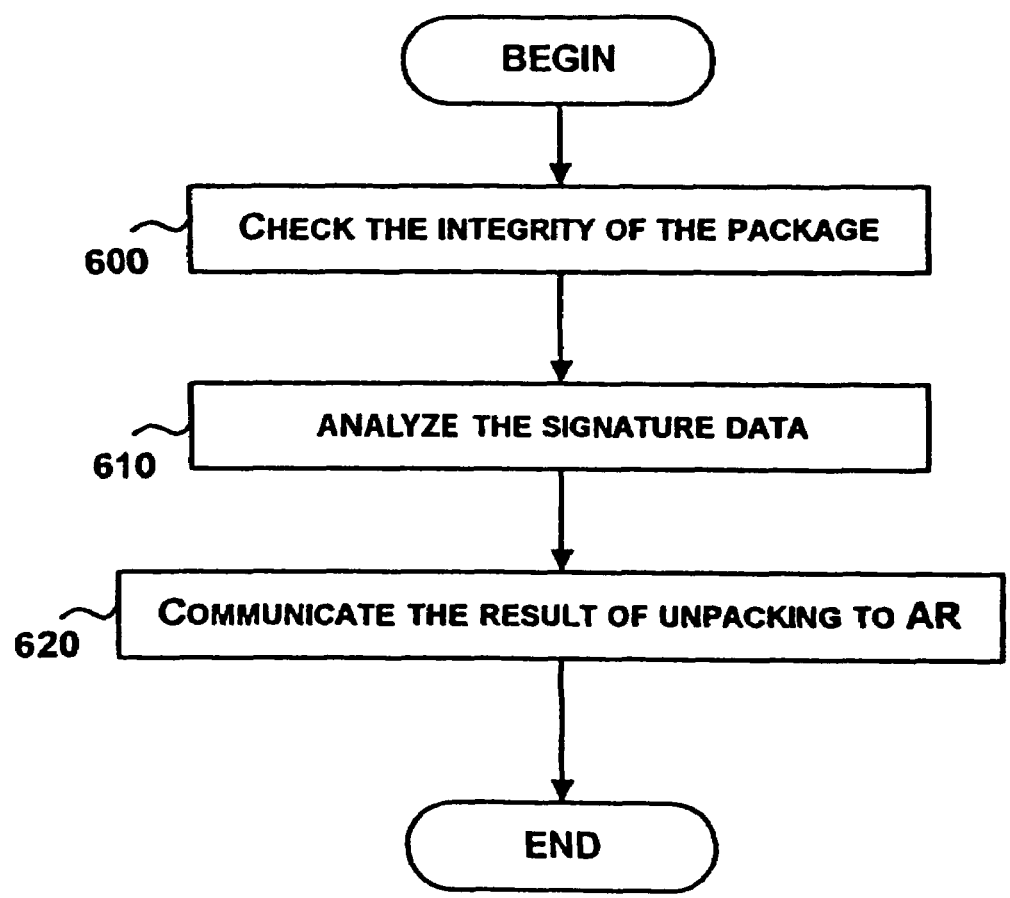

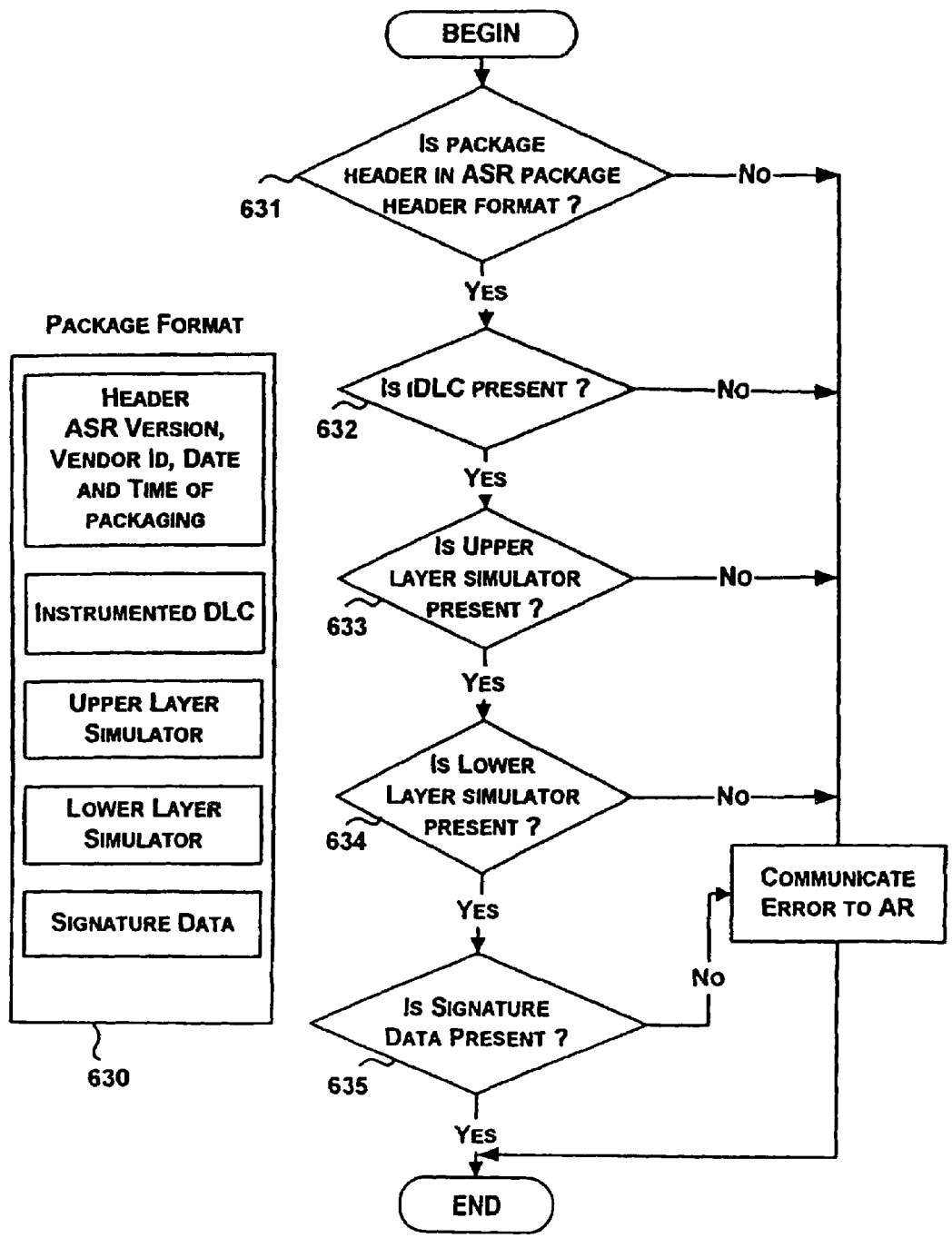
FIG. 6B: Package Integrity Check

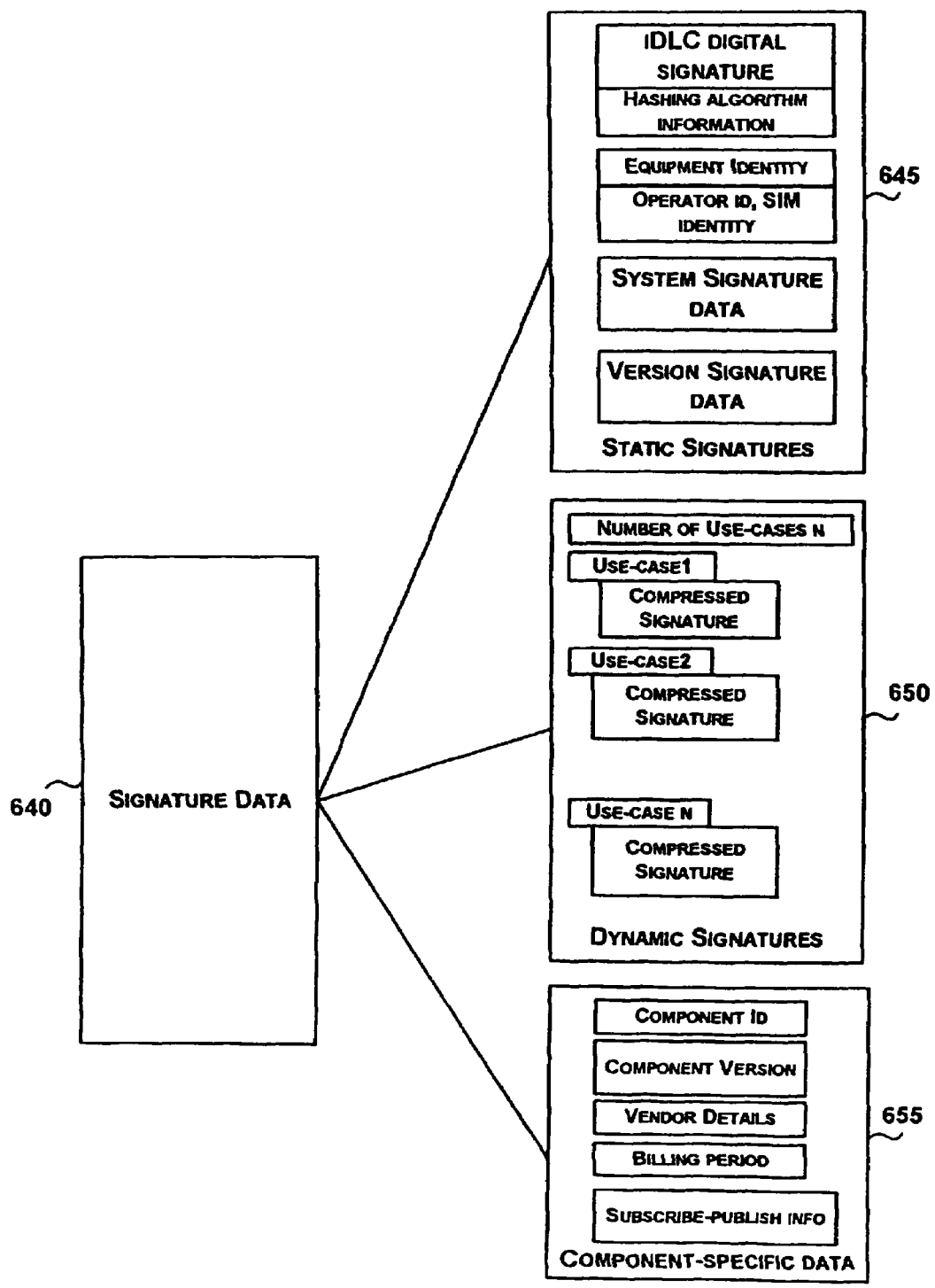

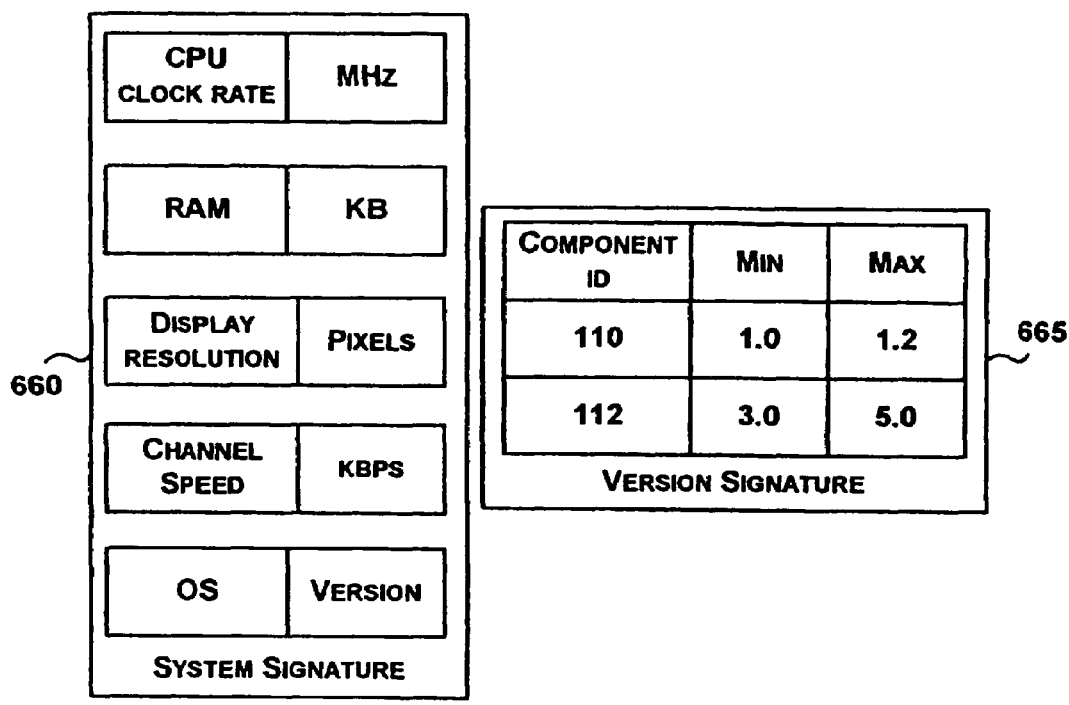
FIG. 6D: SYSTEM SIGNATURE AND VERSION SIGNATURE

FIG. 6E: Dynamic Signature Data

670

| Function ID | F10 | F12 | E5 | F12 | F10 | F12 | F7 | E6 |
|---|---|---|---|---|---|---|---|---|
| Memory | 30 | 40 | NA | 0 | 30 | 30 | 0 | NA |
| Execution Time (μs) | 50 | 20 | NA | 10 | 40 | 15 | 30 | NA |

CPU / Memory Utilization Signatures

| CPU | 5 | 40 | 35 | 40 | 25 | 30 | 20 | 10 |
|---|---|---|---|---|---|---|---|---|
| Memory | 20 | 20 | 15 | 10 | 40 | 15 | 30 | 10 |

Compressed Signature Data Structure
672

Decompressed Signature Data

IXB Signature

| Function ID | Count |
|---|---|
| F10 | 2 |
| F12 | 3 |
| F7 | 1 |

675

EXB Signature

| Function ID | Count |
|---|---|
| E5 | 1 |
| E6 | 1 |

680

XPU Signature

| Function ID | Execution Time |
|---|---|
| F10 | 50 |
| F12 | 40 |
| F12 | 10 |
| F10 | 40 |
| F12 | 15 |
| F7 | 30 |

685

XMU Signature

| Function ID | Memory |
|---|---|
| F10 | 30 |
| F12 | 40 |
| F12 | 0 |
| F10 | 30 |
| F12 | 30 |
| F7 | 0 |

690

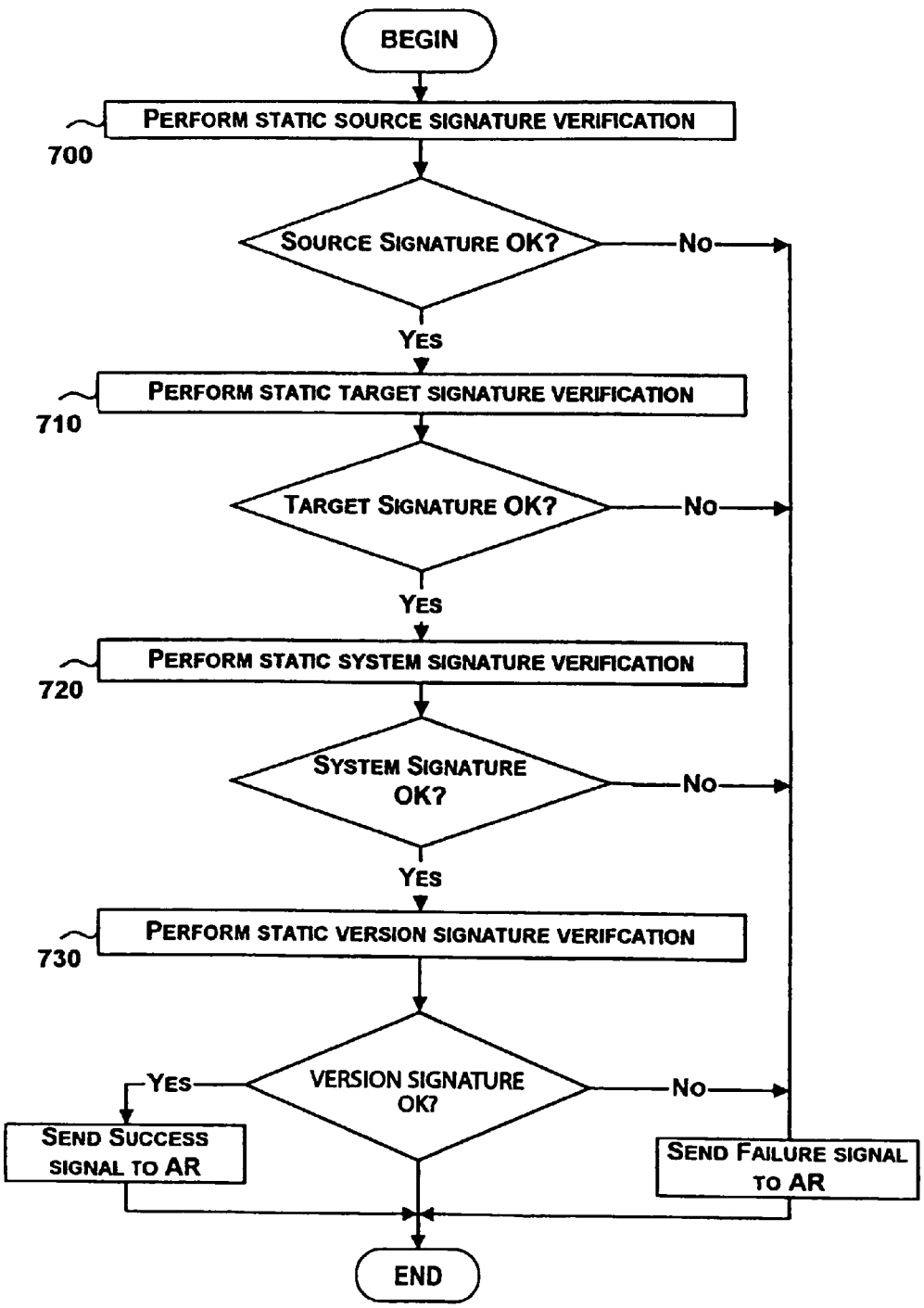
FIG. 7A: Flowchart VnV (E-zone Verification)

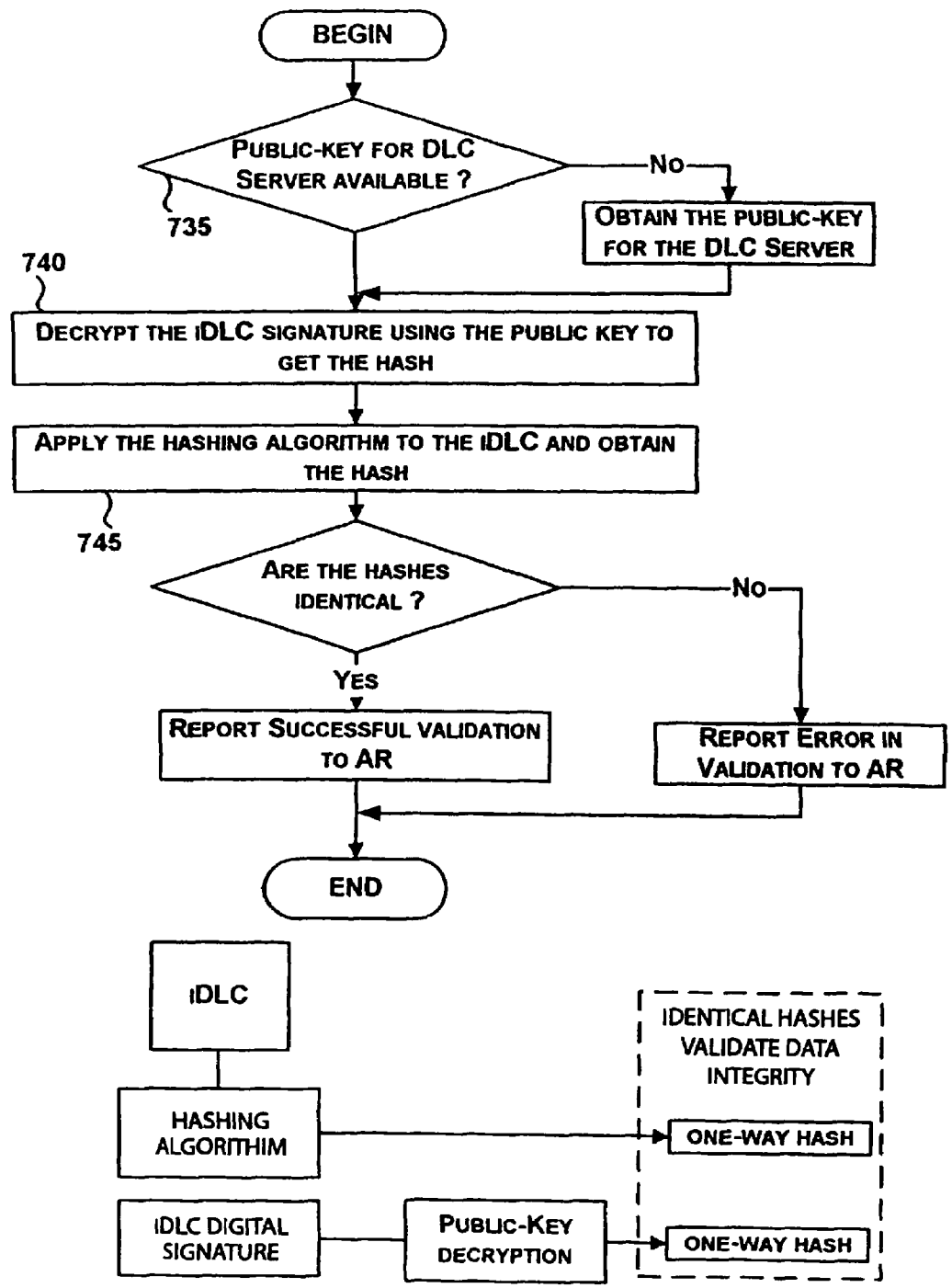
FIG. 7B: Source Signature Verification

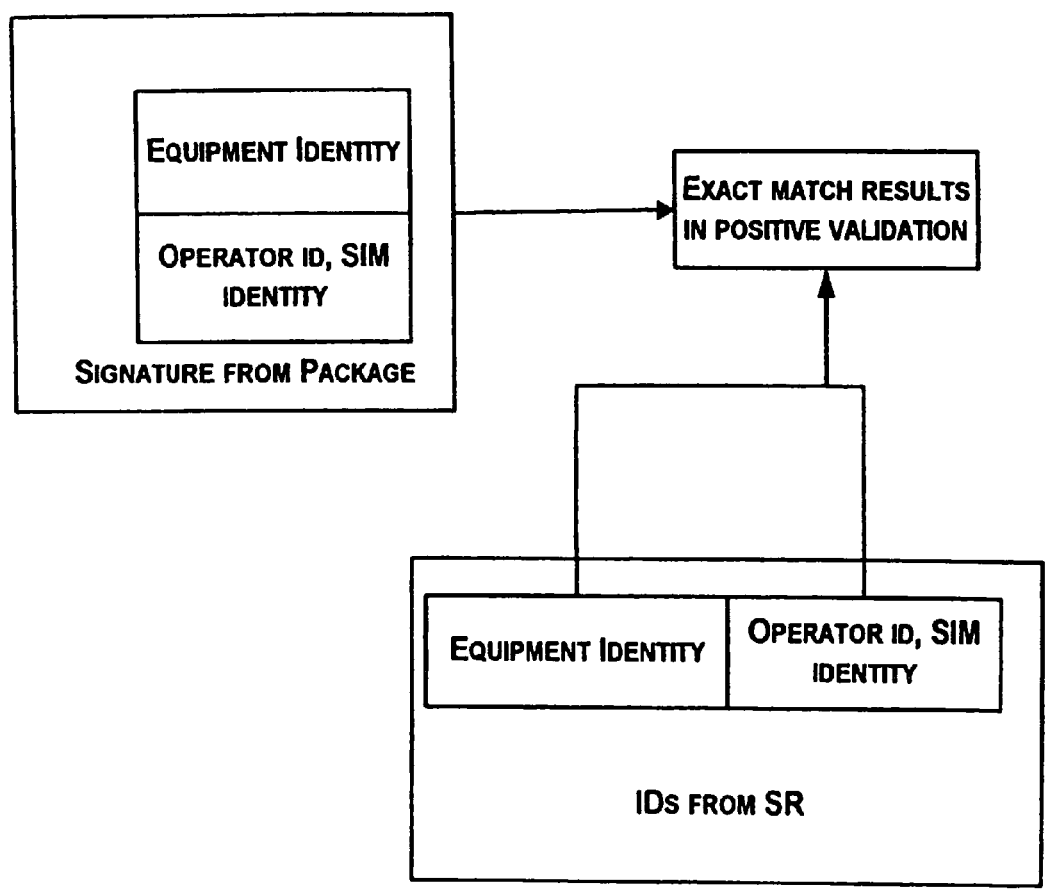
FIG. 7C: Target Signature Verification

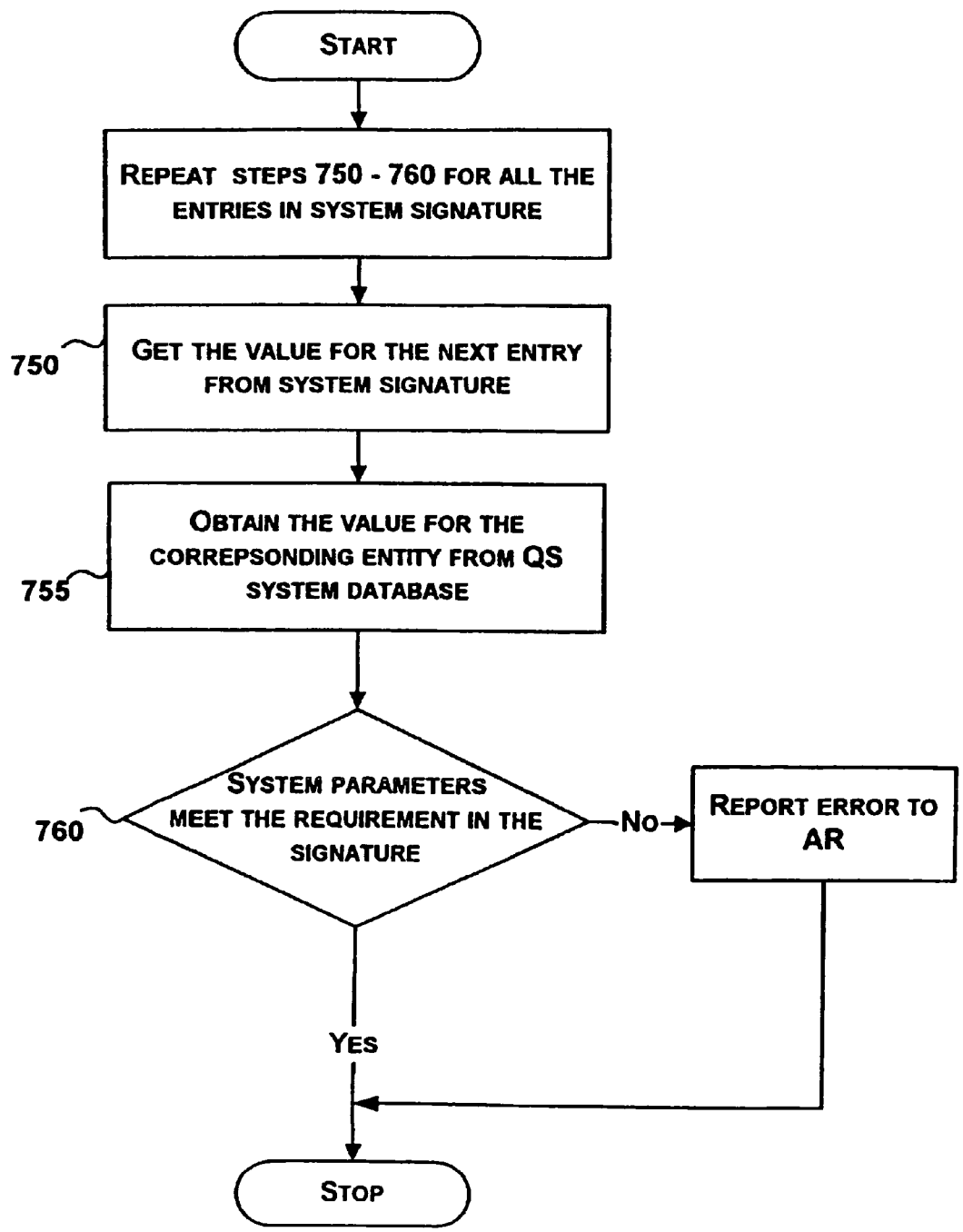
FIG. 7D: Flowchart for System Signature Verification

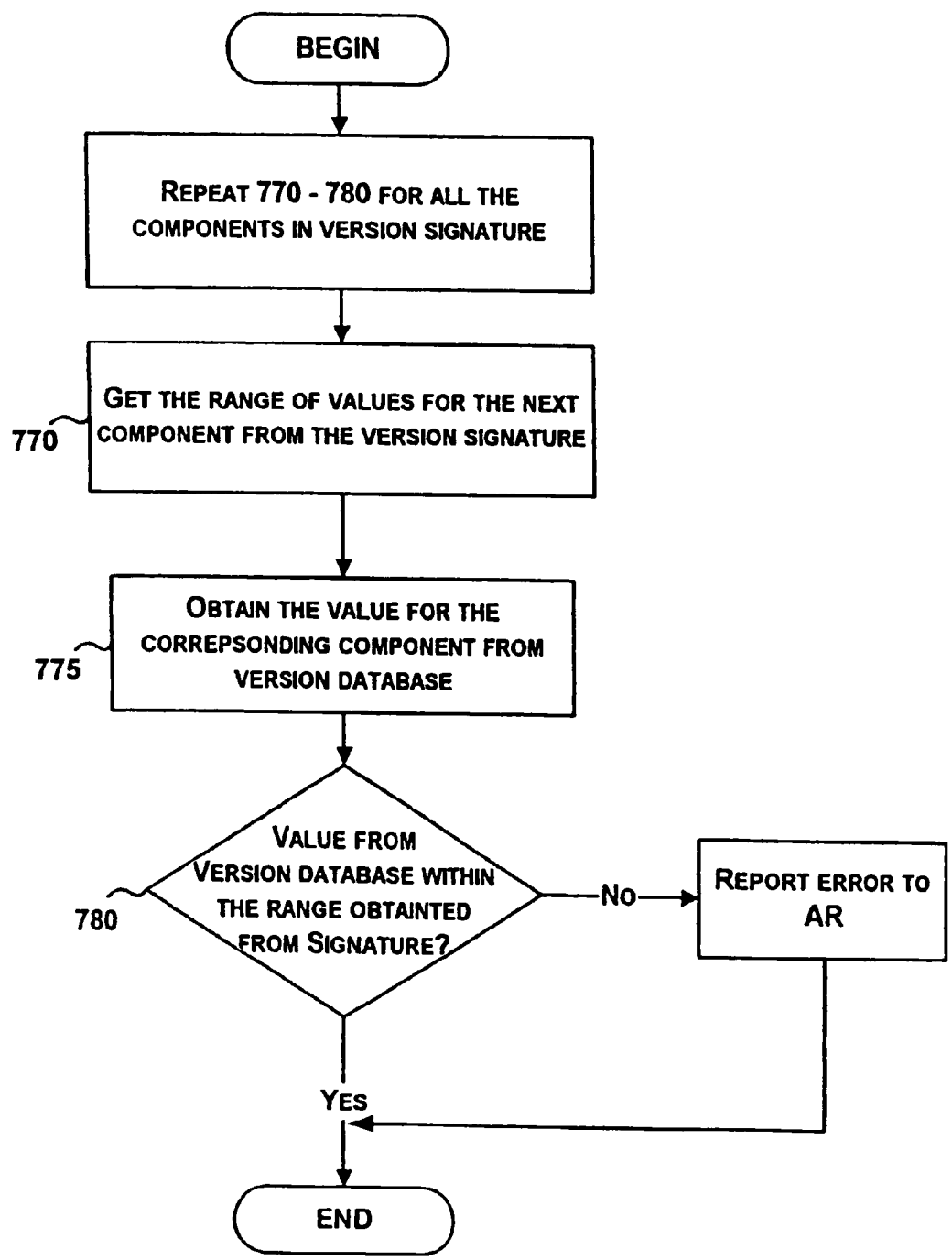
FIG. 7E: FLOWCHART FOR VERSION SIGNATURE VERIFICATION

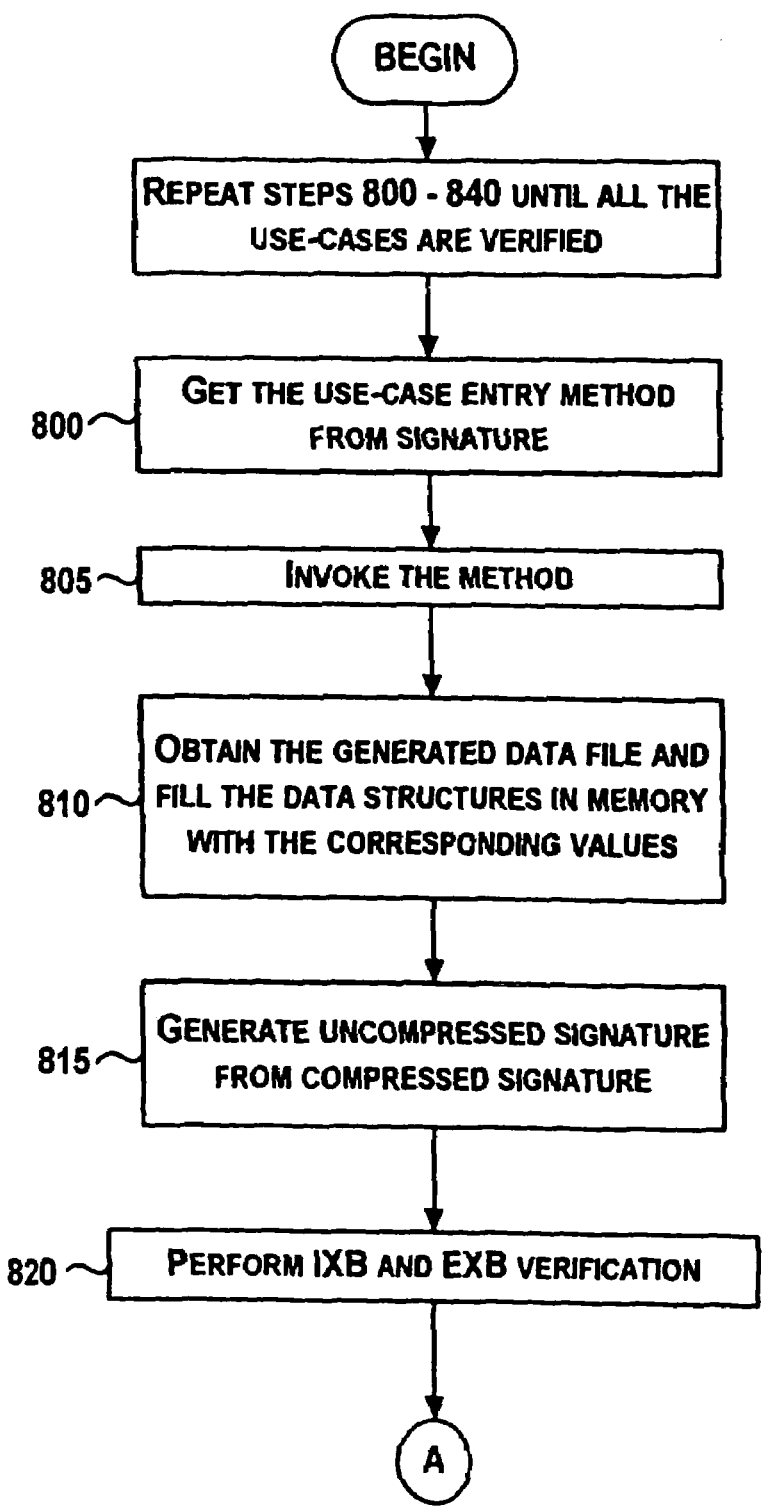
FIG. 8A: FLOWCHART VnV (V-ZONE VERIFICATION)

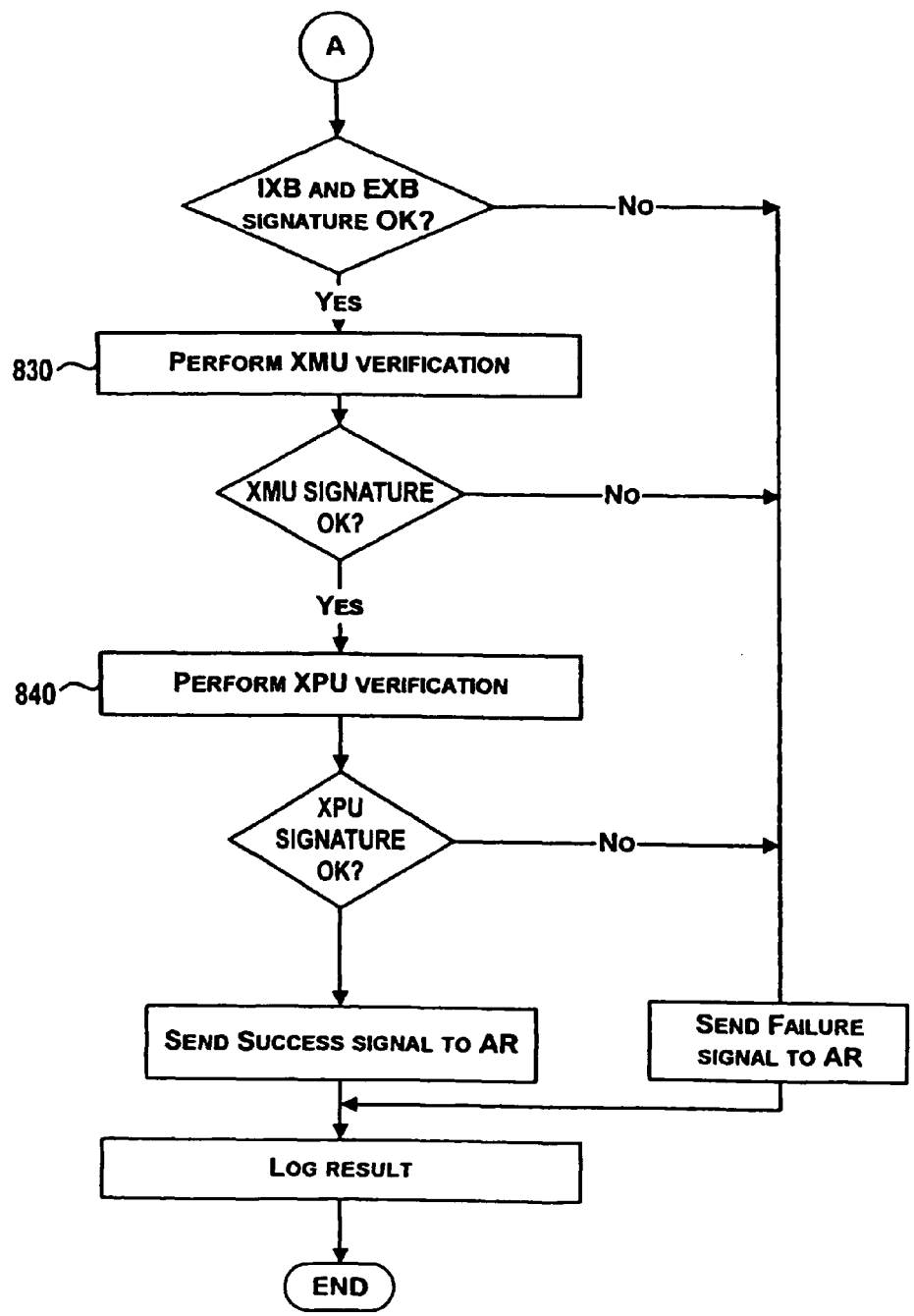
FIG. 8A: Flowchart VnV (V-zone Verification) (Contd.)

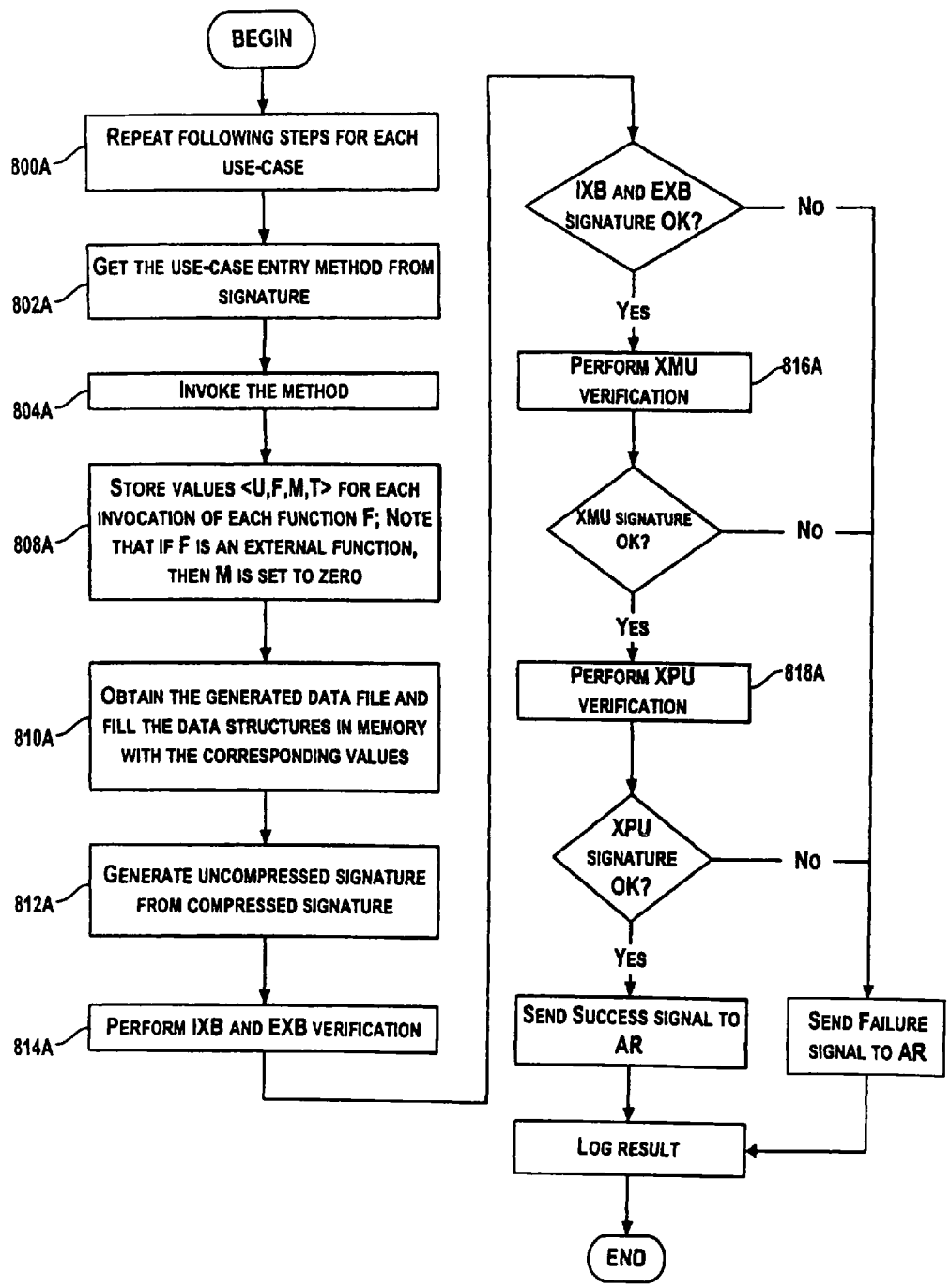
FIG. 8A1: FLOWCHART VNV (V-ZONE VERIFICATION) - CONTD.

FIG. 8B: GENERATED DATA FOR DYNAMIC SIGNATURE VERIFICATION

| FUNCTION ID | F10 | F12 | F10 | F12 | F12 | E5 |
|---|---|---|---|---|---|---|
| MEMORY | 30 | 40 | 20 | 0 | 0 | NA |
| EXECUTION TIME ($\mu$S) | 50 | 20 | 40 | 18 | 24 | NA |
| USE-CASE ID | 12 | 12 | 12 | 12 | 12 | 12 |

845

FIG. 8B1: GENERATED DATA FOR DYNAMIC SIGNATURE VERIFICATION - CONTD.

| FUNCTION ID | F10 | F12 | F10 | F12 | F12 | E5 |
|---|---|---|---|---|---|---|
| MEMORY | 30 | 40 | 20 | 0 | 0 | NA |
| EXECUTION TIME (μs) | 50 | 20 | 40 | 18 | 24 | 30 |
| USE-CASE ID | 12 | 12 | 12 | 12 | 12 | 12 |

820B

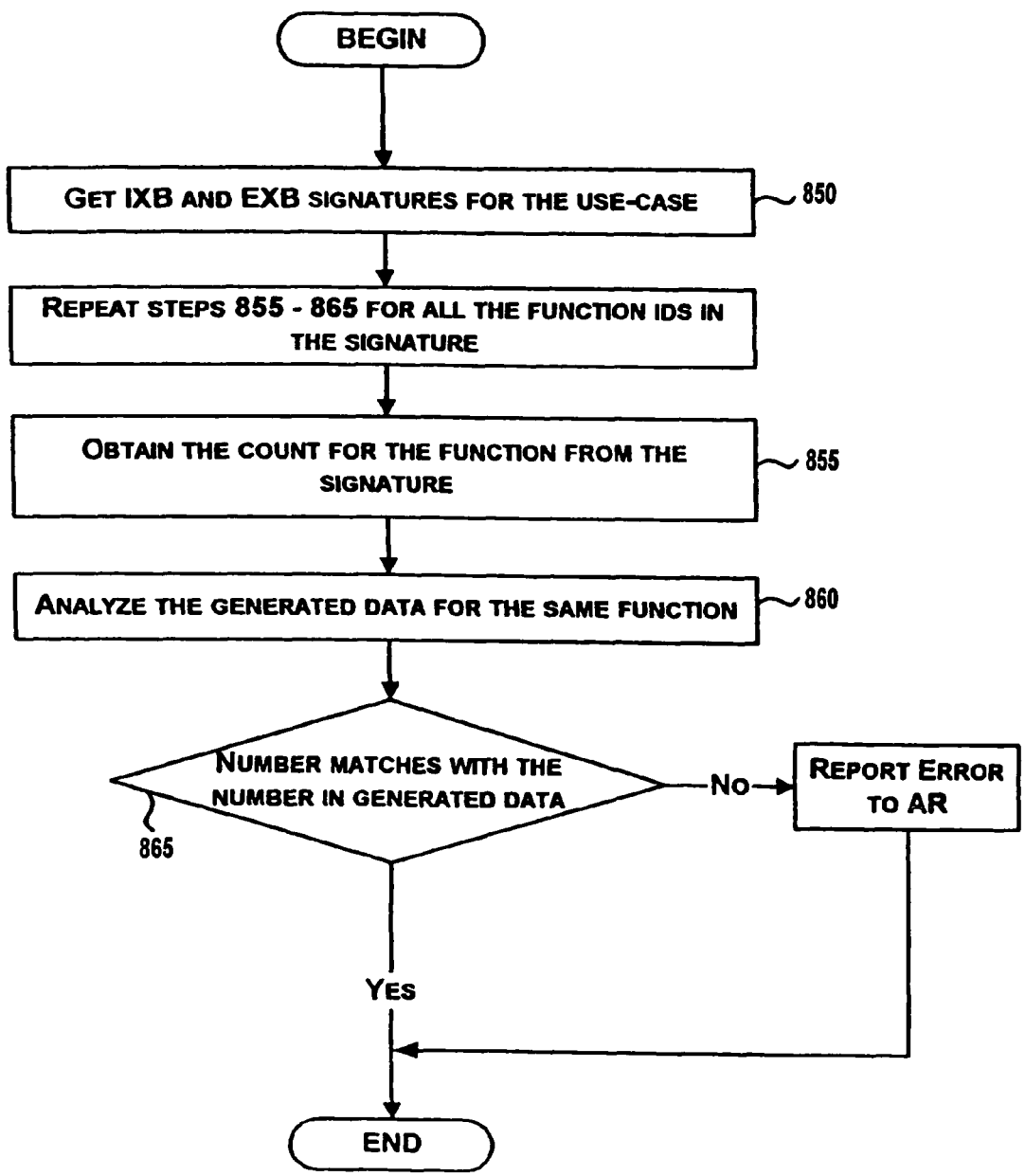
FIG. 8C: IXB AND EXB VERIFICATION (V-ZONE)

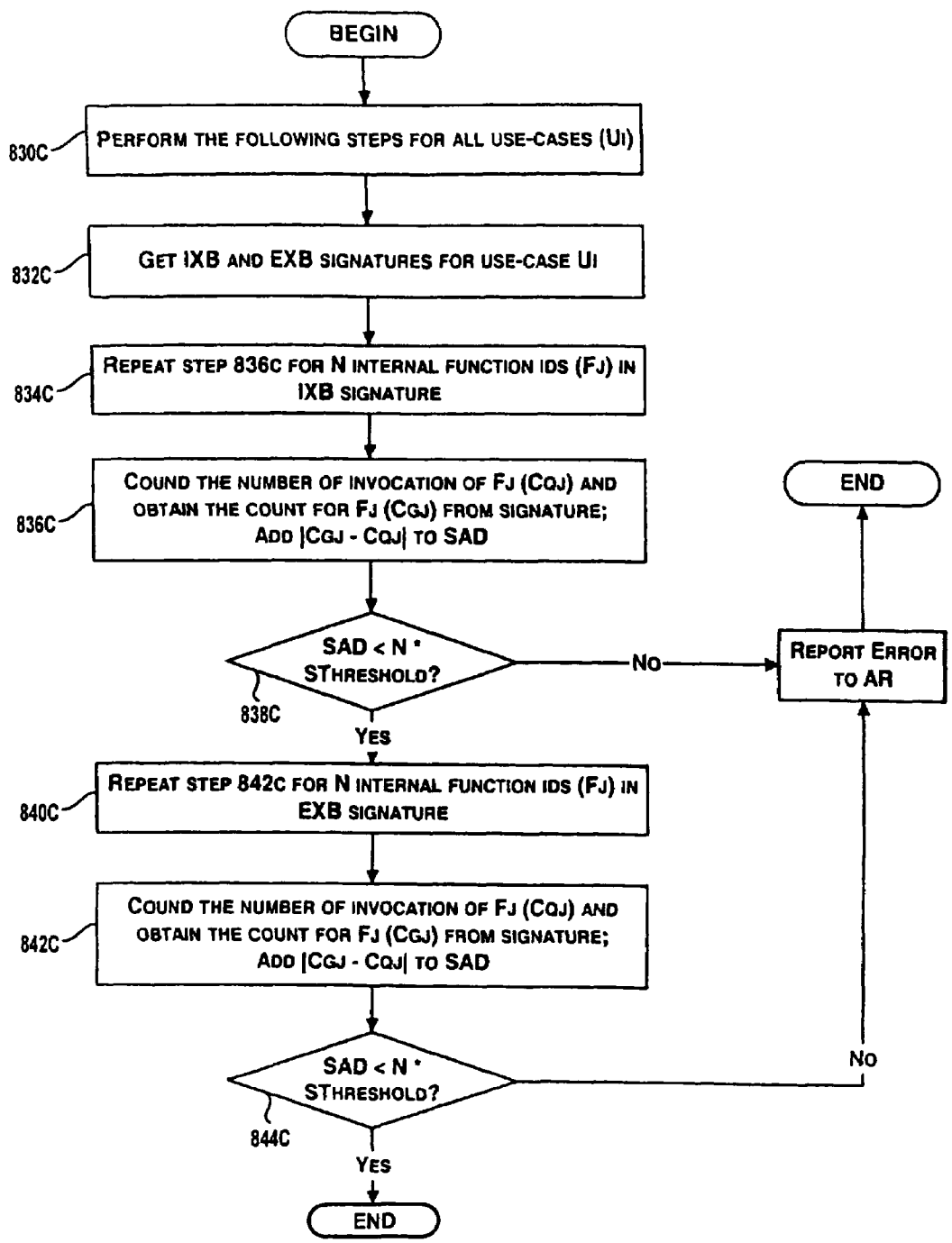

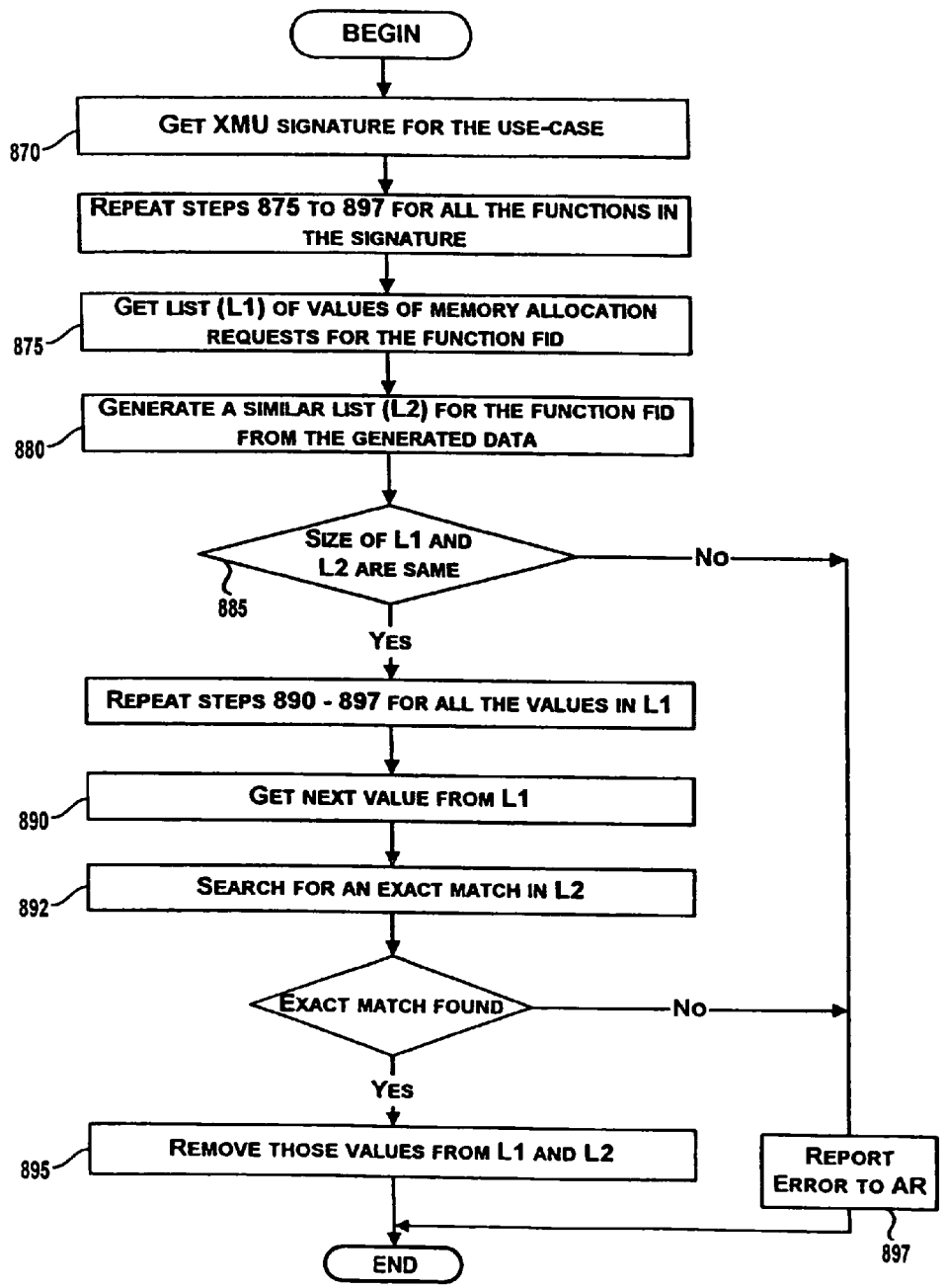

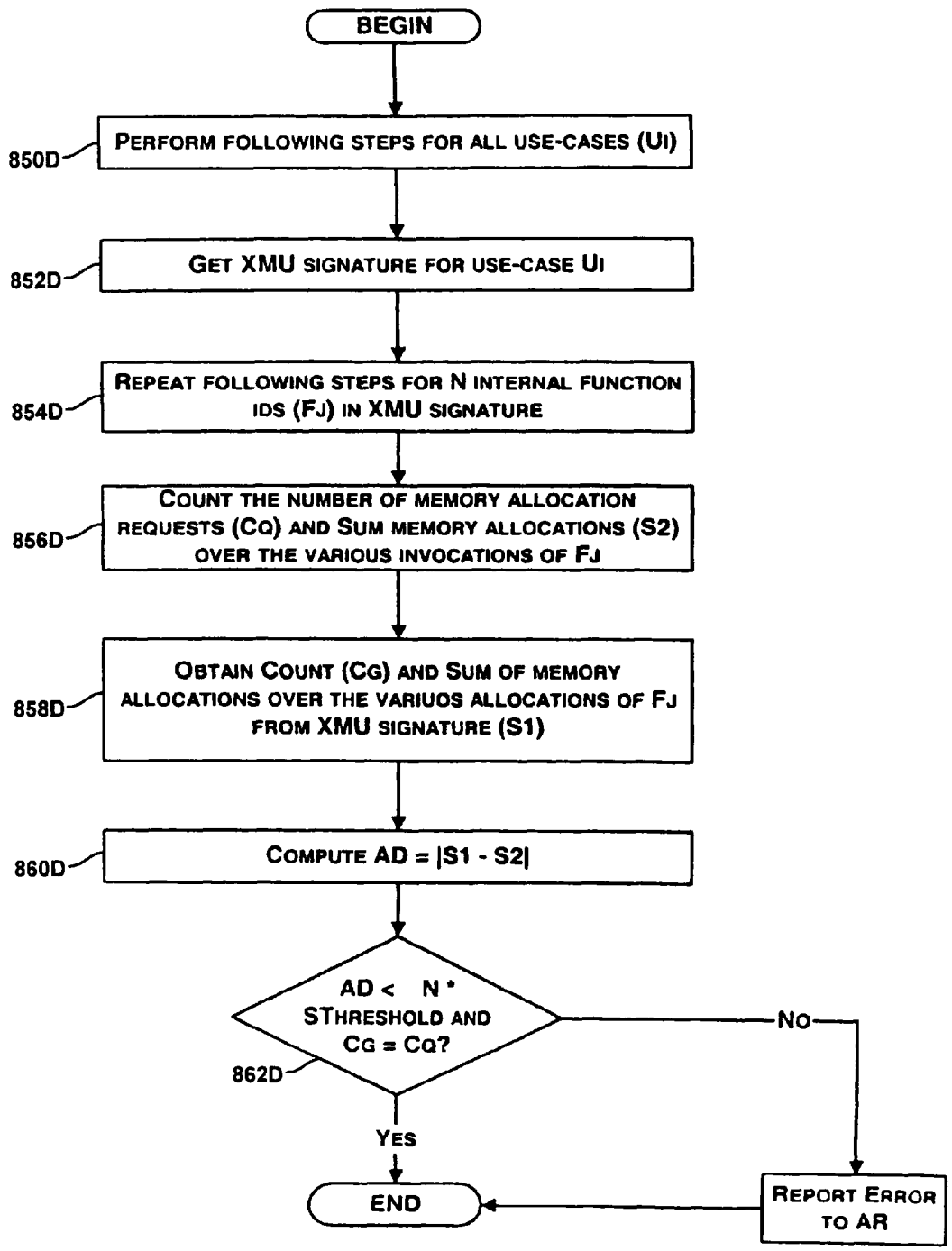
FIG. 8D1: XMU Verification (V-zone) - Contd.

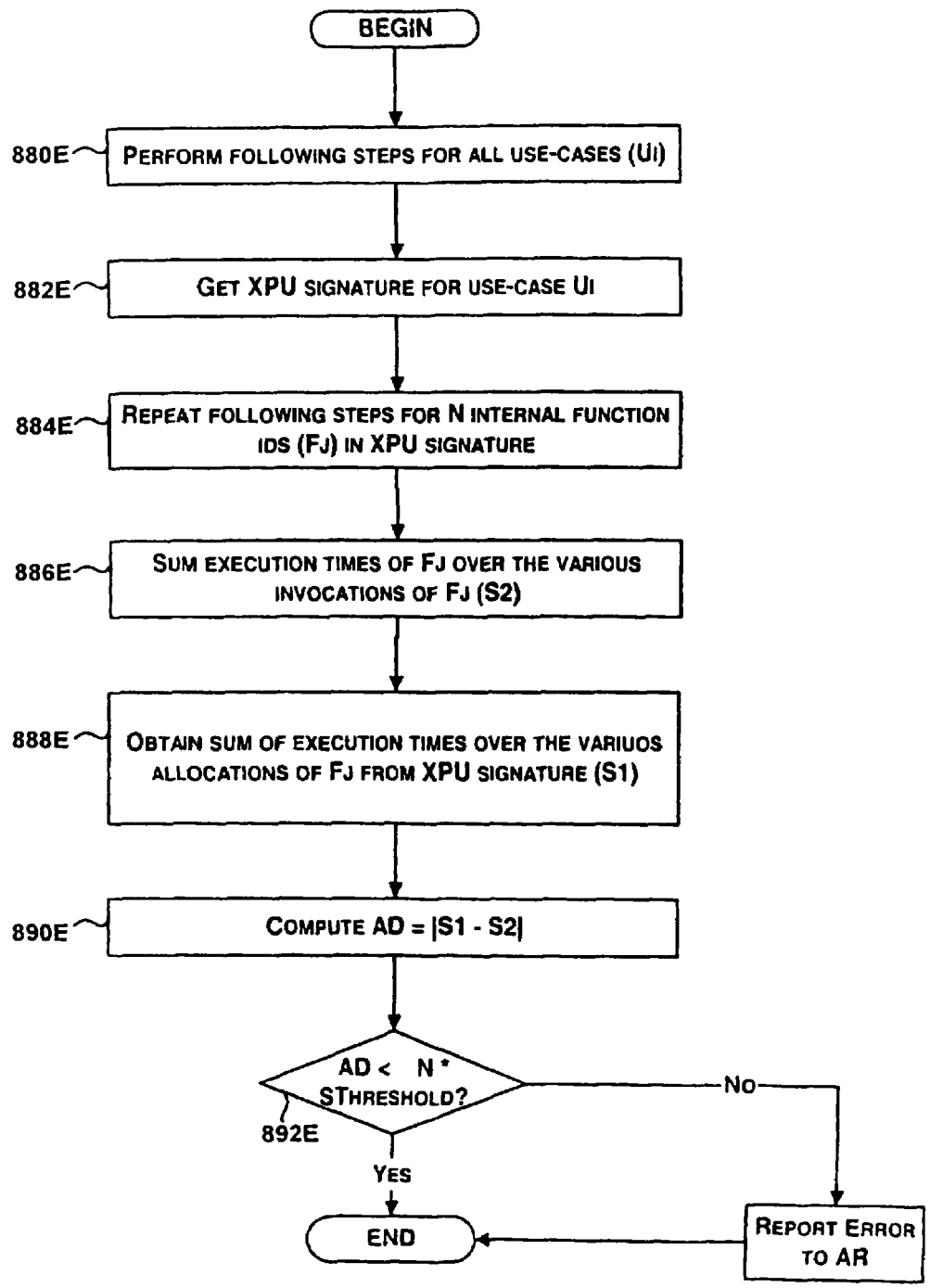

FIG. 9A: NOTATIONS USED IN XPU VERIFICATION ALGORITHM (V-ZONE)

FOR A FUNCTION IN A USE-CASE
$X_I$: SET OF EXECUTION TIMES FOR MULTIPLE INVOCATIONS FROM THE SIGNATURE
$Y_I$: SET OF EXECTUION TIMES FOR MULTIPLE INVOCATIONS IN THE QS

P: N X N MATRIX COMPUTED WITH THE RATIO $Y_I/X_I$
C: N X 1 MATRIX DERIVED FROM P BY REPLACING THE VALUES SATISFYING THE $\delta$ CONSTRAINT WITH THEIR COLUMN NUMBERS
$C_R$: K X 1 MATRIX DERIVED FROM C; INPUT TO BACKTRACKING ALGORITHM
H: K X 1 VECTOR OBTAINED AS A RESULT OF APPLYING BACKTRACKING ALGORITHM ON G
D2: N X 1 MATRIX UPDATED FROM H USING THE SAME ROW MAPPING AS FROM C TO G
D: N X 1 MATRIX WHICH DEFINES A UNIQUE MAPPING FOR AN INVOCATION OF THE FUNCTION IN THE QS TO DEVELOPMENT ENVIRONMENT E: SET OF EPSILON VALUES OBTAINED FROM THE MAPPING DEFINED BY D
e: MEAN VALUE OF THE ELEMENTS IN E SET $G_F$: SET OF ALL e VALUES FOR MATRIX P FOR ALL FUNCTIONS
G : SET FORMED FROM VALUES IN $G_F$ SETS OF ALL FUNCTIONS
g : MEAN OF THE ELEMENTS OF G VECTOR

FIG. 9A1: NOTATIONS USED IN XPU - 2 VERIFICATION ALGORITHM (V-ZONE) - CONT

FOR A FUNCTION IN A USE-CASE
XI: SET OF EXECUTION TIMES FOR MULTIPLE INVOCATIONS FROM THE SIGNATURE
YI: SET OF EXECTUION TIMES FOR MULTIPLE INVOCATIONS IN THE QS

P: N X N MATRIX COMPUTED WITH THE RATIO YI/XI
C: N X 1 MATRIX DERIVED FROM P BY REPLACING THE VALUES SATISFYING THE δ CONSTRAINT WITH THEIR COLUMN NUMBERS
CR: K X 1 MATRIX DERIVED FROM C; INPUT TO BACKTRACKING ALGORITHM
H: K X 1 VECTOR OBTAINED AS A RESULT OF APPLYING BACKTRACKING ALGORITHM ON G
D2: N X 1 MATRIX UPDATED FROM H USING THE SAME ROW MAPPING AS FROM C TO G
D: N X 1 MATRIX WHICH DEFINES A UNIQUE MAPPING FOR AN INVOCATION OF THE FUNCTION IN THE QS TO DEVELOPMENT ENVIRONMENT

E: SET OF EPSILON VALUES OBTAINED FROM THE MAPPING DEFINED BY D
Ē: MEAN VALUE OF THE ELEMENTS IN E SET

GF: SET OF ALL ē VALUES FOR MATRIX P

FOR ALL FUNCTIONS
G : SET FORMED FROM VALUES IN GF SETS OF ALL FUNCTIONS
Ḡ : MEAN OF THE ELEMENTS OF G VECTOR

FIG. 9B: - MATRIX M OF EXECUTION TIMES FOR EACH FUNCTION

XI = {X1,X2,X3,...,XN} EACH XJ BEING THE EXECUTION TIME IN THE SIGNATURE FOR DIFFERENT INVOCATIONS OF THE FUNCTION FOR THIS USE-CASE

YI = {Y1,Y2,Y3,...,YN} EACH YK BEING THE EXECUTION TIME IN QS FOR DIFFERENT INVOCATIONS.

$$P = \begin{bmatrix} Y1/X1 & Y2/X1 & Y3/X1 & ...YN/X1 \\ Y1/X2 & Y2/X2 & Y3/X2 & ...YN/X2 \\ ..................................... \\ ..................................... \\ Y1/XN & Y2/XN & Y3/XN & ...YN/XN \end{bmatrix}$$

FIG. 9B1: MATRIX M OF EXECUTION TIMES FOR EACH FUNCTION - CONTD.

$XI = \{X1, X2, X3, ..., XN\}$ EACH XJ BEING THE EXECUTION TIME IN THE SIGNATURE FOR DIFFERENT INVOCATIONS OF THE FUNCTION FOR THIS USE-CASE $YI = \{Y1, Y2, Y3, ..., YN\}$ EACH YK BEING THE EXECUTION TIME IN QS FOR DIFFERENT INVOCATIONS $$P = \begin{bmatrix} Y1/X1 & Y2/X1 & Y3/X1 & ... YN/X1 \\ Y1/X2 & Y2/X2 & Y3/X2 & ... YN/X2 \\ ........................................ \\ ........................................ \\ Y1/XN & Y2/XN & Y3/XN & ... YN/XN \end{bmatrix}$$

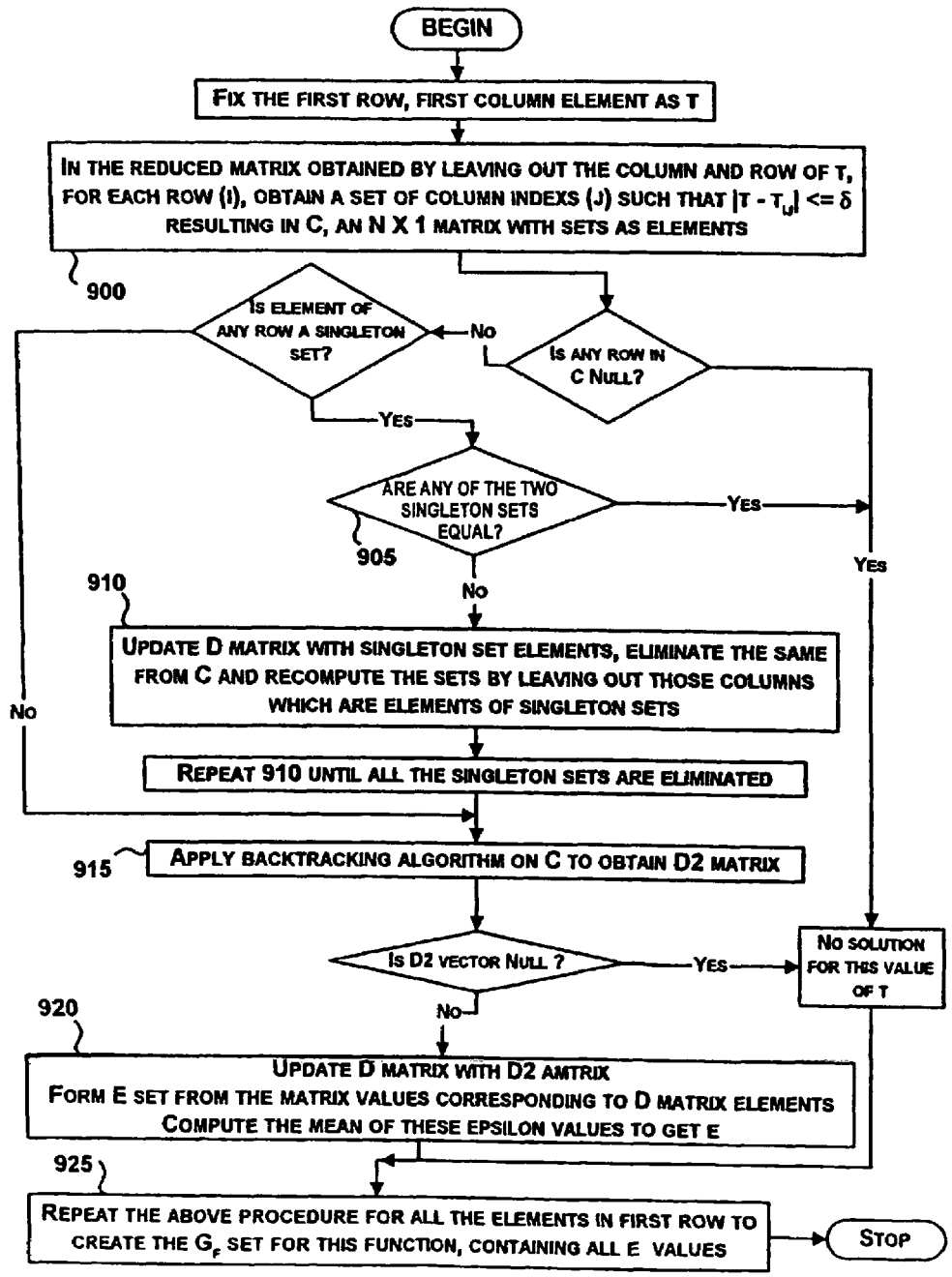

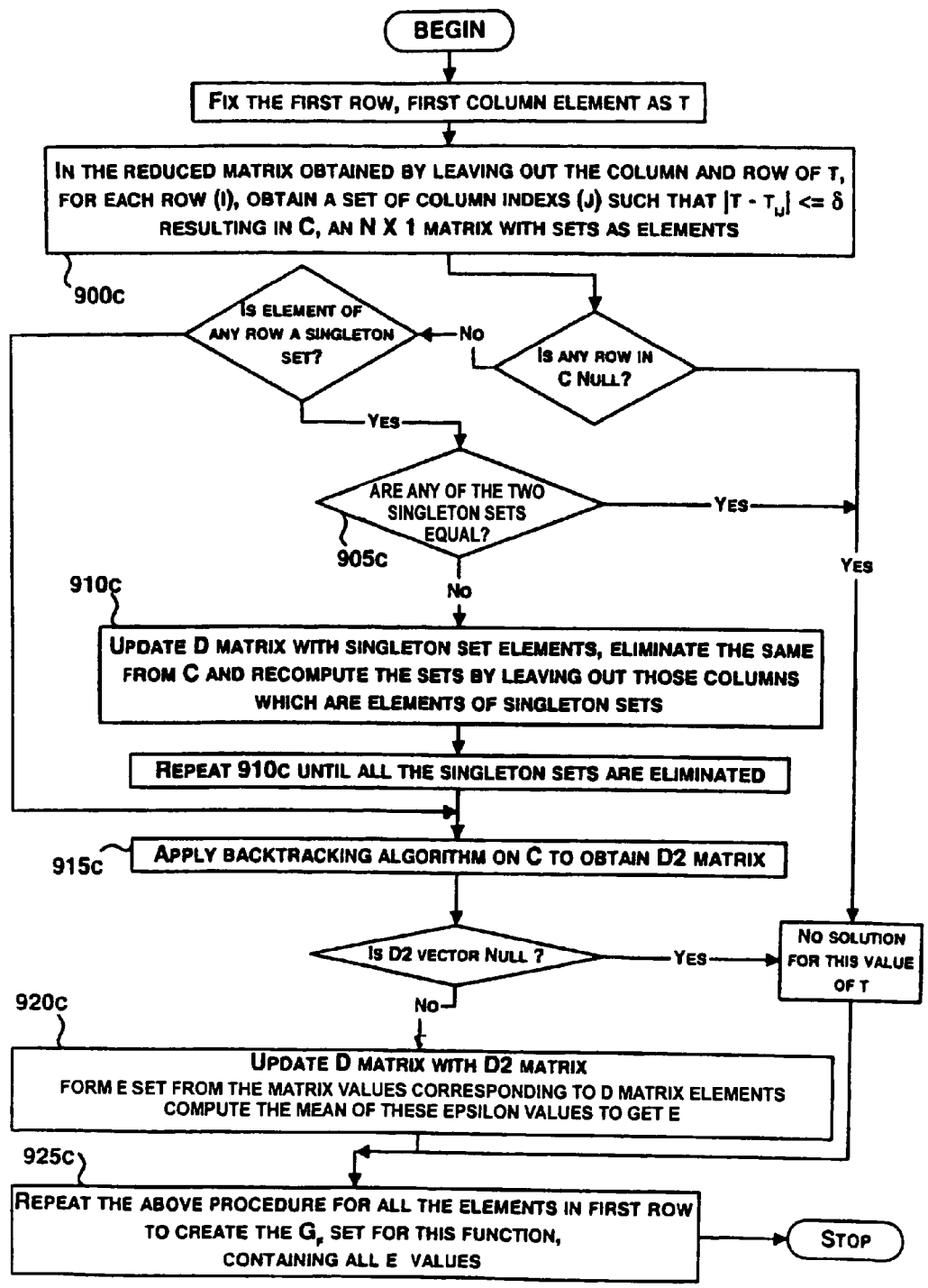
FIG. 9C1: ALGORITHM FOR CREATING THE GF SET FOR A FUNCTION GIVEN THE P MATRIX FOR THE FUNCTION - CONTD.

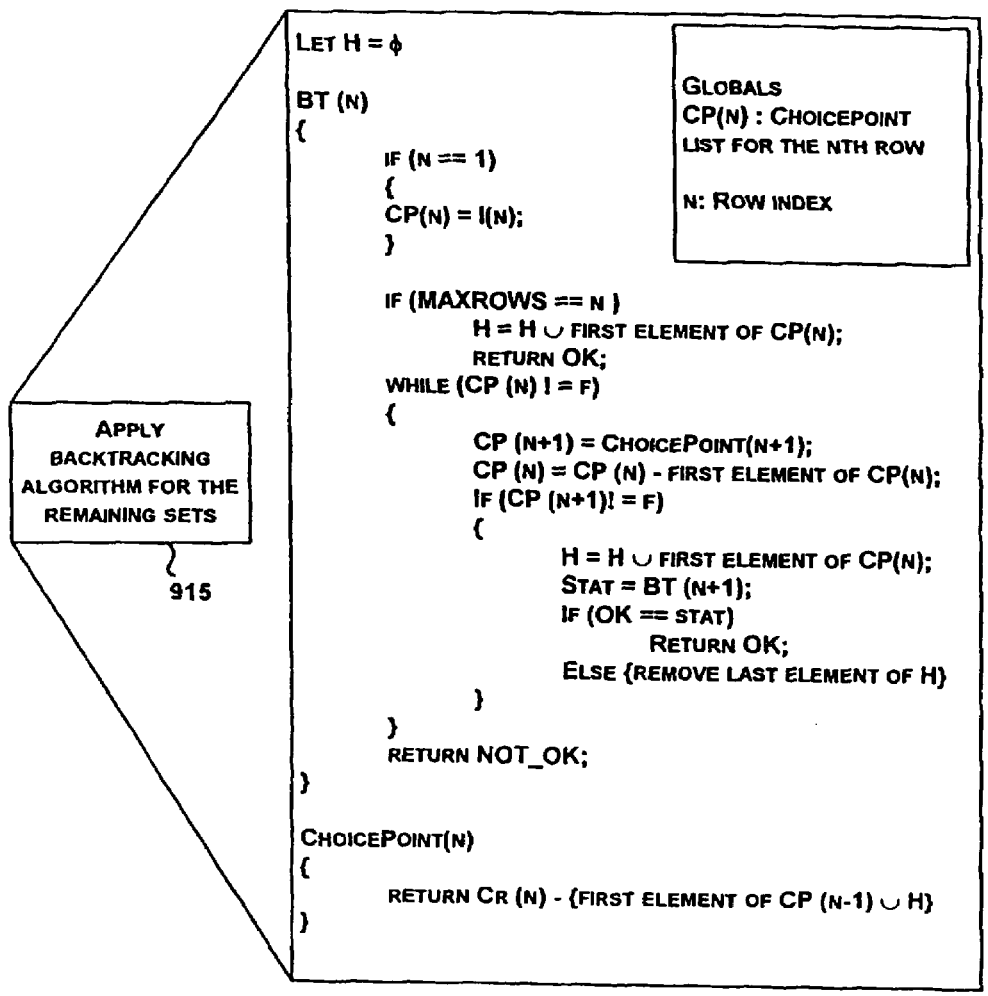
FIG. 9D: Backtracking Algorithm for Obtaining an e Solution Set

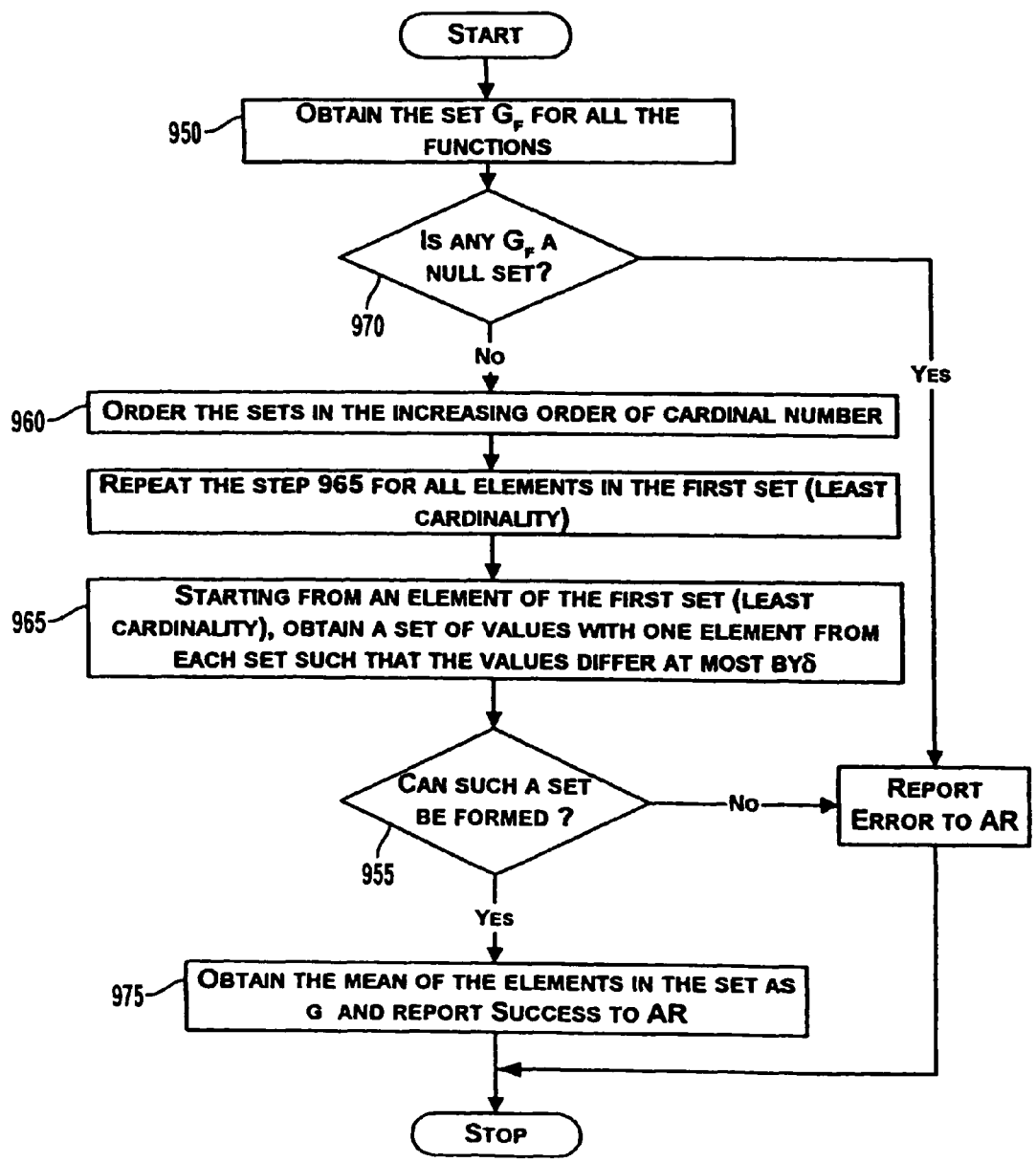
FIG. 9E: XPU Verification (V-zone)

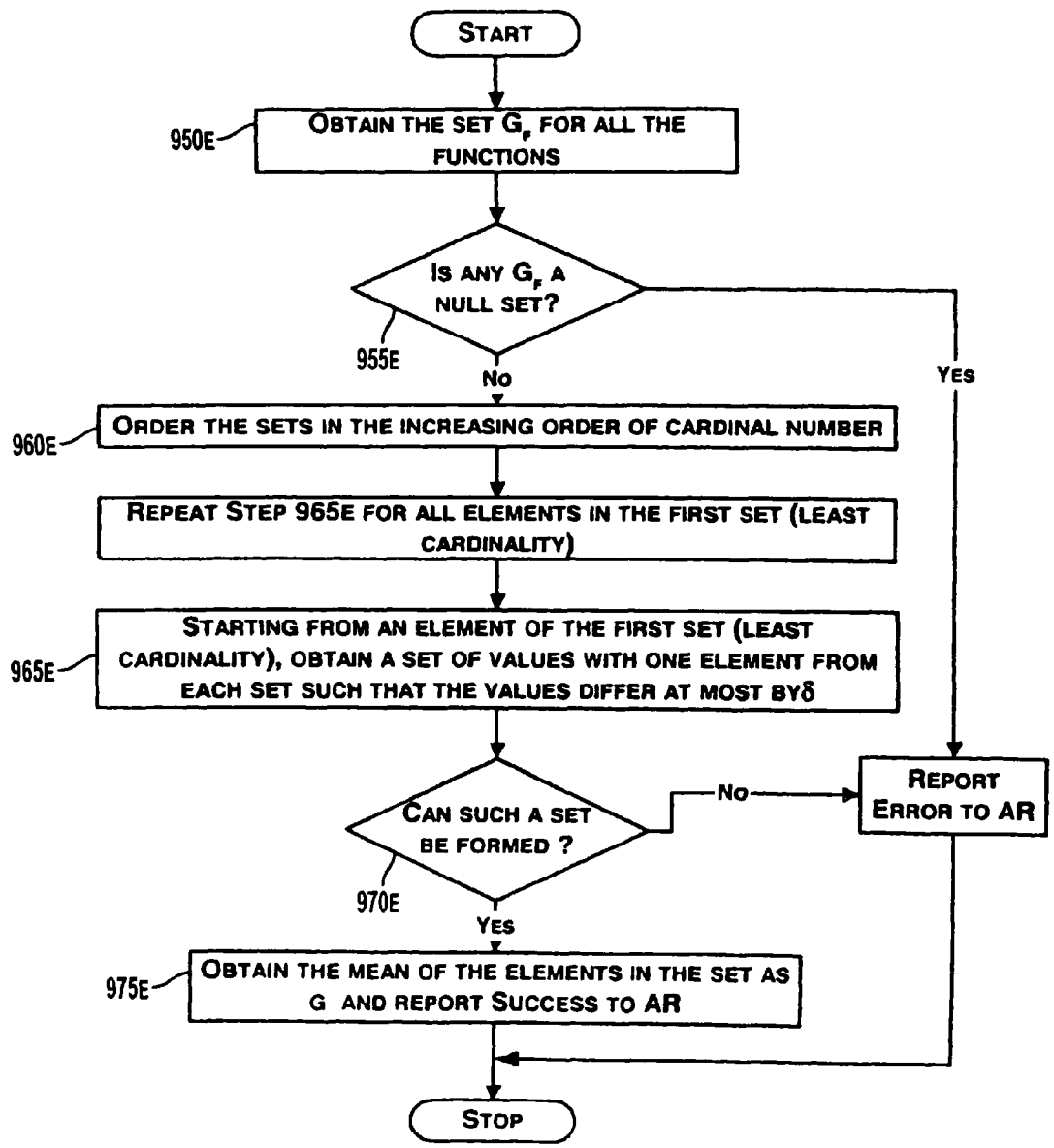
FIG. 9E1: XPU Verification - 2 (V-zone) - Contd.

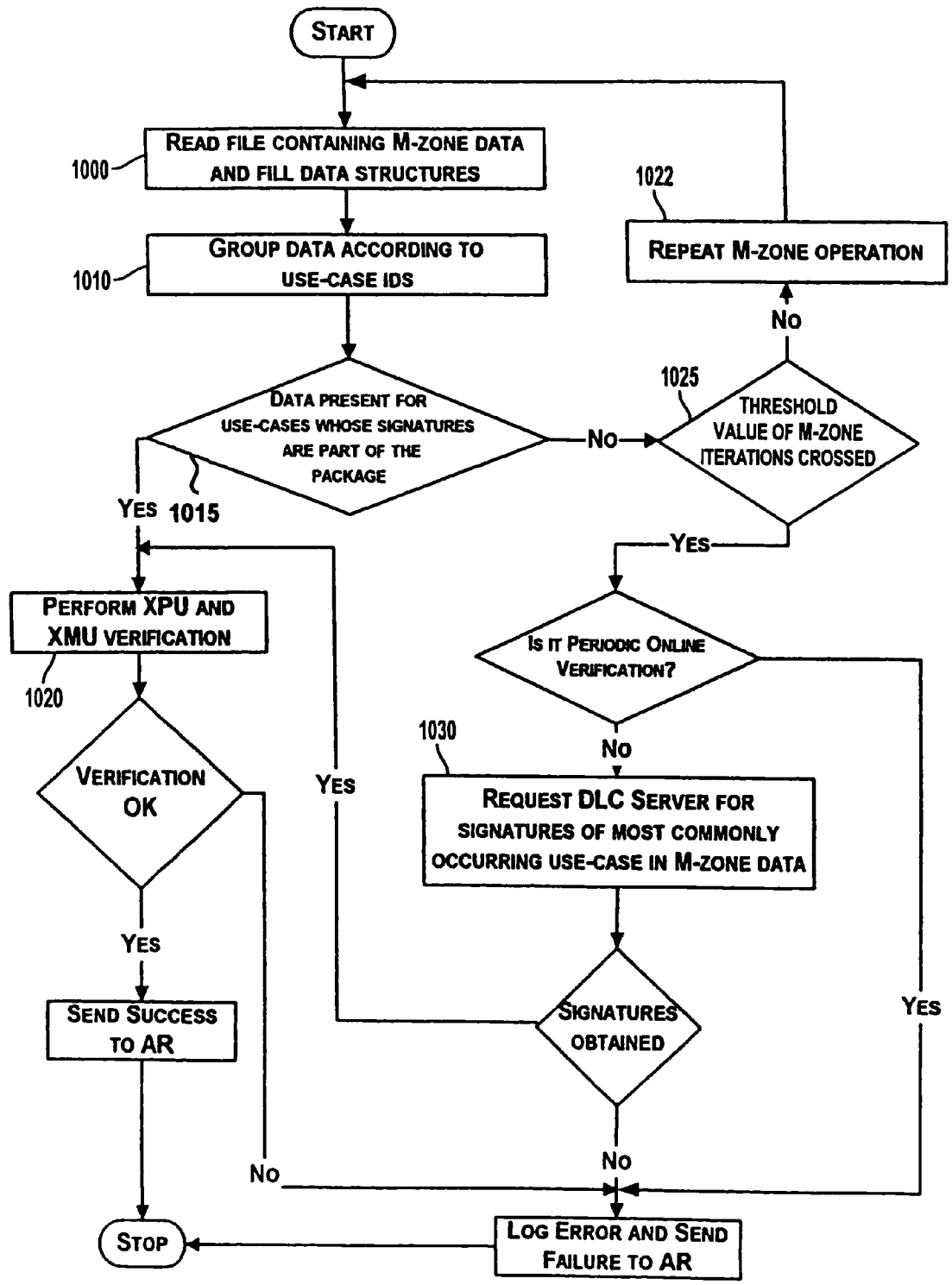
FIG. 10A: Flowchart VnV (M-zone Verification)

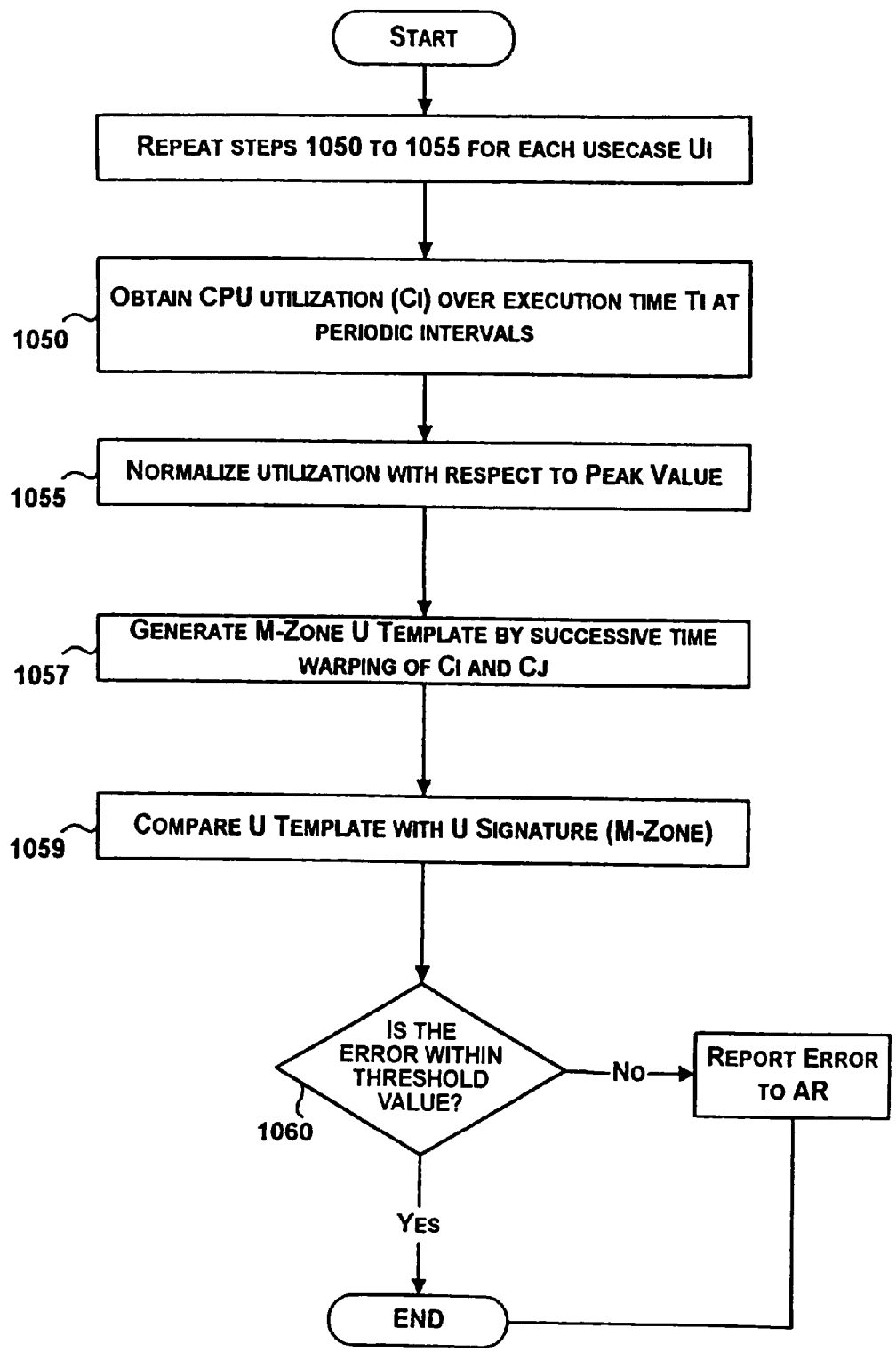
FIG. 10B1: XPU Verification (M-Zone) for Usecase U

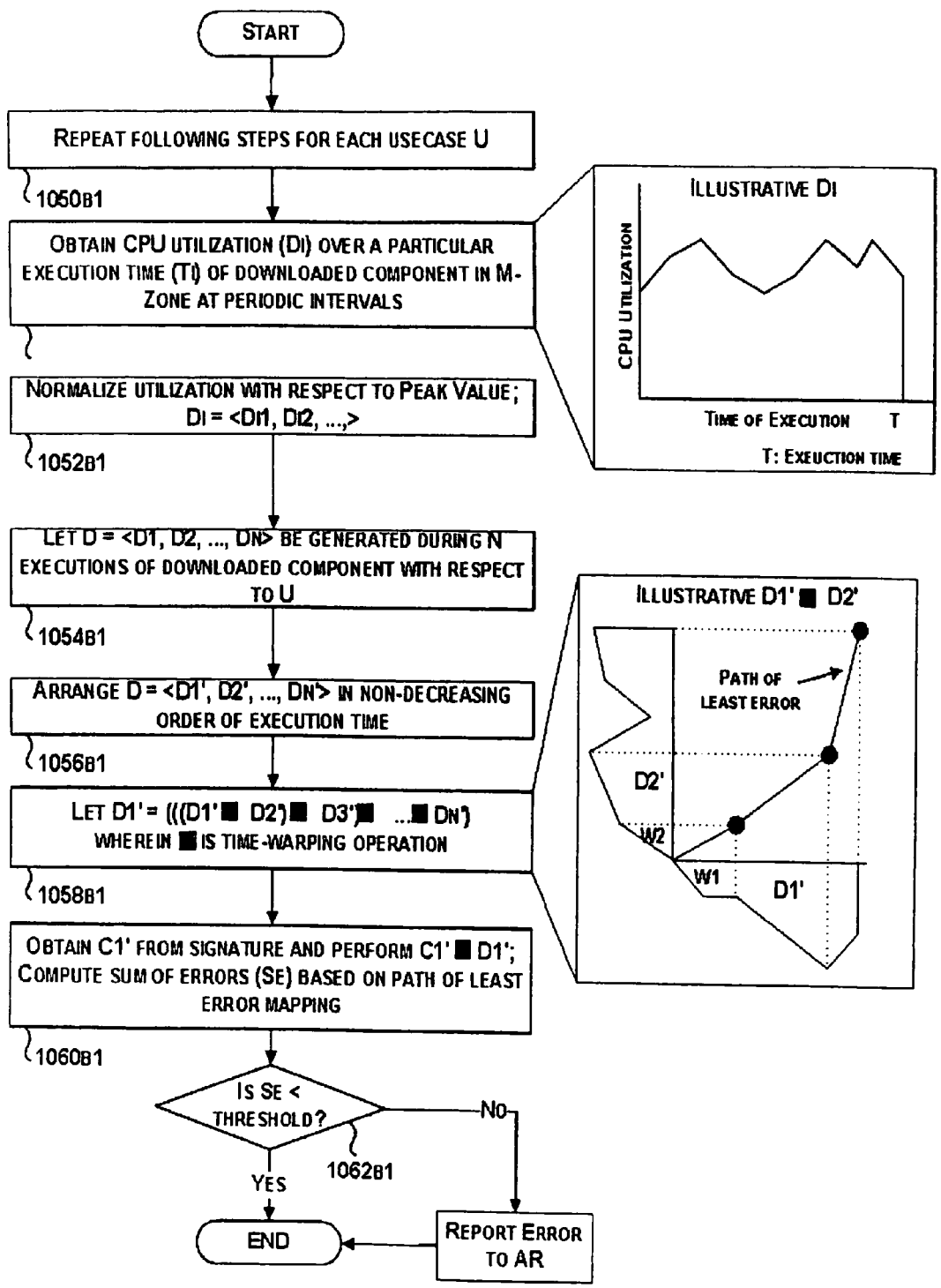
FIG. 10B1A: NXPU Verification (M-Zone) for Usecase U - Contd.

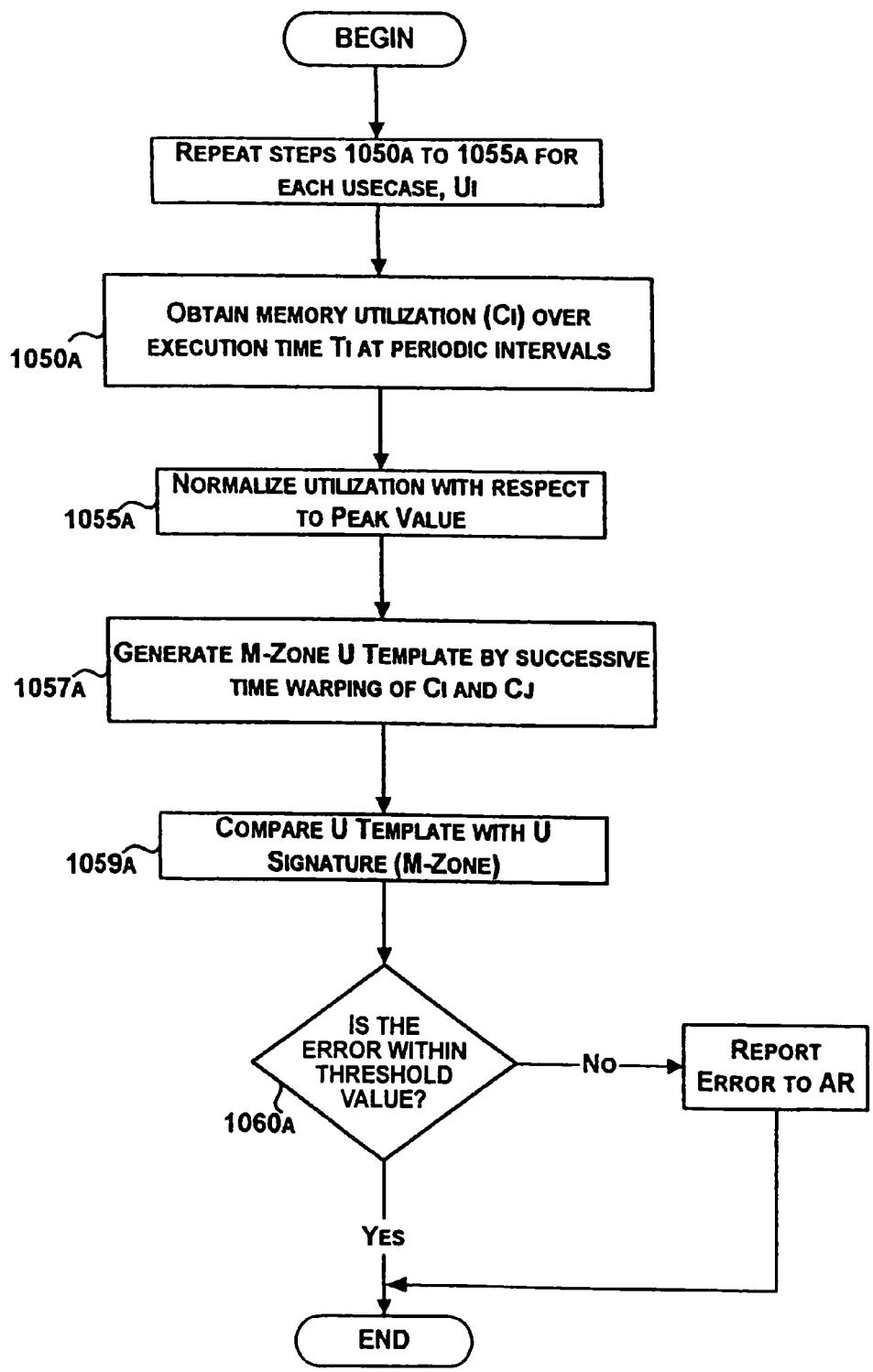
FIG. 10B2: XMU VERIFICATION (M-ZONE) FOR USECASE U

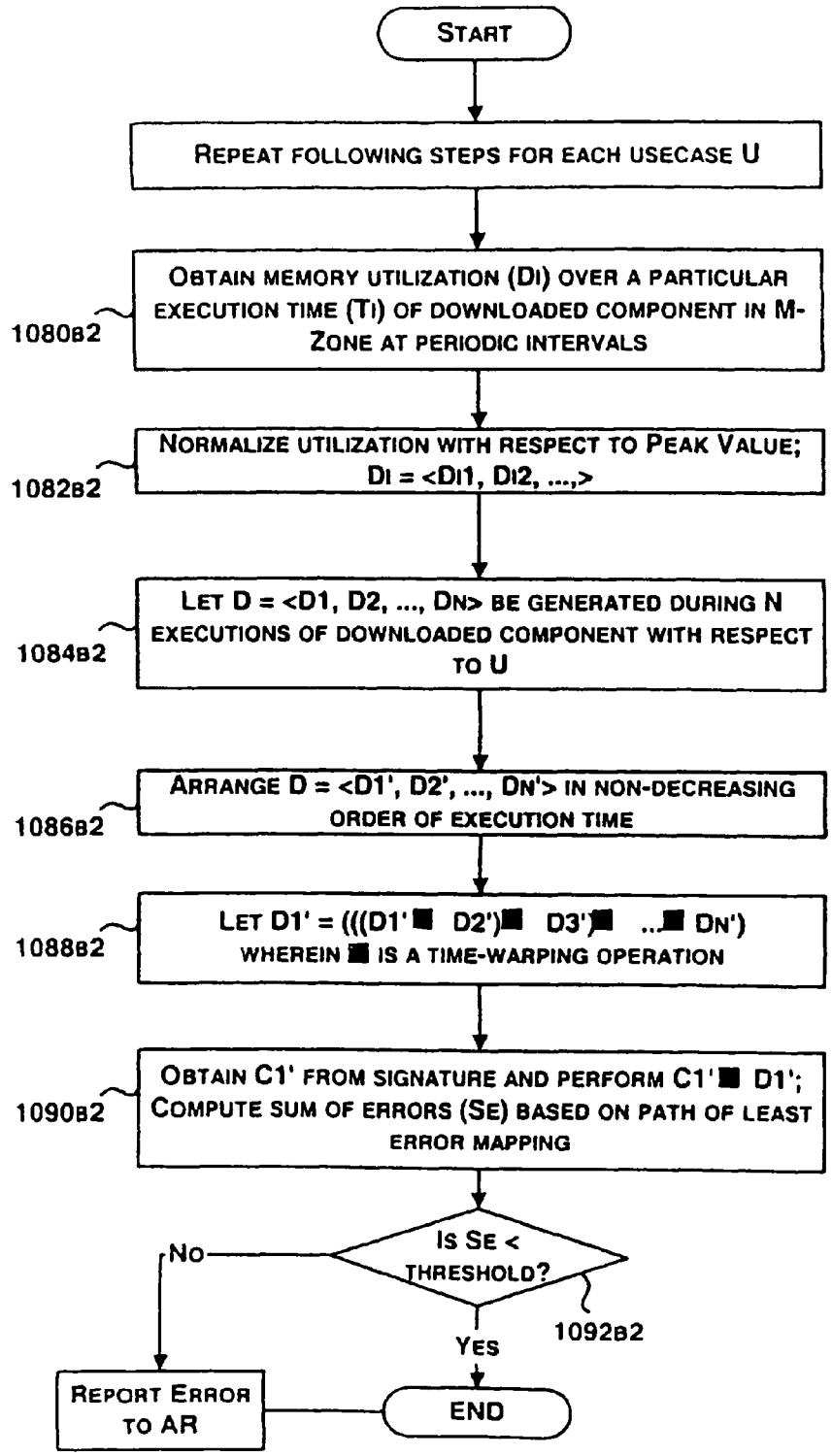
FIG. 10B2A: NXMU Verification (M-zone) for Usecase U - Contd.

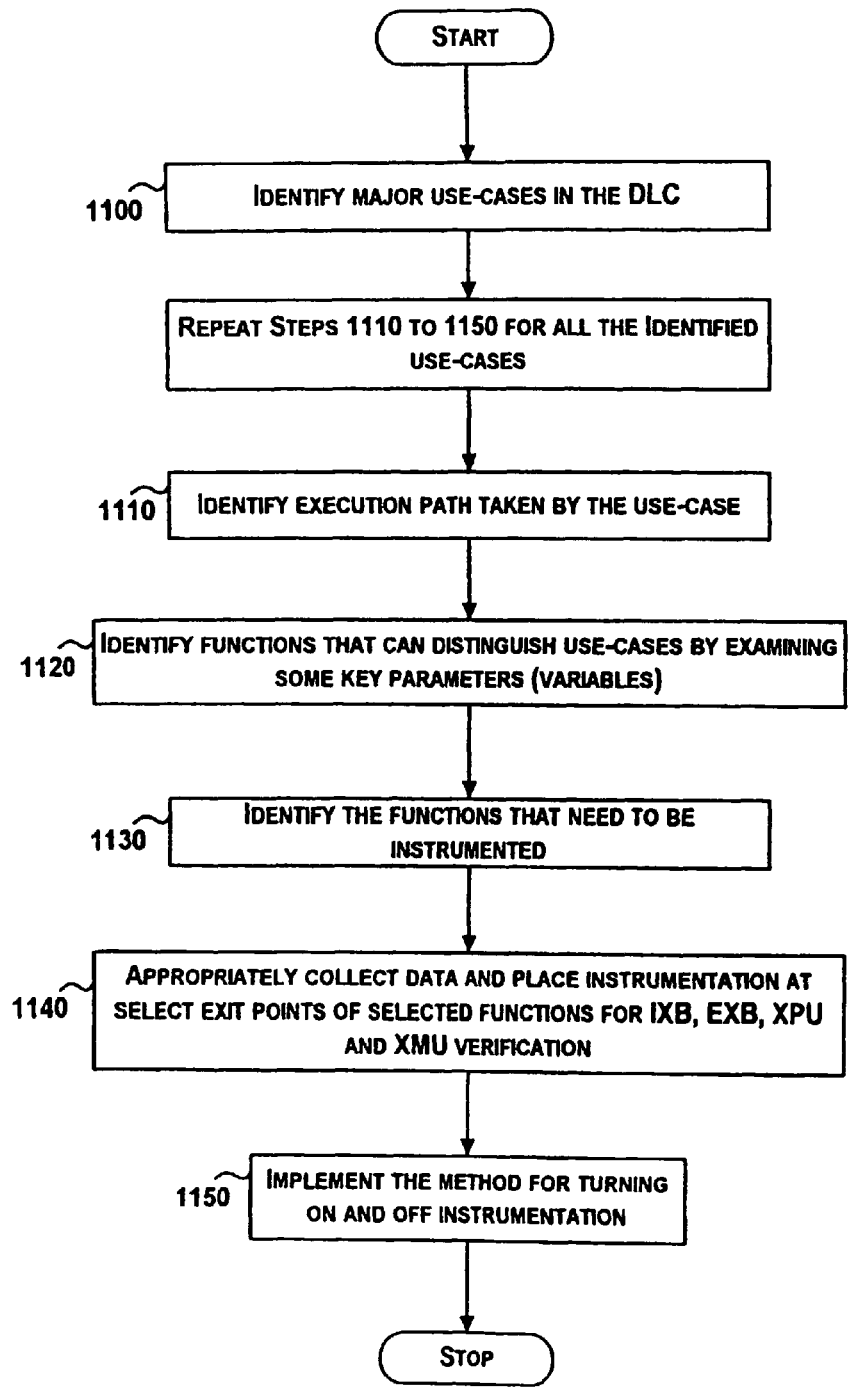
FIG. 11A: Steps in Adding Instrumentation to a Component for VnV Process

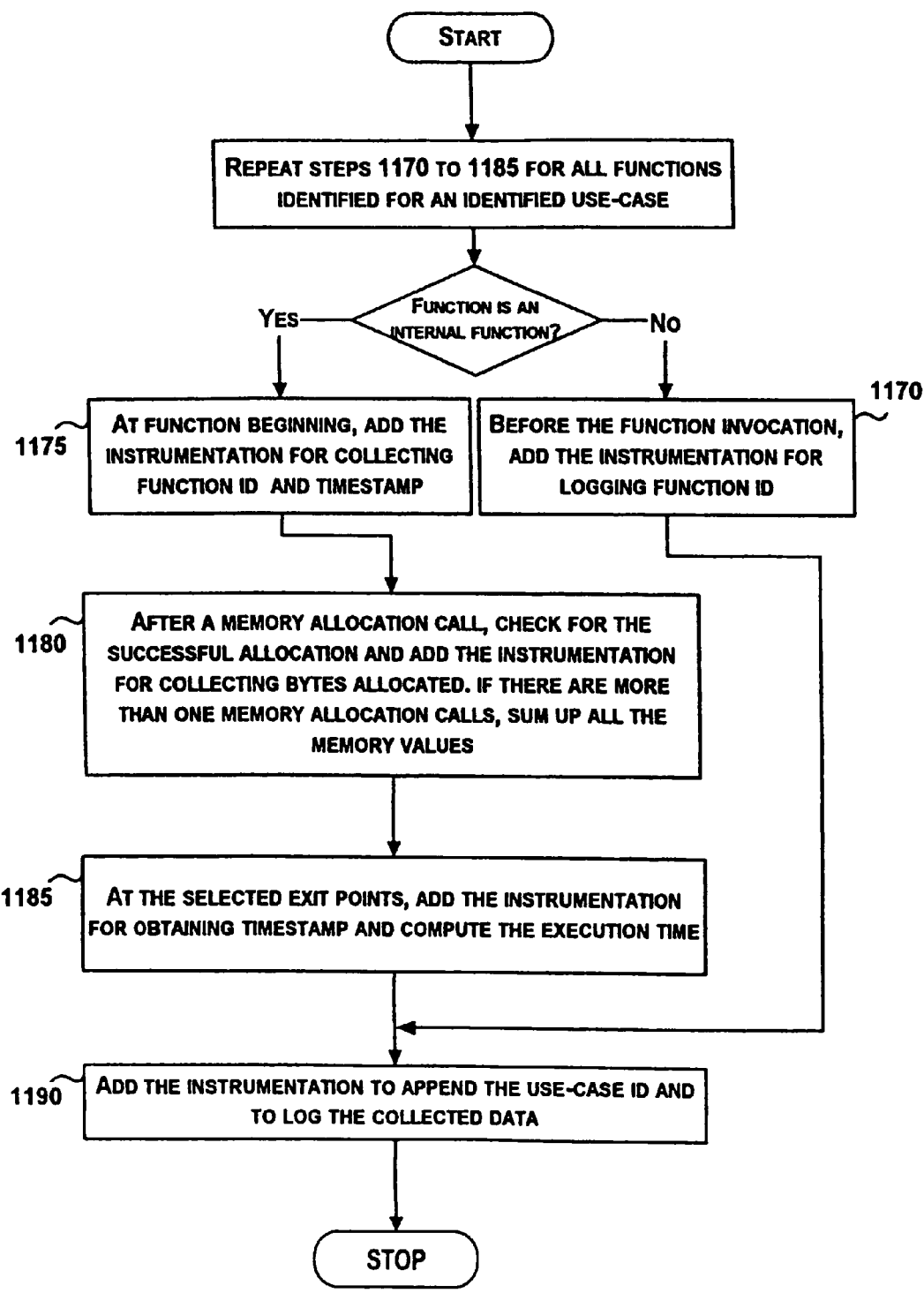
FIG. 11B: Steps in Adding Instrumentation to a Function

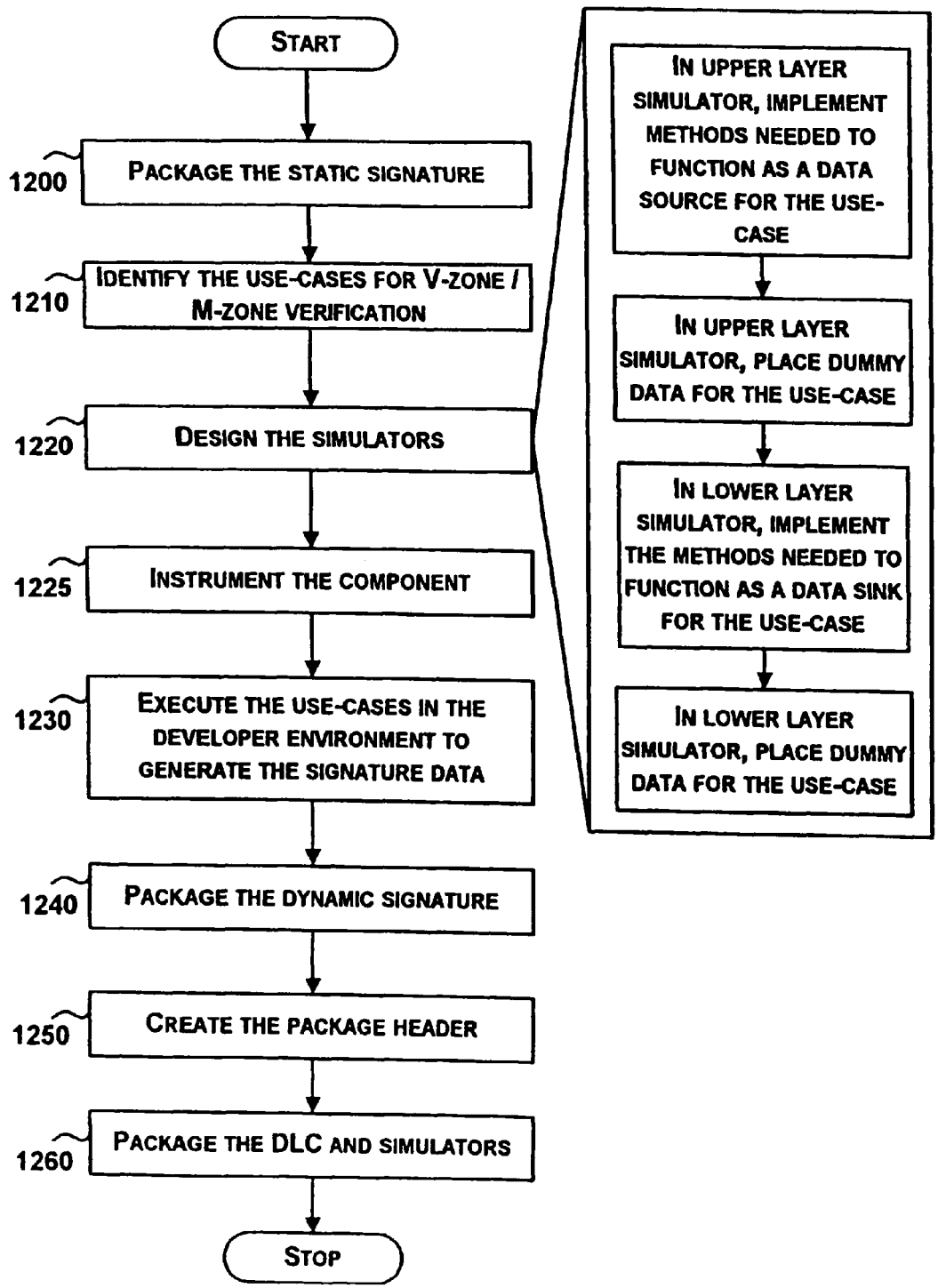
FIG. 12 - Flowchart for Packaging a DLC

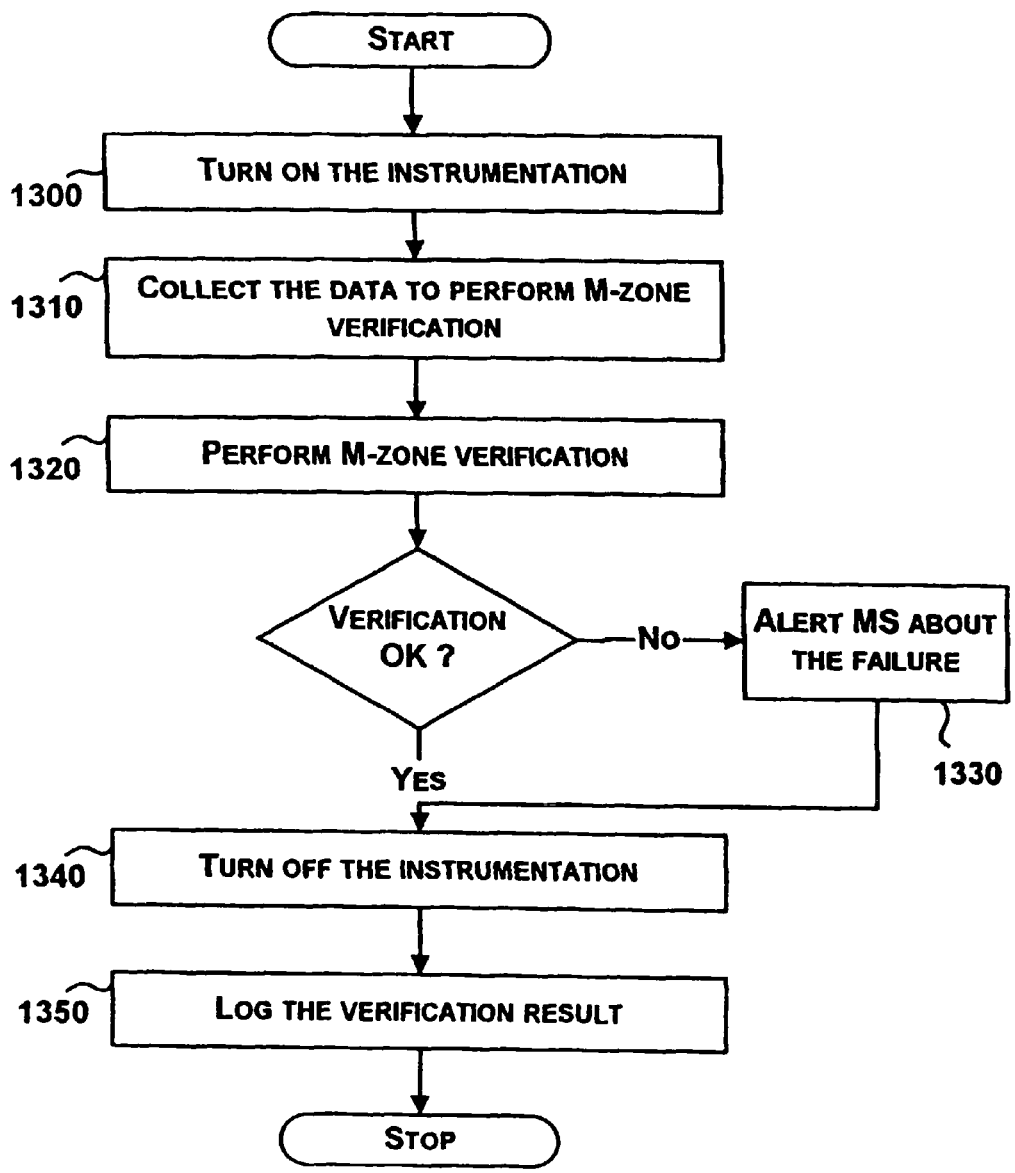
FIG. 13: PERIODIC ONLINE VERIFICATION

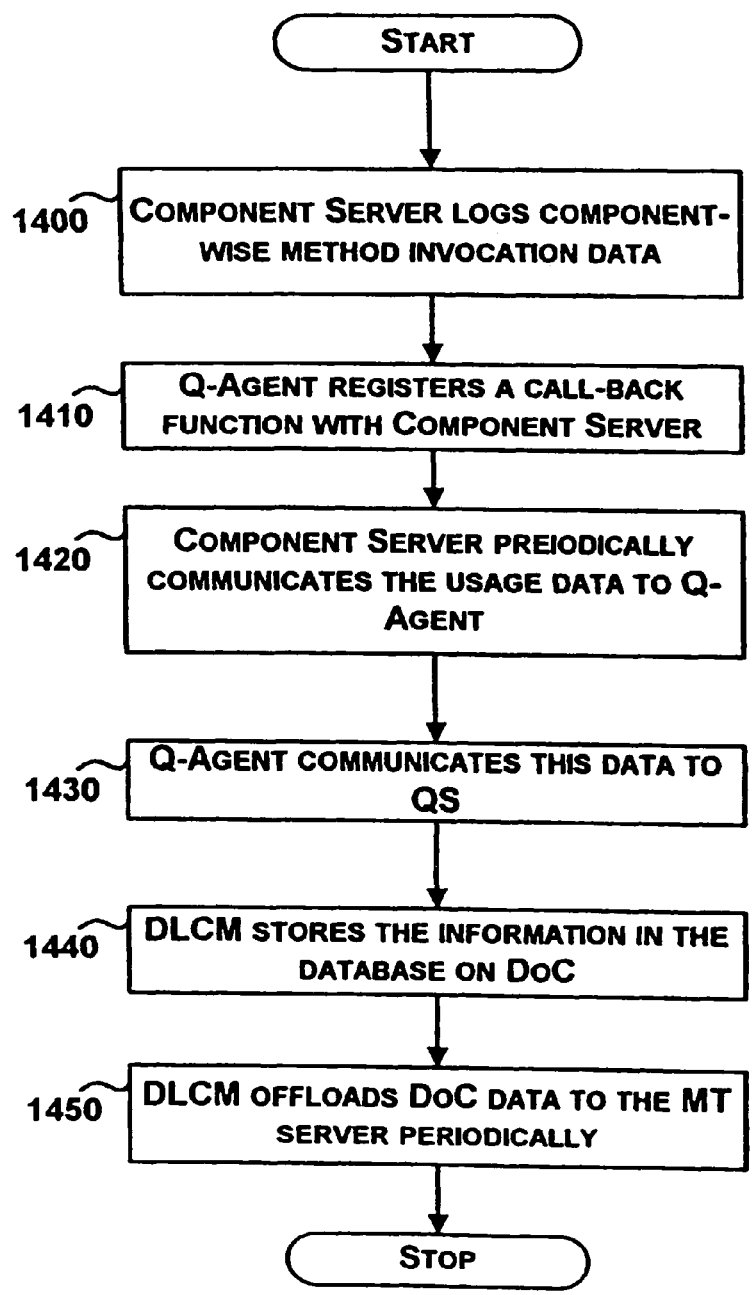
FIG. 14: COMPONENT USAGE STATISTICS

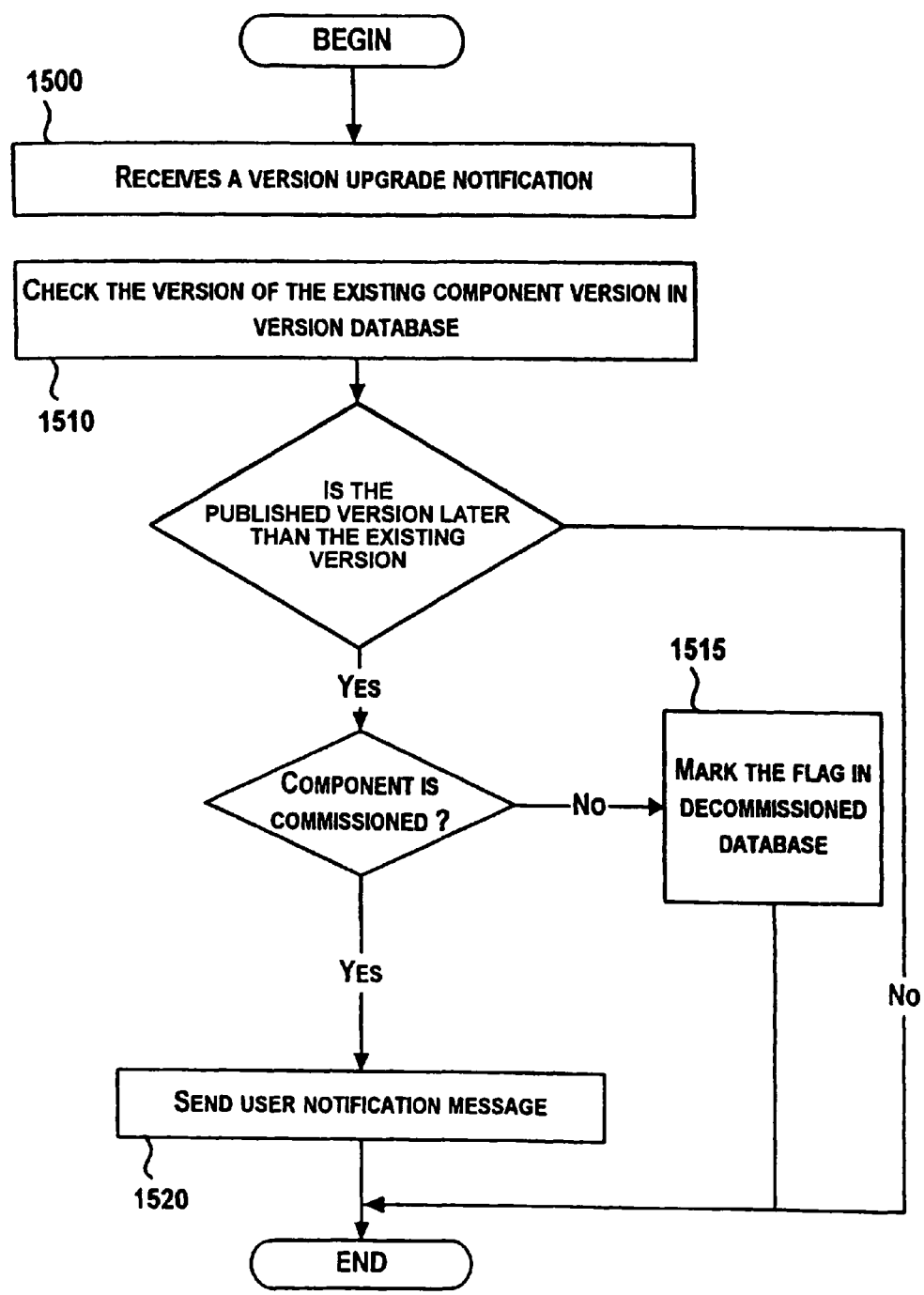

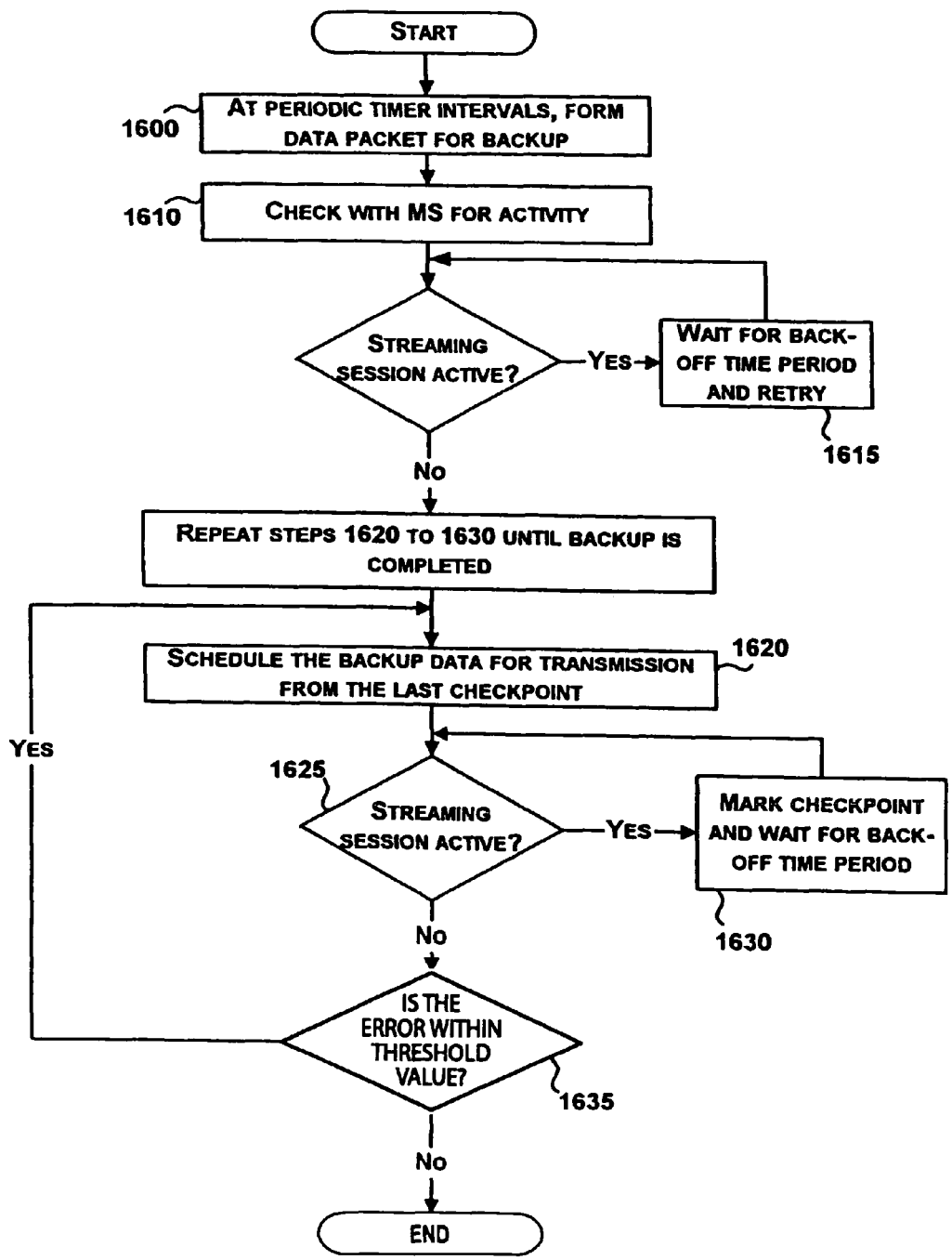
FIG. 16: PERIODIC OFFLOAD ALGORITHM

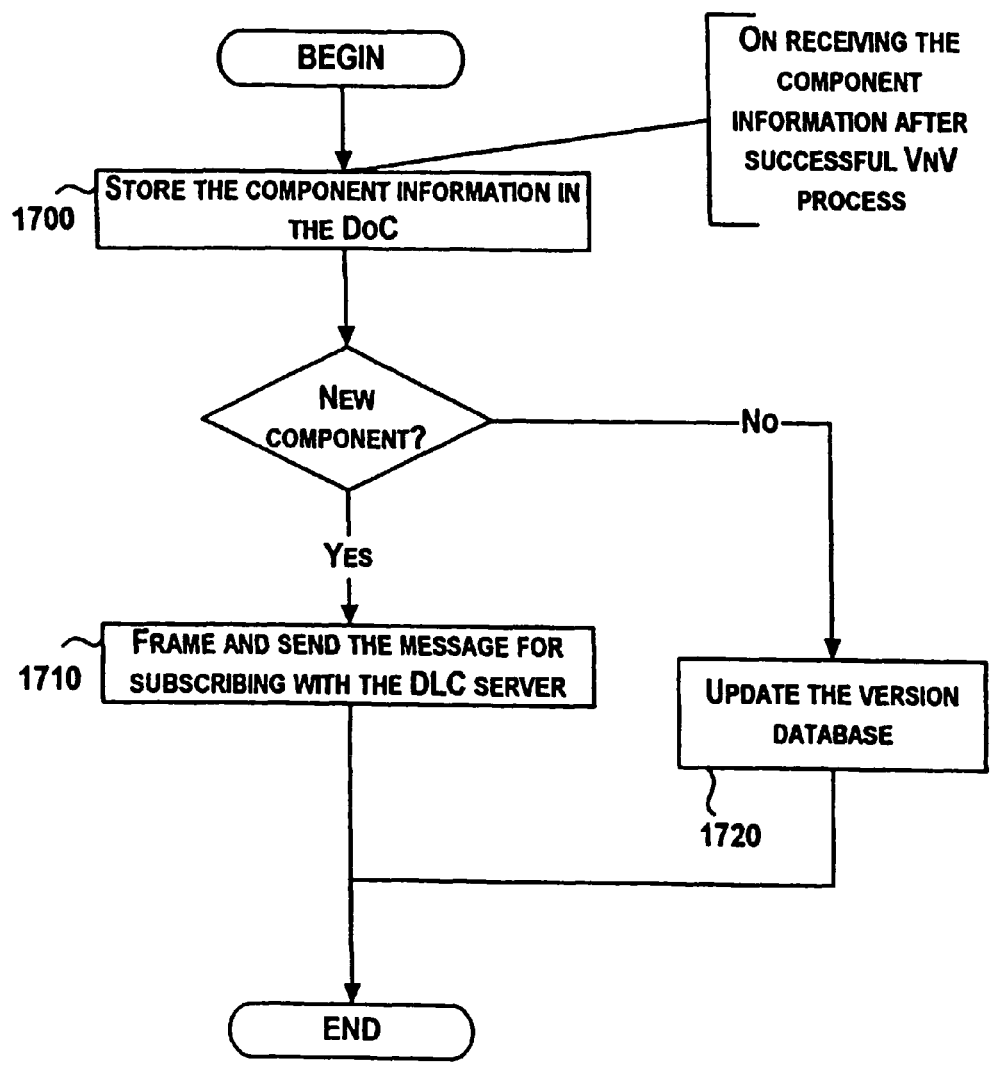
FIG. 17: STEPS IN SUBSCRIBING TO A DLC SERVER

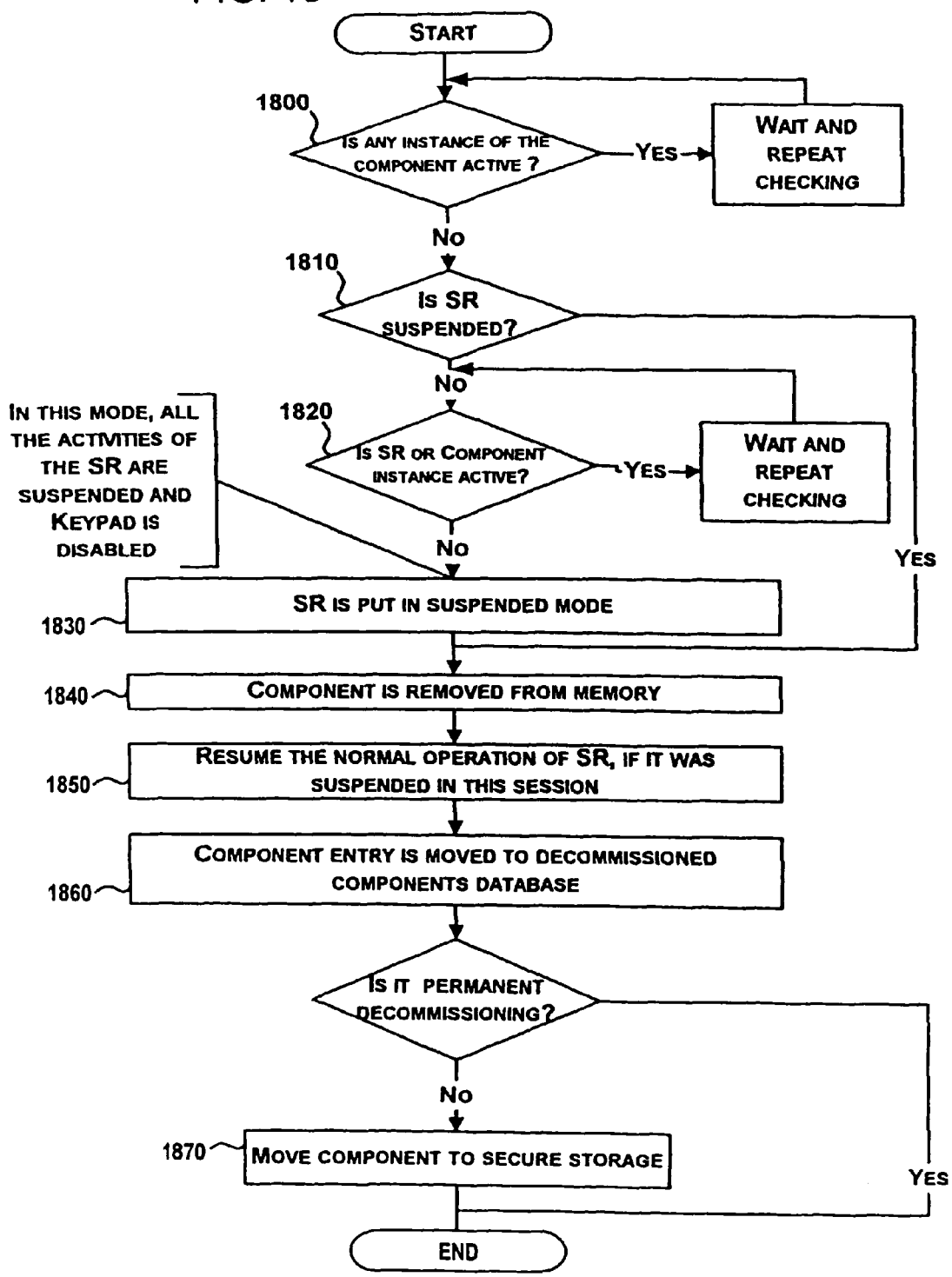

FIG. 19: Database Tables in QS

| | Attribute | Value | Remarks |
|---|---|---|---|
| System Parameters 1900 | CPU Clock | 233 | CPU clock rate |
| | RAM | 16 | Memory available in MB |
| | Display screen | 16-bit color | Display properties |
| Configurable Parameters 1910 | δ | 0.5 | Tolerance value for XPU verification |
| | T (M-zone) | 360 | Time in secs for data collection for M-zone verification |
| | R (M-zone) | 5 | Maximum repetition for data collection for M-zone verification |
| | T (Retry) | 30 | Wait time in secs in off-load process |
| | T (Off-load) | 30 | Periodicity (days) of off-load |

| | Component-ID | Version | Remarks |
|---|---|---|---|
| Commissioned Objects Table 1920 | 100 | 3.0 | |
| | 110 | 4.5 | |

| | Component-ID | Version | Pending version update |
|---|---|---|---|
| Decommissioned Objects Table 1930 | 103 | 1.2 | No |
| | 109 | 2.1 | Yes |

Component-Related Static Data 1940

| Component Id | Vendor Id | Vendor Details | DLC Server URL | Date of Download | Date of Commissioning | Date of De-Commissioning |
|---|---|---|---|---|---|---|
| | | | | | | |
| | | | | | | |

Component-Related Dynamic Data 1950

| Component Id | Start date of usage | End date of usage | Usage time |
|---|---|---|---|
| | | | |
| | | | |

FIG. 20: TABLES IN MT SERVER

COMPONENT-RELATED STATIC DATA

| EQUIPMENT ID | COMPONENT ID | VENDOR ID | DLC SERVER URL | DATE OF DOWNLOAD | DATE OF COMMISSIONING | DATE OF DECOMMISSIONNING |
|---|---|---|---|---|---|---|
| | | | | | | |
| | | | | | | |
| | | | | | | |

2000

COMPONENT-RELATED DYNAMIC DATA

| EQUIPMENT ID | COMPONENT ID | START DATE OF USAGE | END DATE OF USAGE | USAGE TIME |
|---|---|---|---|---|
| | | | | |
| | | | | |
| | | | | |

2010

SYSTEM AND METHOD FOR AUTOMATED SAFE REPROGRAMMING OF SOFTWARE RADIOS

CROSS REFERENCE TO RELATED APPLICATION

This application is a divisional of U.S. application Ser. No. 11/508,282 filed Aug. 23, 2006, which is Continuation-in-Part of U.S. application Ser. No. 10/146,948 filed on May 17, 2002, both of which are incorporated herein by reference.

FIELD OF THE INVENTION

The invention relates generally to a method for reducing the risk of using a corrupted or damaged downloaded program. More particularly, the invention relates to a system and method for validating a downloaded program into a software radio using multiple signatures and a separate execution environment for validation.

BACKGROUND OF THE INVENTION

Wireless terminal architecture is adopting the principles of Software Defined Radio. The main thrust in applying the principles of Software Defined Radio into the handset architecture is to utilize the potential that SDR offers in terms of universal multi-mode terminal functionality within a single reconfigurable platform. This is necessitated by the plethora of standards in Radio Access technologies in both the second and third generation of mobile communication systems. Also, the need to provide true global roaming seamlessly across network boundaries, getting access to services anytime anywhere without having to bother about the underlying technology changes necessitates the terminal to have some amount of reconfigurability built in.

The architecture of a terminal built on the principles on Software Defined Radio follows a distributed computing paradigm. SDR Forum in their Software Communications Architecture Specification, Volume 2.2, suggests CORBA as a middleware. The entire Software Radio is viewed as a heterarchical collection of software components. Each application is viewed as composed of one or more of these components. Adding a new component is termed as commissioning and removing of a component is termed decommissioning of the component. A component can be commissioned, decommissioned or replaced on the fly. The component server is capable of managing the component activity at transaction level granularity.

Over-the-air reconfiguration of wireless terminals provides the true advantages of having a reconfigurable architecture. The terminals can download software components over-the-air and reconfigure the properties of the terminal. Theses components can range from new air interface protocols to new user applications. Some of these components can even change the pattern in the power emission characteristics of the terminal.

The reconfiguration process, as per Architectures Supporting SDR Terminals by Nikolas Olazieregi et al, at the minimum level, requires some generic tasks like available mode lookup, negotiation, over-the-air software download and reconfiguration. Every terminal will have some non-reconfigurable modules that take care of such functionality. The download of software components can be in two ways, namely, user-triggered and system-initiated. User-triggered software downloads can be for user applications such as scheduler, calendar or game applications. System initiated downloads can be for system level components such as CODECs, protocol stack for a new air interface, and modem for a new air interface.

Detection and control of the rogue SDR terminals in the future networks, by Jafar Faroughi-Esfahani et al, describes conditions under which reconfiguration of a terminal could lead to potential problems. The capability of a reconfigurable terminal to download and commission new software components during an operation also throws open the possibility of the terminal malfunctioning and jamming other users in the network.

DESCRIPTION OF RELATED ART

The possibility of the software modules corrupting the functionality of a reconfigurable software radio is very much a reality. The integrity of the software modules in this case cannot be guaranteed since the nature and the contents in the device can undergo reconfiguration dynamically. Thus, there exists a need for validating the software components before they are commissioned in a reconfigurable terminal.

For the process of over-the-air reconfiguration of software radios, the user (the terminal) requests the download of software components from a server. The package for the component is sent over-the-air making use of the wireless communication capabilities of the terminal. The process of providing safe reprogramming of the software radios involves providing an assurance that the component that is downloaded cannot cause any problem in the system context.

U.S. Pat. No. 5,978,484 to Apperson; Norman and Beckman; Brian C for "System and method for safety distributing executable objects" (issued Nov. 2, 1999 and assigned to Microsoft Corporation (Redmond, Wash.)) describes a method by which a distributing authority associates a privilege request code and digitally signs the executable. The client verifies the digital signature before executing the same and the code is monitored to ensure that the privilege request code is honored during the execution. The said patent while addresses the issues related to monitoring and controlling the execution of the code but doesn't verify whether the behavior is as expected.

U.S. Pat. No. 6,047,374 to Barton; James M for "Method and apparatus for embedding authentication information within digital data" (issued Apr. 4, 2000 and assigned to Sony Corporation (JP)) discusses a method by which arbitrary digital information is embedded within a stream of digital data and that allows a user to determine whether the digital data have been modified from their intended form. The said patent describes a method that protects the content and ensures that the content has not been modified; however, the perspective of the approach is more from data than from program point of view.

U.S. Pat. No. 5,412,717 to Fischer; Addison M for "Computer system security method and apparatus having program authorization information data structures" (issued May 2, 1995) discusses a system monitor that limits the resources that can be utilized by an executing program based on program authorization information. The executing program, thus, is regarded as being placed in a capability limiting "safety box".

U.S. Pat. No. 6,065,118 to Bull; John Albert and Otway; David John for "Mobile code isolation cage" (issued May 16, 2000 and assigned to Citrix Systems, Inc. (Fort Lauderdale, Fla.)) describes a method that reduces the risk of damage to data or programs due to a downloaded program from an external source. The downloaded component is executed in a separate execution environment and data is passed back and forth between end user system and the cage that executed the downloaded program. The method described in the said patent, however, doesn't make an attempt to ensure whether the generated data by the downloaded program is as expected; it only attempts to reduce the risk of damage to end user system resources due the execution of the downloaded program.

U.S. Pat. No. 6,070,239 to McManis; Charles E for "System and method for executing verifiable programs with facility for using non-verifiable programs from trusted sources" (issued May 30, 2000 and assigned to Sun Microsystems, Inc. (Mountain View, Calif.)) describes a method for the verification of digital signatures associated with a program and for the verification of the program with respect to a pre-defined integrity criteria. The verification described in the said patent is based on Java bytecode verifier and include criteria such as operand stack and data type usage restrictions and the verification is related to architecture neutral programs.

U.S. Pat. No. 6,073,239 to Dotan; Eyal for "Method for protecting executable software programs against infection by software viruses" (issued Jun. 6, 2000 and assigned to InDefense, Inc. (Santa Cruz, Calif.)) describes a method for protecting executable programs against infection by a computer virus program. The approach in the said patent is based on a typical execution pattern of the program on corruption by a software virus.

U.S. Pat. No. 6,105,072 to Fischer; Addison M for "Method and apparatus for validating travelling object-oriented programs with digital signatures" (issued Aug. 15, 2000) describes a method by which the executing instances of objects are stored and communicated to other system for further execution of the same. The approach of the said patent provides for a digital signature methodology to insure security and integrity of the traveling objects.

U.S. Pat. No. 6,105,137 to Graunke; Gary L and Rozas; Carlos V for "Method and apparatus for integrity verification, authentication, and secure linkage of software modules" (issued Aug. 15, 2000 and assigned to Intel Corporation (Santa Clara, Calif.)) describes a method of authenticating and verifying the integrity of software modules based on digital signatures and additional verification criteria such as validity of the destination addresses.

U.S. Pat. No. 6,128,774 to Necula; George C and Lee; Peter for "Safe to execute verification of software" (issued Oct. 3, 2000) descries a method that includes the steps of defining a safety policy that specifies safe operating conditions of untrusted software, generating safety predicate and a safety proof, and validating the said for untrusted software based on safety proof and safety predicate. The said patent requires the code producer to define safety policy, enforces safety policies such as immediate jumps are within the codesegment, and watches the instructions for safety policy violations.

U.S. Pat. No. 6,154,844 to Touboul; Shlomo and Gal; Nachshon for "System and method for attaching a downloadable security profile to a downloadable" (issued Nov. 28, 2000 and assigned to Finjan Software, Ltd. (San Jose, Calif.)) describes a system that comprises of an inspector and protection engine, the inspector engine. The content inspection engine uses a set of rules that include a list of suspicious operations or suspicious code patterns to generate a security profile and the protection engine include mechanisms to ensure the trustworthiness of the downloadable. The example list of operations that deemed suspicious include file operations such as read and write, network operations such as listen and connect, and registry operations such as read registry item and write registry item.

U.S. Pat. No. 6,167,521 Smith; Sean William and Weingart; Steve Harris for "Securely downloading and executing code from mutually suspicious authorities" (issued Dec. 26, 2000 and assigned to International Business Machines Corporation (Armonk, N.Y.)) describes a system for secure codedownloading and information exchange, in the full generality of complex code dependencies in which trusted code is employed to ensure that proprietary data is destroyed or made unreadable when the environment ceases to hold certain security level.

U.S. Pat. No. 6,223,291 to L. Puhl, D. Vogler, E. A. Dabbish for "Secure wireless electronic-commerce system with digital product certificates and digital license certificates" (issued Apr. 24, 2001 and assigned to Motorola, Inc. (Schaumburg, Ill.)) describes a method in which downloadable software products are associated with digital content certificates for content items and digital license certificates for licenses of the content items and verification of the licenses of the new content on request from a wireless equipment. The focus of the said patent is content verification and verification for the appropriate license for the verified content and doesn't address the issues related to the verification of the behavior of the downloaded software product.

U.S. Pat. No. 6,330,588 to Freeman; Martin for "Verification of software agents and agent activities" (issued Dec. 11, 2001 and assigned to Philips Electronics North America Corporation (New York, N.Y.)) describes a method for the verification of software agents and their activities. The method described in the said patent achieves the objective by monitoring the agent's return and comparing the original agent fingerprint and the return agent fingerprint.

A method for verifying the integrity of the software installed in devices, which operate in domains not fully controlled to prevent the situations where software integrity is compromised with a malicious interest, is mentioned in "Reflection as a mechanism for software integrity verification" by Diomidis Spinellis. These devices can be mobile phones, Set-top boxes for Pay-TV interfaces, credit card terminals, smart cards etc. The method involves verifying a hash of the installed software and comparing it with the hash of the same kept under secure storage. Again this method deals with the static characteristics of the software component and does not attempt to address the issue of dynamic behavior of the component.

A mechanism for detecting anomalous program behavior based on performance signatures is described in "Performance Signatures: A Mechanism for Intrusion Detection" by David L. Oppenheimer and Margaret R. Martonosi. The said mechanism is based on defining the variables that might indicate anomalous behavior and continually monitoring these variables during system operation. The values of these variables during program execution form the performance signature of the program and can be used to generate anomaly reports.

An approach that supports a component developer to design and run verification tests is described in "A Software Component Verification Tool" by Gary A Bundell, Gareth Lee, John Morris, Kris Parker. The said approach also describes a component test bench that is lightweight and portable facilitating packaging along with a component for verification of the component in a target environment.

A recommendation from SDR Forum related to structure, development, standardization, and implementation is provided in "SDRF Technical Report 2.2—Chapter 2 Rev. 0.3—

28 Nov. 1999. The said recommendation also describes issues related to security and regulation of SDR equipment.

SUMMARY OF THE INVENTION

The present invention provides a system and method for safe and controlled upgradation of mobile terminals. In SDR based mobile terminals, it is possible, and in some cases necessary, to download software components and commission them for immediate use. The component that can be downloaded is packaged with information to assess the integrity of the software after the download.

One aspect of the invention is to shield the functional mobile terminal from an infected component by initially downloading the component into QS that is a distinct and isolated execution environment.

Another aspect of the invention is to incorporate of multiple signatures that are used collectively to validate the downloaded component into a DLC package. The signatures are categorized into two types, namely, static signatures and dynamic signatures. The static signatures are incorporated into the package to verify the aspects such as source of the component, target (mobile terminal) of the downloaded component, adequacy of system (mobile terminal) characteristics, and interoperability with the already commissioned components (version matching).

Still another aspect of the invention is to use dynamic signatures to ensure that the downloaded component has not been infected either during packaging, transmission, or after unpacking. The twin objectives of the present invention is to provide as much protection as possible and at the same time to keep the process of generation and packaging of the signatures as simple as possible. The dynamic signatures are incorporated into the package to verify the dynamic behavior aspects such as internal and external function calls, and memory and CPU utilization.

Still another aspect of the invention is to perform validation and verification in multiple zones, namely, E-Zone and V-Zone verification in QS (the shadow execution environment), and M-Zone verification in MS (the main execution environment).

Still another aspect of the invention is to perform periodic verification of the components that execute in N-zone in MS. This is to ensure that the component has not been infected while being in use in MS.

Yet another aspect of the invention is to interact with component servers to automatically download, verify and upgrade the components in MS on release of the new versions of the components by component vendors.

Yet another aspect of the invention in one of the preferred embodiments is to collect usage statistics of the downloaded components and communicate the same to MT server for billing purposes.

BRIEF DESCRIPTION OF THE DRAWINGS

FIG. 1 is a block diagram showing an illustrative network architecture containing Software Radio in relation to the other network entities.

FIG. 2 is a block diagram of the Software Radio showing the Q-Shell Subsystem and the Main Subsystem.

FIG. 3 shows the different zones of validation and verification of a Downloaded Component (DLC).

FIG. 4 is a block diagram showing the overall QS functionality.

FIG. 5A is a flowchart of AR module in a preferred embodiment.

FIG. 5B is a flowchart for steps in commissioning a component in MS for M-zone verification.

FIG. 6A is a flowchart of PU module in performing the unpacking process.

FIG. 6B is a flowchart for the process of checking the integrity of the package of Downloaded Component.

FIG. 6C shows the data structure for signature data in the package.

FIG. 6D shows the system signature and version signature data structure.

FIG. 6E describes the compressed dynamic signature data present in the package and the extracted signatures.

FIG. 7A is a flowchart of VnV module for performing E-zone verification.

FIG. 7B shows the flowchart and the method for static source signature verification.

FIG. 7C shows the method of static target signature verification.

FIG. 7D is a flowchart for system signature verification.

FIG. 7E is a flowchart for version signature verification.

FIG. 8A is a flowchart of VnV module for performing the V-zone verification.

FIG. 8A1 provides an additional flowchart of VnV module for performing the V-zone. verification.

FIG. 8B describes the generated data structure for dynamic signature verification.

FIG. 8B1 provides an additional description of the generated data structure for dynamic signature verification.

FIG. 8C is a flowchart describing the IXB and EXB signature verification in V-zone.

FIG. 8C1 provides an additional flowchart describing the IXB and EXB signature verification in V-zone.

FIG. 8D is a flowchart for performing the XMU verification in V-zone.

FIG. 8D1 provides an additional flowchart for performing the XMU verification in V-zone.

FIG. 8E1 is a flowchart for performing the first type of XPU verification in V-zone.

The figures, FIGS. 9A, 9B, 9C, 9D and 9E, describe the method of performing XPU verificafion in V-zone.

The figures, FIGS. 9A1, 9B1, 9C1, and 9E1, describe an additional method of performing the second type of XPU verification in V-zone.

FIG. 10A is a flowchart of VnV module for performing M-zone verification.

FIG. 10B1 is a flowchart for performing XPU verification in M-zone.

FIG. 10B1a is an additional flowchart for performing normalized XPU verification in M-zone.

FIG. 10B2 is a flowchart for performing XMU verification in M-zone.

FIG. 10B2a is an additional flowchart for performing normalized XMU verification in M-zone.

FIG. 11A describes the steps to be followed by a developer to instrument a component for VnV process.

FIG. 11B describes the steps in adding instrumentation to a function.

FIG. 12 is a flowchart for packaging a component.

FIG. 13 describes the steps in performing periodic online verification.

FIG. 14 describes the steps in collection of the usage statistics.

FIG. 15 is a flowchart of DLCM module for performing the component version management.

FIG. 16 is a flowchart for a periodic off-load process.

FIG. 17 shows the steps in subscribing to a DLC Server to receive component version upgrade information.

FIG. 18 shows the steps in decommissioning a component.
FIG. 19 shows the database tables in QS.
FIG. 20 shows the database tables in MT Server.

DETAILED DESCRIPTION OF THE PREFERRED EMBODIMENTS

FIG. 1 is a block diagram representation of the network in which the software radio operates in a preferred embodiment. The system for the automated safe reprogramming of a software radio comprises of a mobile terminal (100) (also referred as software radio, SR) manufactured on the principles of Software Defined Radio.

The automated safe reprogramming of a software radio involves the steps of downloading the required component (Downloaded Component, DLC) from any of the available DLC servers and performing the processes of validation and verification of the same in the context of the software radio, SR (100). The software radio has a Quarantine Space, the Q-Shell subsystem, QS (110) that aids in the component management activities which include validation and verification process (VnV process) of a downloaded component before commissioning it within the main subsystem MS (120).

The wireless network is the one in which the mobile terminal is identified as a valid terminal by the use of a SIM module or a suitable identity so that the mobile terminal is capable of using the wireless network for accessing the DLC servers. The wireless network is connected to an IP network by a suitable gateway component.

The system accesses a number of DLC servers (140,150) that provide the required software components in a package format needed by QS. The mobile terminal accesses the DLC servers via a combination of wireless network and IP network.

The package for the downloaded component comprises of the package header, instrumented DLC, where instrumentation is a piece of code embedded in the component to generate data for signature verification, upper and lower layer simulator components, static signatures, dynamic signatures and component-specific data. The simulators are also designed for use in a distributed processing environment and implement methods required for executing use-cases in the simulated environment.

The Mobile Terminal (MT) Server (130) keeps track of the components within a software radio. The MT server maintains statistics about a software radio like validation logs and usage logs. The usage information is communicated to the Billing System for the purposes of billing. Each software radio terminal has an entry in an MT server that is identified by MT's unique equipment id.

FIG. 2 is the software architecture of software radio with specific reference to the Q-shell subsystem in a preferred embodiment. QS (110) is the quarantine space that manages the component related activities. QS has a set of well-defined logical interfaces with MS (120) of the software radio. MS has a module Q-Agent (260), which is the agent for QS. All communication between the QS and MS are routed through the Q-Agent.

QS comprises of modules that help in the execution of the downloaded component. The Java components execute in a virtual machine that is part of QS. QS also has a minimal installation of component server needed for providing a distributed processing environment. QS has a set of libraries containing the validation and verification routines. System related information needed in the VnV process is stored in Disk-on-Chip database (220). The different software modules in QS make use of the Q-shell APIs for their functioning.

Automated Reprogramming, AR (210) is the module that manages the whole functioning of the Q-shell system. All communication to and from MS are routed through AR. AR is responsible for taking the decision about the acceptance or rejection of a downloaded component based on the results of the VnV process.

Pack/Unpack, PU (240), is the module responsible for unpacking the DLC package, which is in XML format. The PU checks the integrity of the package for the presence of all the required entities. The PU parses the information present in the package required for performing the VnV process.

Validation and Verification, VnV (230), is the module responsible for conducting the various signature evaluations according to the directions from AR. VnV module performs the static signature evaluation, dynamic signature verification in V-zone, dynamic signature verification in M-zone and communicates the results to AR.

Downloaded Component Management, DLCM (250), module is responsible for managing the entire component related activities in SR. DLCM keeps track of the status of all the downloaded components in the system. DLCM is responsible for providing a secure storage for components that are temporarily decommissioned. DLCM stores the most recent and most immediately required components in on-board storage. Remaining components are archived in the backup component store in MT server. DLCM is responsible for periodically scheduling the commissioned objects for M-zone verification. DLCM subscribes to the DLC servers that follow a subscribe-publish protocol for receiving the information related to the component version upgrades.

FIG. 3 describes the various zones in which the software radio operates. In E-zone (300), the various static signatures are verified. This includes the source signature, target signature, system signature and version signature. This verification takes place in QS. A failure in the E-zone verification causes the component to be rejected.

In V-zone (310), the dynamic signatures of the component are verified in a simulated environment in QS. The iDLC (instrumented downloaded component) and the simulators needed for the execution of use-cases are installed in QS. VnV module executes the use-case by invoking the published methods for each use-case. The dynamic signatures including the execution behavior (IXB and EXB), memory utilization (XMU) and the CPU utilization (XPU) are verified for each use-case using the data generated during the execution of the iDLC and simulators. Any failure in the V-zone verification results in the rejection of the component.

In M-zone (320), the iDLC is installed in MS of software radio and allowed to inter-operate with other components. The data is collected from the iDLC and is logged onto a file on Disk-on-Chip. The collected data is passed onto the VnV module for M-zone verification. The failure in this verification step causes the component to be rejected. N-zone (330) is the normal operating mode of the software radio. In this mode, the components operate without instrumentation. All the downloaded components operating in N-zone periodically undergo M-zone verification.

FIG. 4 describes the various functionality of QS. The block 410 describes the steps in the VnV process. The VnV process starts when MS submits a DLC to QS. QS then performs the E-zone verification of static signatures. After E-zone verification is completed, the V-zone verification of dynamic signatures is performed. Then, the iDLC installed in MS and sufficient data is collected to undertake M-zone verification. AR module decides to accept or reject the DLC based on the results of verification.

The block 420 describes the periodic online verification of components. All the downloaded components commissioned in N-zone are periodically scheduled for M-zone verification. The component is allowed to operate in MS for a preset time period with the instrumentation turned on. The verification is performed with the collected data. If the verification process is not satisfactory, the same is communicated to MS.

The block 430 describes the collection of usage related data. QS collects periodically the usage data of each of the downloaded components commissioned in MS. This data is off-loaded to MT server at regular intervals for archiving purposes. In one of the preferred embodiments, the collected usage statistics is used for billing purposes.

The block 440 describes the component version management activity of QS. For each of the commissioned components, QS subscribes with the respective DLC server for receiving version-related information about the components whenever the DLC server publishes the information about the version upgrades for the component. QS receives these published messages and informs the user about the version upgrade.

FIG. 5A describes the AR module (210) functionality with respect to VnV process related to a DLC. Q-Agent (260) invokes the API implemented by AR and passes the DLC package for the purposes of verification. The first step in the VnV process is unpacking of the DLC package (500). PU does the unpacking and returns status. If status is OK, VnV module is invoked to perform E-zone verification (510).

VnV module performs E-zone static signature verification and returns the status. Based on the result, AR decides to reject-DLC or proceed with the V-zone verification. If VnV returns OK after E-zone verification, AR does the preparation for V-zone verification. AR installs the iDLC, the Upper Layer (UL) and Lower Layer (LL) simulators in QS (520). Then, AR invokes VnV module to perform the V-zone verification (530). The result of V-zone verification is communicated to AR. Based on the result, AR decides either to reject the DLC (if the result is not OK) or else to proceed with M-zone verification.

For performing M-zone operation, AR invokes an API implemented by Q-Agent for the installation of iDLC in MS. Before the iDLC is commissioned in MS, a check is performed for the presence of components that may be superseded by the installation of the iDLC and any such components are decommissioned (540). In block 545, the iDLC is commissioned in MS, wherein the iDLC interoperates with other components in MS, to validate the DLC behavior in a realistic scenario. During this time, instrumentation within the iDLC generates the required data for M-zone verification.

After a preset time period, AR invokes VnV to perform M-zone verification on the collected data (550). VnV performs the verification and returns the result to AR. If the result is OK, AR proceeds to turn off the instrumentation in iDLC (560). In case it is required to delay the commissioning of the DLC, the DLC is passed onto DLCM for secured on-board storage (562) and the decommissioned components are reinstalled (565). On the other hand, if the DLC is required to be commissioned immediately, then AR passes the DLC to the Q-Agent for commissioning (570). On successful commissioning of the DLC (575), AR passes this information to update QS database for the commissioned component (576). Further, AR sends a positive acknowledgment to MT Server and DLC Server (580).

The block 555 describes the error handling mechanism. In the case of a new downloaded component, any error at any of the signature evaluation stages causes the DLC to be rejected and a suitable communication is sent to DLC Server and MT Server. In the case of periodic online verification of commissioned components, an error causes a communication to be sent to MS to enable a suitable course of action.

FIG. 5B describes the steps involved in preparing for M-zone verification. The block 590 checks whether any voice calls or streaming sessions are in progress. If yes, it waits for a random period of time before rechecking.

If no active calls or data sessions are in progress, SR is put into suspended mode (591). In this mode, no activity of SR is allowed and keypad is disabled. The system remains in this mode for a very brief period of time.

Before a component is commissioned, checking is done for the presence of any other components that are superseded by the new component. Such components are decommissioned (592) and DLCM provides secure storage for such components.

The iDLC is then installed in MS (593). After this, the system is brought back to normal mode of operation (594).

FIG. 6A describes the operation of PU module. AR module invokes PU and passes on the submitted DLC. First step in the unpacking process is to check the integrity of the package (600). The package is checked for the presence of all required entities. The next step in the unpacking operation is to analyze the data that is part of the package (610). The signature data is checked for the presence of mandatory elements such as the use-case list, static signatures, dynamic signatures and component-specific data. The result of unpacking is communicated to AR module (620).

FIG. 6B describes in detail the steps involved in checking the integrity of the package. The block 630 is the detailed package structure.

Package has an ASR header that consists of ASR version, component id, vendor id, and date and time of packaging. First step in integrity checking is to check the header format (631).

The block 632 checks whether the package contains iDLC.

The block 633 checks whether the package contains an upper layer simulator.

The block 634 checks whether the package contains a lower layer simulator.

The block 635 checks whether the package contains signature data.

Package contains the instrumented DLC, the upper layer and lower layer simulators and the signature data. Checking is done for the presence of all these entities. If any one of these entities is missing, an error is returned to AR module.

FIG. 6C describes the signature data structure (640). Signature data includes static signatures (645), dynamic signatures (650) and component-specific data (655).

The block 645 is the data structure for static signatures. This includes static source signature comprising of source server's private-key encrypted hash and information about the hashing algorithm, static target signature comprising of equipment identity, operator id and the SIM identity. Static signature also includes system signature data and static version signature data.

The block 650 is the data structure for dynamic signatures. This includes use-case specific compressed signature for all the use-cases. The number of use-cases contained in the package is also pail of the data structure.

The block 655 is the data structure for component-specific data. This includes component id, component version, vendor id and vendor details like vendor URL, nature of billing and information for subscribing to the DLC server for receiving version upgrade information.

FIG. 6D describes the data structure for static system signature (660) and static version signature (665) containing exemplary values.

The block 660 describes Static system signature that includes data for system signature verification. This includes the details such as CPU clock rate, RAM required, Display screen resolution, data channel speed, and OS version.

The block 665 describes Static version signature that is a table containing the range of versions of other components with which the DLC inter-operates.

FIG. 6E describes the data structure of dynamic signature for a use-case. The dynamic signature is present in the package in a compressed format (670). VnV module extracts the IXB signature, EXB signature, XPU signature, XMU signature, CPU Utilization signature and Memory Utilization signature from this compressed form.

CPU and Memory utilization signatures (672) consist of normalized respective utilization values over the normalized execution time of the use-case. These signatures are generated as follows. The use-case under consideration is executed several times and the utilization values are recorded. These utilization values are obtained in several ways including by a suitable instrumentation of DLC, by using suitable features of Component Server, by using suitable features of VM, or by using suitable features of RTOS. Each such sequence of values is normalized based on the peak value of the sequence and pair-wise sequences are time-warped using a time warping technique. This procedure results in a signature for the sequence of values related to multiple execution of a use-case.

IXB signature (675) consists of function ids of instrumented internal functions and the number of times the function was invoked during the execution of the use-case.

EXB signature (680) consists of function ids of external functions and the number of times it was called during the execution of the use-case in the instrumented functions. XPU signature (685) consists of function ids and the execution time for all the instrumented internal functions.

XMU signature (690) consists of an instrumented function id and the accumulated memory requested in any particular invocation of the function.

FIG. 7A describes the sequence in which VnV module performs E-zone verification of static signatures. AR module invokes VnV module to perform E-zone verification. VnV module first performs the static source signature verification (700). If the verification is successful, VnV module proceeds to perform target signature verification (710). After the successful verification of target signature, VnV module performs system signature verification (720). The last static signature to be verified is version signature (730). The result of the signature verification is returned to AR.

FIG. 7B describes a method of source signature verification in a preferred embodiment. The DLC Server sends the iDLC digital signature along with the DLC package. Digital signature is a private-key encrypted hash of the iDLC binary.

VnV module checks if the public-key for that particular DLC Server is available with SR (735). If not, SR negotiates with the DLC Server to obtain the public-key.

VnV module uses the matched public key of the DLC Server and decrypts the signature (740). The hashing algorithm is applied on the DLC binary and the hash is obtained (745). Source signature is successfully verified if the hashes are equal. The information about the hashing algorithm is also part of the DLC package.

FIG. 7C describes the process of target signature verification. The target signature consists of the unique equipment id, operator id and SIM identity. These ids are sent to the DLC Server while requesting for the DLC. The DLC package contains these ids as part of the target signature.

VnV module fetches these ids from the package and compares with the corresponding entities in the system. A match validates that package is intended for that particular SR.

FIG. 7D describes the steps in system signature validation. The successful verification of system signature assures that the DLC will satisfactorily work in the system context. VnV module gets the first entry from the system signature data (750). The value for the corresponding entity is obtained from the system database maintained by QS (755). Checking is done to verify that the system parameters meet or exceed the requirements in the signature (760). This is repeated for all the entries in the system signature (660). If any of the system parameters fail to satisfy the requirement that is part of the signature, then it is reported as an error.

FIG. 7E describes the steps in version signature (665) validation. The successful validation of version signature ensures that the DLC will inter-operate with the components in SR.

VnV module gets the valid range of the version corresponding to first component id in the version signature (770). The version of that particular component in MS is obtained from system database (775). This value is compared to check if it is within the range of version (780) for this component in the signature. This is repeated for all the entries in the version signature. If the version of any of the components fails to be within the range, it is reported as an error.

FIG. 8A is the flowchart for VnV module to perform V-zone verification of dynamic signature. AR module installs the iDLC and the simulators in QS and invokes VnV to perform the V-zone verification. VnV module executes the use-cases from the set listed in the package.

UL simulator implements a method that is invoked for a use-case execution (800). The method is invoked with use-case id as parameter (805) and the instrumentation within the iDLC generates the data required for signature verification. VnV module reads the file containing generated data and fills the data structure in memory (810).

From the package, the compressed signature data corresponding the use-case is extracted to obtain the IXB, EXB, XPU and XMU signatures (815). VnV module first performs the IXB and EXB signature verification (820). If it is successful, VnV module proceeds to perform XMU verification (830). Then, the XPU verification is performed (840).

If the signature verification fails at any stage, it is communicated to AR. Otherwise, verification is termed as successful and the result is logged.

FIG. 8A1 is the flowchart for VnV module to perform V-zone verification of dynamic signature. AR module installs the iDLC and the simulators in QS and invokes VnV to perform the V-zone verification. VnV module executes the use-cases from the set listed in the package.

VnV module is executed for each of use-cases (800a). UL simulator implements a method that is invoked for a use-case execution (802a). The method is invoked with use-case id as parameter (804a) and the instrumentation within the iDLC generates the data required for signature verification. The generated and stored data includes the execution time and the amount of memory utilized by each invocation of a function with respect to a use-case (808a). Note that if the invoked function happens to be an external function, then the amount of memory utilized is set to zero. VnV module reads the file containing generated data and fills the data structure in memory (810*a*).

From the package, the compressed signature data corresponding the use-case is extracted to obtain the IXB, EXB, XPU and XMU signatures (812*a*). VnV module first performs the IXB and EXB signature verification (814*a*). If it is successful, VnV module proceeds to perform XMU verification (816*a*). Then, the XPU verification is performed (818*a*). If the signature verification fails at any stage, it is communicated to AR. Otherwise, verification is termed as successful and the result is logged.

FIG. 8B describes the data generated by the instrumentation for dynamic signature verification (845). The data consists of function id, memory requested within the function, start and end time of execution for each of the instrumented internal functions. For signature verification process, the execution times for each invocation is computed from the end time and start time. For an instrumented external function, the function id alone is logged (as for example, in the case of function E5).

FIG. 8B1 describes the data generated by the instrumentation for dynamic signature verification (820*b*). The data consists of function id, memory requested within the function, start and end time of execution for each of the instrumented internal functions. For signature verification process, the execution times for each invocation is computed from the end time and start time. For an instrumented external function, the function id alone and execution time are logged (as for example, in the case of function E5).

FIG. 8C describes the steps in IXB and EXB signature verification in V-zone. First step in the verification process is the extraction of the IXB and EXB signatures from the compressed signature data in the package (850). From the signature, the count of the number of times a particular function was invoked is obtained (855). The generated data is analyzed to determine the number of times the function was invoked during execution in V-Zone (860). An exact match between these two counts implies that the IXB and EXB signatures are correct. A mismatch in the function count between the signature and the generated data is reported as an error.

This process is repeated for all the internal and external functions associated with the use-cases.

FIG. 8C1 describes the steps in IXB and EXB signature verification in V-zone. The verification process is performed for each of the use-cases (830*c*). First step in the verification process is the extraction of the IXB and EXB signatures from the compressed signature data in the package (83*c*2). For each of the internal functions, Fj, (834*c*), count the number of invocations (Cqj) of Fj (836*c*). Obtain the similar count Cgj from the signature. Add |Cgj-Cqj| to SAD. Determine whether SAD<N*SThreshold (838*c*) where SThreshold is a pre-defined threshold value. If it not less, then report error. Similarly, for each of the external functions, Fj, (840*c*), count the number of invocations (Cqj) of Fj (842*c*). Obtain the similar count Cgj from the signature. Add |Cgj-Cqj| to SAD. Determine whether SAD<N*SThreshold (844*c*) where SThreshold is a pre-defined threshold value. If it not less, then report error.

This process is repeated for all the internal and external functions associated with the use-cases.

FIG. 8D describes the steps in the verification of XMU signature in V-zone. The first step is the extraction of the XMU signature from the compressed signature data for the use-case (870). For a particular function id, there can be zero, one or more memory allocation requests. The XMU signature verification is termed successful, if the count and the values of all memory allocation requests for a particular function are the same both in the signature and generated data.

VnV module first generates a list (L1) of memory allocation request values for a function from the signature (875). A similar list (L2) is created from the generated data (880). A check is done for sizes of both the lists (885). If they are not equal, it is treated as an error and reported to AR (897). Otherwise, the first value from L1 is obtained (890). The list L2 is searched for an exact match (892). If matching is successful, the matched entry is removed from both the lists (895). This is repeated for all the values in L1. Failure to find a match in L2 for an element in L1 is reported as an error (897).

This process is repeated for all the functions in the use-case signature.

FIG. 8D1 describes the steps in the verification of XMU signature in V-zone. The XMU verification process is performed for each of the use-cases (850*d*). The first step is the extraction of the XMU signature from the compressed signature data for the use-case (852*d*). For a particular function id, there can be zero, one or more memory allocation requests. The XMU signature verification is termed successful, if the count and sum of the values of all memory allocation requests for a particular function over the various invocations are same in both the signature and generated data.

For each of the internal functions, Fj, (854*d*), count the number of memory allocation requests (Cq) and sum memory allocation requests (S2) over the various invocations of Fj (856*d*). Obtain the similar count Cg and S1 from the signature (858*d*). Add |S1-S2| to AD (860*d*). Determine whether AD<N*SThreshold and Cg=C1*q* (862*d*) where SThreshold is a pre-defined threshold value. If the condition is not satisfied, then report error.

This process is repeated for all the functions in the use-case signature.

FIG. 8E1 describes the steps in the verification of XPU signature in V-zone (XPU-1 signature verification). The XPU verification process is performed for each of the use-cases (880*e*). The first step is the extraction of the XPU signature from the compressed signature data for the use-case (882*e*). For a particular function id, there can be zero, one or more memory allocation requests. The XPU signature verification is termed successful, if the sum of the execution time for a particular function over the various invocations are same in both the signature and generated data. For each of the internal functions, Fj, (884*e*), sum execution times (S2) over the various invocations of Fj (886*e*). Obtain the similar sum (S1) from the signature (888*e*). Add |S1-S2| to AD (890*e*). Determine whether AD<N*SThreshold (892*e*) where SThreshold is a pre-defined threshold value. If the condition is not satisfied, then report error.

The figures FIG. 9A-9E describe the steps in XPU verification for a use-case in V-zone. XPU verification is termed successful, if the execution time per function follows a pattern while executing the DLC in both QS and in the developer environment. The aim of XPU verification is to find a ratio value, e, of execution time in QS to that in the developer environment per function such that difference in e values with respect to different invocations of the function is within a tolerance limit δ. Further, a similar consistency in ratio values should be observed with respect to multiple invocations of multiple functions.

FIG. 9A describes the notations used in the XPU verification algorithm.

FIG. 9B describes the formation of matrix, P, of e values, for a function. The set of xi values is the execution time, for each invocation, as contained in the signature. The set of yi values is the execution time, for each invocation, as contained in the generated data.

FIG. 9C is an algorithm to determine the $G_f$ set for a function based on the associated P matrix. The $G_f$ set consists of epsilon values, e, such that each e is the mean value of a solution set, E, that satisfies the δ constraint.

The first step is fixing the first row, first column value of P as t. A reduced matrix is obtained by leaving out the row and column of t. The next step is obtaining of an N×1 matrix, C, whose each element is a set containing column numbers corresponding to values from a row of the reduced matrix, which differ at most from t by δ (900). In this process, if any of the rows of C is a null set, the process is repeated by fixing the next element in the first row of P as t.

The aim of the next step is to compute an N×1 matrix D, with the first element as a column number of t, which contains a unique column number, of the matrix P, for each row of the matrix. D defines a unique mapping from the multiple invocation of a function in QS to the same number of invocations of the function in the developer environment. Based on this mapping, a set, E, of epsilon values from P matrix is obtained.

If there are singleton sets in C, a check is done to determine whether any two singleton sets are equal, that is, multiple invocations of a function is being mapped onto a single invocation of the function in the developer environment indicating an inconsistent mapping (905). The next step involves updating D matrix with singleton set elements preserving the row identity of the elements and eliminating the same from all other row-elements of C (910). This procedure is repeated till all the singleton sets are eliminated. With the remaining sets a backtracking algorithm is applied to obtain an N×1 matrix D2 containing column numbers that together with D defines a unique mapping (915, FIG. 9D).

The next step is to update D matrix using the result obtained in D2 matrix preserving the row identity. Form an N×1 matrix E with values obtained from P matrix using the column numbers present in D matrix preserving row identity. The mean e of values of the elements of E matrix is computed (920) and forms an element of Gf. This process is repeated for the remaining elements in the first row of the matrix P (925).

FIG. 9D describes the backtracking algorithm. The input to the backtracking algorithm is a K×1 matrix Cr. Cr is derived from C by removing the rows that become null after the elimination of singleton sets. A mapping is maintained from the row index of C to the row index of Cr for each element. The objective of the backtracking algorithm is to find a K×1 matrix H, such that H (I)∈Cr (I), I=1 to K and
H (I)!=H (J) for all I!=J The values from H are updated onto the matrix D2 using the same row mapping relation from C to Cr.

FIG. 9E is an algorithm for finding out a set G from the $G_f$ sets obtained from all the functions in the use-case and to perform XPU verification in V-zone.

The first step (950) is obtaining the $G_f$ sets for all the functions (Refer to FIG. 9A-9C). After the $G_f$ sets are obtained for all the functions, a check is made to determine if any one of the $G_f$ sets is a null set (955). If so, the XPU verification fails for this use-case. If all the sets have at least one member, then the sets are ordered in the increasing order of their cardinality (960). The next step is to obtain the set G, a set of values with one element from each $G_f$ set such that all the elements are within δ distance of each other (965). This is performed by taking the first element from the first set (of least cardinality) and trying to find at least one value from each of the remaining sets such that the elements of G satisfy the δ constraint. If such a set is formed (970), the XPU verification is termed successful and the result is communicated to AR module. The QS uses the mean value of G, γ (975), to impose an additional constraint for the remaining use-cases.

The figures FIGS. 9A1, 9B1, 9C1, and 9E1 describe the steps in XPU verification for a use-case in V-zone (XPU-2 signature verification). XPU verification is termed successful, if the execution time per function follows a pattern while executing the DLC in both QS and in the developer environment. The aim of XPU verification is to find a ratio value, e, of execution time in QS to that in the developer environment per function such that difference in e values with respect to different invocations of the function is within a tolerance limit δ. Further, a similar consistency in ratio values should be observed with respect to multiple invocations of multiple functions.

FIG. 9A1 describes the notations used in the XPU verification algorithm.

FIG. 9B1 describes the formation of matrix, P, of e values, for a function. The set of xi values is the execution time, for each invocation, as contained in the signature. The set of yi values is the execution time, for each invocation, as contained in the generated data.

FIG. 9C1 is an algorithm to determine the $G_f$ set for a function based on the associated P matrix. The $G_f$ set consists of epsilon values, e, such that each e is the mean value of a solution set, E, that satisfies the δ constraint.

The first step is fixing the first row, first column value of P as t. A reduced matrix is obtained by leaving out the row and column of t. The next step is obtaining of an N×1 matrix, C, whose each element is a set containing column numbers corresponding to values from a row of the reduced matrix, which differ at most from t by δ (900c). In this process, if any of the rows of C is a null set, the process is repeated by fixing the next element in the first row of P as t.

The aim of the next step is to compute an N×1 matrix D, with the first element as the column number of t, which contains a unique column number, of the matrix P, for each row of the matrix. D defines a unique mapping (Map) from the multiple invocation of a function in QS to the same number of invocations of the function in the developer environment. Based on this mapping, a set, E, of epsilon values from P matrix is obtained.

If there are singleton sets in C, a check is done to determine whether any two singleton sets are equal, that is, multiple invocations of a function is being mapped onto a single invocation of the function in the developer environment indicating an inconsistent mapping (905c). The next step involves updating D matrix with singleton set elements preserving the row identity of the elements and eliminating the same from all other row-elements of C (910c). This procedure is repeated till all the singleton sets are eliminated. With the remaining sets a backtracking algorithm is applied to obtain an N×1 matrix D2 containing column numbers that together with D defines a unique mapping (915c). The input to the backtracking algorithm is a K×1 matrix Cr. Cr is derived from C by removing the rows that become null after the elimination of singleton sets. A mapping is maintained from the row index of C to the row index of Cr for each element. The objective of the backtracking algorithm is to find a K×1 matrix H, such that H (I)∈Cr (I), I=1 to K and
H (I)!=H (J) for all I!=J The values from H are updated onto the matrix D2 using the same row mapping relation from C to Cr.

The next step is to update D matrix using the result obtained in D2 matrix preserving the row identity. Form an N×1 matrix E with values obtained from P matrix using the column numbers present in D matrix preserving row identity. The mean e of values of the elements of E matrix is computed (920*c*) and forms an element of Gf. This process is repeated for the remaining elements in the first row of the matrix P (925*c*).

FIG. 9E1 is an algorithm for finding out a set G from the $G_f$ sets obtained from all the functions in the use-case and to perform XPU verification in V-zone.

The first step (950*e*) is obtaining the $G_f$ sets for all the functions (Refer to FIG. 9A-9C). After the $G_f$ sets are obtained for all the functions, a check is made to determine if any one of the $G_f$ sets is a null set (955*e*). If so, the XPU verification fails for this use-case. If all the sets have at least one member, then the sets are ordered in the increasing order of their cardinality (960*e*). The next step is to obtain the set G, a set of values with one element from each $G_f$ set such that all the elements are within δ distance of each other (965*e*). This is performed by taking the first element from the first set (of least cardinality) and trying to find at least one value from each of the remaining sets such that the elements of G satisfy the δ constraint. If such a set is formed (970*e*), the XPU verification is termed successful and the result is communicated to AR module. The QS uses the mean value of G, γ (975*e*), to impose an additional constraint for the remaining use-cases.

FIG. 10A describes the procedure for M-zone verification of dynamic signatures. The VnV module first reads the file containing generated data and fills out the data structures in memory (1000). Then, the data is grouped based on the use-case id (1010).

The use-case ids in the generated data are checked to verify whether the signatures for those use-cases are present in QS (1015). If the signature is present, XPU and XMU signatures (related to CPU and Memory utilization) are verified and result is passed onto AR (1020).

If there is no signature for any of the use-cases present in the generated data, the M-zone data generation is continued for another interval of time. After each repetition of M-zone operation (1022), the generated data is checked for the presence of those use-cases for which the signature is available. If the necessary data has been generated, signature verification is performed.

If the number of iterations crosses a threshold value (R(M-Zone)) for repetitions (1025) without the necessary use-cases getting executed, suitable action is taken based on whether the component is under periodic online verification or it is a new component. In the case of periodic online verification of components, an error is reported to AR. In the case of a new DLC, the signature is requested, for the use-cases that have occurred more repeatedly, from the DLC Server (1030). If the DLC Server is unable to provide this data, an error is reported to AR. If the signature becomes available, XPU and XMU signature verifications are performed for the corresponding use-case and the result is passed onto AR.

FIG. 10B1 describes the procedure for XPU verification in M-zone. The XPU verification in M-zone is based on checking whether the CPU utilization during the execution of a use-case is as per the signature.

The first step is to analyze the generated data related to multiple executions of a use-case (1050). Each such data contain values related to CPU utilization by DLC at periodic intervals. These values are normalized based on the peak value (1055) in order to account for the system and load characteristics. Due to the same reason, different instances of execution of a use-case takes different time periods to complete the execution and hence, it is required to normalize the time scale as well. This is achieved by using a time warping technique (1057).

Further objective is to abstract the CPU utilization characteristics from several executions into a template that is compared with the corresponding use-case signature (1059). The template is generated by pair-wise warping of the sequences until the sequences are reduced to an approximated representation of the CPU utilization using a single sequence. This sequence forms a template for the use-case.

An error is reported to AR if the error of comparison (1060) of the template with the signature is not within a threshold.

FIG. 10B1*a* describes the procedure for normalized XPU verification in M-zone. The XPU verification in M-zone is based on checking whether the CPU utilization during the execution of a use-case is as per the signature.

The first step is to analyze the generated data related to multiple executions of a use-case (U) (1050*b*1). Each such data contain values related to CPU utilization by DLC during a particular execution at periodic intervals. These values are normalized based on the peak value (1052*b*1) in order to account for the system and load characteristics. Due to the same reason, different instances of execution of a use-case take different time periods to complete the execution and hence, it is required to normalize the time scale as well. This is achieved by using a time warping technique. Let D=<D1, D2, . . . , Dn> be generated during n executions of DLC with respect to use-case U wherein Di=<Di1, Di2, . . . > is the sampled normalized CPU utilizations during ith execution (1054*b*1). Arrange D=<D1', . . . , Dn'> in non-decreasing order of execution time where the execution time is the number of samples times the sample period (1056*b*1). Let D1'= (((D1'■D2')■D3')■ . . . ■Dn') wherein ■ is a time-warping operation (1058*b*1). This pair-wise warping of CPU utilizations results in abstract characterization of CPU utilization (D1') that is compared with the similar abstract characterization that is part of the signature (C1'). Obtain C1' from signature and perform C1'■D1'; determine the path of least error and compute the sum of errors (Se) based on this path of least error mapping (1060*b*1).

Compare Se with a pre-defined Threshold (1062*b*1) and report error if Se not less than Threshold. A time-warping operation helps in mapping a segment (say, W1) of a time series with a segment (say, W2) of another time series such that the overall error is minimized. The mapping error is computed by extrapolating W1 to match W2 (if W1<W2) and computing the error as square root (sum (square (difference between two corresponding values in two segments))).

Similarly, FIG. 10B2 describes the procedure for XMU verification in M-zone, that is, to determine whether the memory utilization during the execution of a use-case is as per the signature.

Similarly, FIG. 10B2*a* describes the procedure for normalized XMU verification in M-zone, that is, to determine whether the memory utilization during the execution of a use-case is as per the signature. The first step is to analyze the generated data related to multiple executions of a use-case (U) (1080*b*2). Each such data contain values related to memory utilization by DLC during a particular execution at periodic intervals. These values are normalized based on the peak value (1082*b*2) in order to account for the system and load characteristics. Due to the same reason, different instances of execution of a use-case take different time periods to complete the execution and hence, it is required to normalize the time scale as well. This is achieved by using a time warping technique. Let D=<D1, D2, . . . , Dn> be generated during n executions of DLC with respect to use-case U wherein Di=<Di1, Di2, ... > is the sampled normalized memory utilizations during ith execution (1084b2). Arrange D=<D1', ..., Dn'> in non-decreasing order of execution time where the execution time is the number of samples times the sample period (1086b2). Let D1'=(((D1'■D2')■D3') ■ ... ■Dn') wherein ■ is a time-warping operation (1088b2). This pair-wise warping of memory utilizations results in abstract characterization of memory utilization (D1') that is compared with the similar abstract characterization that is part of the signature (C1'). Obtain C1' from signature and perform C1'■D1'; determine the path of least error and compute the sum of errors (Se) based on this path of least error mapping (1090b2). Compare Se with a pre-defined Threshold (1092b2) and report error if Se not less than Threshold.

FIG. 11A describes the steps to instrument a DLC. The first step in adding instrumentation is the identification of major use-cases (1100). The use-cases are selected based on (a) frequency of usage; and (b) maximum collective coverage of code. Each use-case is identified by a unique id. For each of the identified use-cases, the following steps are performed.

The path of execution of the use-case is identified (1110).

The next step is to identify functions that can distinguish between use-cases by examining some key parameters (1120).

The next step is to identify the functions that need to be instrumented (1130). The functions are chosen in such a way that (a) the distinctive behavior of the use-case is captured; (b) not too many functions are instrumented; and (c) total code due to instrumentation is much less than live code. The instrumentation code is added to these functions (1140).

The instrumentation can be turned on and off, on the fly through the modification of a global variable. The method for turning on and off instrumentation is also implemented (1150).

FIG. 11B describes the steps in adding instrumentation to a function. For an identified external function, the instrumentation is added in the calling function to log the function id of the external function into a file (1170).

For the identified internal functions, the function id and the timestamp are logged into a local variable at the beginning of the function (1175). For all memory allocations within the function, successful allocation is checked, and the actual bytes allocated are logged into the local variable. If there are multiple memory allocations within the function, the bytes allocated are added up before saving them in the local variable (1180).

The logging of data into a file is performed at the exit point of the function where the end time of execution is also logged (1185). If there are more than one exit points, the developer can choose to log the data into a file at select exit points. The use-case id is also logged along with the data (1190).

FIG. 12 describes the steps for packaging the DLC. The first step is to package the static signatures (1200). The static signatures such as source signature and target signature are created and packaged. The data to be incorporated into static version signature and static system signature are determined and are also packaged.

The next step is to identify the use-cases for V-zone and M-zone verifications (1210). Then, the simulators are designed (1220). The upper layer simulator implements methods that act as data source and data sink for the identified use-cases. Similarly, the lower layer simulator implements methods that act as data source and data sink for the identified use-cases. One of the simulators implements a method that acts as an entry point for execution of use-cases.

The DLC is suitably instrumented (1225) so as to generate adequate data to identify dynamic signatures. Specifically, suitable internal and external functions are identified and are suitably instrumented. The use-cases are executed in the developer environment to generate the dynamic signature (1230). The compressed dynamic signature is included in the package (1240). The package header is created with information such as ASR version, component id, vendor id, and date and time of packaging (1250). Then the iDLC and simulators are packaged (1260).

FIG. 13 describes the process of scheduling periodic online verification for commissioned components. DLCM module decides the time period based on which online verification is performed on a commissioned component.

The first step is to turn on the instrumentation (1300). All DLCs implement a method that is invoked for turning on and off the instrumentation. After turning on of the instrumentation, the data for performing M-zone verification is collected (1310).

With the collected data, M-zone verification is performed (1320). If the verification fails, MS is alerted about the failure (1330). The instrumentation is turned off (1340) and the verification result is logged (1350).

FIG. 14 describes the collection of usage statistics for a component. The Component Server keeps track of component-wise method invocation (1400). The Q-Agent registers a callback function with the Component Server (1410) in order to receive the statistics from the Component server.

Periodically Component Server will invoke the function to pass the usage-related data (1420). This data is communicated to QS by the Q-Agent (1430). DLCM module in QS is responsible for processing the usage data.

DLCM stores the data on the DoC databases (1440). The data on DoC and the MT Server are kept in sync by periodic offloading of data to the MT Server (1450).

FIG. 15 describes the process of component version management by DLCM. DLCM receives the version upgrade notification published by a DLC Server (1500). DLCM checks the version of the commissioned component (1510). If the version number of the existing component is earlier than the published version, this implies that the new version should be downloaded.

DLCM checks its internal database to verify whether the component is commissioned in MS.

If it is commissioned, a notification is sent to the user for further action such as to decide whether the new version needs to be downloaded (1520).

If the component entry is found in decommissioned components' database, a flag is marked against its entry (1515). At the time of recommissioning of this component, if the flag is set, DLCM sends the notification of version upgrade to the user.

FIG. 16 describes the steps in the periodic off-load process. Data collected on the DoC is periodically (T(Off-load) offloaded to the MT Server to keep the data in both locations in-sync.

The DLCM module frames the packet to be transmitted (1600). QS then checks MS for any streaming activity (1610). If any streaming session is active, QS backs-off for a random period of time (T(Retry)) and then retries (1615) to transmit the frames. If QS detects no activity in MS, it begins the data transmission (1620).

During the transmission, QS checks with MS for streaming activity (1625). If QS finds that a streaming session is active, it marks a checkpoint and waits for a random period of time before checking again (1630). If no streaming session is active, a check is done to verify if any more data need to be transmitted (1635). If yes, transmission is resumed from the last checkpoint.

FIG. 17 describes the steps in subscribing to a DLC Server for receiving the published information regarding the version upgrades of the components. After QS receives confirmation from MS about the successful commissioning of a component, DLCM module stores the component related information in the databases in QS (1700).

If the component that is commissioned is a new component, DLCM forms and sends the message for subscribing to the DLC Server (1710). The required information, such as DLC server IP address and authentication information, for subscribing to the DLC server is also part of the package. Otherwise, if the commissioned component is an upgraded version of a component, DLCM updates the version database (1720).

FIG. 18 describes the decommissioning of a component from MS. The first step is to check whether any instance of the component is active (1800). If so, wait for a random period of time before an attempt is made to decommission the component. Then, check whether the SR is in suspended mode (1810). In this suspended mode, all activities of SR are suspended and the also the keypad is disabled.

If SR is not in suspended mode, QS first checks whether SR is active, that is, active session involving voice call or data transmission (1820). If so, QS waits for a random period of time and repeatedly checks until SR can be safely put in suspended mode (1830).

After the successful suspension, the component is removed from the memory (1840). If the SR was suspended during this decommissioning session, then SR is put back into normal mode (1850). The database is update suitably (1850). If it is not a permanent decommissioning, then the component is moved to QS for securely storing the component for future recomissioning (1870).

FIG. 19 shows the various databases maintained by QS. First one is the system database. The system parameters table (1900) contains the system parameters related to MT such as CPU Clock, RAM, Display characteristics and I/O parameters. The system database also stores some configurable values (1910) such as δ providing tolerance value for XPU verification, T(M-Zone) providing time window for data collection for M-zone verification, R(M-Zone) providing maximum repetition for M-zone operation, T(Retry) providing back-off time value during offload process, T(off-load) providing periodicity of offloading data to MT Server.

The second table is related to commissioned components (1920). All the components commissioned in MS are described in this table.

The third table is related to decommissioned components (1930). The components that are temporarily decommissioned from MS and kept in secure storage in QS are described in this table. When a component is decommissioned, its entry is deleted from commissioned components table and added into the decommissioned components table. This table has a field for indicating whether any version upgrade information was received during the time the component was decommissioned. When the component is commissioned again in MS, QS first checks whether this flag is set and if so, sends an appropriate notification.

The fourth table stores the component related static data (1940). This information is obtained from the DLC package.

The fifth table is the one that stores the component related dynamic data (1950) containing information such as date/time during which the component was used and usage time.

FIG. 20 shows tables in MT Server. MT Server database has an entry for each SR identified by its unique equipment id. For each such SR, the MT Server stores the component related static (2000) and dynamic details (2010).

Thus, a system and method for automated reprogramming of software radios has been disclosed. Although the present invention has been described particularly with reference to the figures, it will be apparent to one of the ordinary skill in the art that the present invention may appear in any number of systems that provide safe reprogramming functionality. It is further contemplated that many changes and modifications may be made by one of ordinary skill in the art without departing from the spirit and scope of the present invention.

ACRONYM LIST

1. API APPLICATION PROGRAMMER INTERFACE
2. AR AUTOMATED REPROGRAMMING
3. ASR AUTOMATED SAFE REPROGRAMMING
4. CORBA COMMON REQUEST BROKER ARCHITECTURE
5. CPU CENTRAL PROCESSING UNIT
6. DLC DOWNLOADED COMPONENT
7. DLCM DOWNLOADED COMPONENT MANAGER
8. DoC DISK ON CHIP
9. E-Zone ENTRY ZONE
10. EXB EXTERNAL FUNCTION EXECUTION BEHAVIOR
11. IDLC INSTRUMENTED DOWNLOADED COMPONENT
12. IXB INTERNAL FUNCTION EXECUTION BEHAVIOR
13. LL LOWER LAYER
14. MS MAIN SUBSYSTEM
15. MT MOBILE TERMINAL
16. M-Zone MONITOR ZONE
17. N-Zone NORMAL ZONE
18. OS OPERATING SYSTEM
19. PU PACK-UNPACK
20. QS QUARANTINE SHELL
21. RAM RANDOM ACCESS MEMORY
22. RTOS REAL-TIME OPERATING SYSTEM
23. SDR SOFTWARE DEFINED RADIO
24. SR SOFTWARE RADIO
25. UL UPPER LAYER
26. URL UNIFORM RESOURCE LOCATOR
27. V-Zone VERIFICATION ZONE
28. VnV VALIDATION AND VERIFICATION
29. XMU EXECUTION MEMORY UTILIZATION
30. XPU EXECUTION PROCESSOR UTILIZATION

What is claimed is:

1. A method for supporting automated reprogramming of a software radio in a safe manner using a downloaded component comprising a plurality of functions based on the executing of said downloaded component in a simulated environment in said software radio with respect to a plurality of use-cases and a signature to determine a signal value associated with said downloaded component, wherein said signal value asserts the safeness of said downloaded component, said method comprising:

computing a plurality of invocation counts of said plurality of functions with respect to a use-case of said plurality of use-cases based said downloaded component;

determining a plurality of signature invocation counts of said plurality of functions with respect to said use-case based on said signature and said use-case;

computing a sum of absolute difference based on said plurality of invocation counts and said plurality of signature invocation counts, wherein said sum of absolute difference is less than a pre-defined threshold;

assigning a success value to said signal value based on said sum of absolute difference;
computing a plurality of memory allocation request counts of said plurality of functions with respect to said use-case based on said downloaded component;
determining a plurality of signature memory allocation request counts of said plurality of functions based on said signature and said use-case;
computing a plurality of differences based on said plurality of memory allocation request counts and said plurality of signature memory allocation request counts, wherein each of said plurality of differences is zero;
assigning a success value to said signal value based on said plurality of differences;
computing a plurality of processor utilizations at periodic intervals with respect to said use-case based on said downloaded component;
computing a plurality of normalized utilizations based on said plurality of processor utilizations;
making said plurality of normalized utilizations a part of a plurality of generated normalized processor utilizations;
arranging said plurality of generated normalized processor utilizations in the non-decreasing order of execution time to result in a plurality of normalized processor utilizations;
assigning a normalized processor utilization of said plurality of normalized processor utilizations to a plurality characteristic processor utilizations;
computing said plurality of characteristic processor utilizations based on a normalized processor utilization of said plurality of normalized processor utilizations and said plurality of characteristic processor utilizations;
determining a plurality of signature characteristic processor utilizations based on said signature and said use-case;
computing a plurality of errors based on said plurality of characteristic processor utilizations and said plurality of signature characteristic processor utilizations, wherein an error of said plurality of errors is a result of a time-warping operation on said plurality of characteristic processor utilizations and said plurality of signature characteristic processor utilizations, and said error is associated with a characteristic processor utilization of said plurality of characteristic processor utilizations and a signature characteristic processor utilization of said plurality of signature characteristic processor utilizations;
assigning a success value to said signal value based on said plurality of errors, wherein a sum based on said plurality of errors is less than a pre-defined threshold;
computing a plurality of memory utilizations at periodic intervals with respect to said use-case based on said downloaded component;
computing a plurality of normalized utilizations based on said plurality of memory utilizations;
making said plurality of normalized utilizations a part of a plurality of generated normalized memory utilizations;
arranging said plurality of generated normalized memory utilizations in the non-decreasing order of execution time to result in a plurality of normalized memory utilizations;
assigning a normalized memory utilization of said plurality of normalized memory utilizations to a plurality characteristic memory utilizations;
computing said plurality of characteristic memory utilizations based on a normalized memory utilization of said plurality of normalized memory utilizations and said plurality of characteristic memory utilizations;
determining a plurality of signature characteristic memory utilizations based on said signature and said use-case;
computing a plurality of errors based on said plurality of characteristic memory utilizations and said plurality of signature characteristic memory utilizations, wherein an error of said plurality of errors is a result of a time-warping operation on said plurality of characteristic memory utilizations and said plurality of signature characteristic memory utilizations, and said error is associated with a characteristic memory utilization of said plurality of characteristic memory utilizations and a signature characteristic memory utilization of said plurality of signature characteristic memory utilizations; and
assigning a success value to said signal value based on said plurality of errors, wherein a sum based on said plurality of errors is less than a pre-defined threshold.

2. The method of claim 1 further comprises:
computing a plurality of summed execution times with respect to said use-case based on said plurality of functions and said downloaded component;
determining a plurality of signature summed execution times with respect to said use-case based on said signature;
computing a plurality of absolute differences based on said plurality of summed execution times and said plurality of signature summed execution times; and
assigning a success value to said signal value based on said plurality of absolute differences wherein each of said plurality of absolute differences is less than a pre-defined threshold.

3. The method of claim 1 further comprises:
computing a plurality of execution times of a function of said plurality of functions with respect to said use-case and said downloaded component;
determining a plurality of signature execution times of said function with respect to said use-case based on said signature;
computing a plurality of execution time mappings of a plurality of a plurality of execution time mappings based on said plurality of execution times and said plurality of signature execution times, wherein an execution time of said plurality of execution times and a signature execution time of said plurality of said signature execution times is a part of an execution time mapping of said plurality of execution time mappings, and a plurality of epsilon values of said plurality of execution time mappings is such that said plurality of epsilon values are within a pre-defined threshold of each other;
computing of a plurality of delta values based on said plurality of a plurality of execution time mappings and said plurality of functions; and
assigning a success value to said signal value based on said plurality of delta values, wherein said plurality of delta values are within a pre-defined threshold of each other.

* * * * *